(12) United States Patent
Tashima

(10) Patent No.: US 8,612,803 B2
(45) Date of Patent: Dec. 17, 2013

(54) INFORMATION PROCESSING APPARATUS AND DRIVER EXECUTION CONTROL METHOD

(75) Inventor: Keisuke Tashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 363 days.

(21) Appl. No.: 13/064,553

(22) Filed: Mar. 30, 2011

(65) Prior Publication Data

US 2011/0302444 A1   Dec. 8, 2011

(30) Foreign Application Priority Data

Jun. 2, 2010   (JP) ................................ 2010-126455

(51) Int. Cl.
*G06F 11/00*   (2006.01)
(52) U.S. Cl.
USPC ...................... 714/36; 713/1; 713/2
(58) Field of Classification Search
USPC .............................. 714/36; 713/1, 2
See application file for complete search history.

(56) References Cited

U.S. PATENT DOCUMENTS

| | | | |
|---|---|---|---|
| 6,263,490 B1 * | 7/2001 | Tanaka | 717/125 |
| 2005/0229039 A1 | 10/2005 | Anderson et al. | |
| 2006/0242402 A1 * | 10/2006 | Swift et al. | 713/2 |
| 2008/0288810 A1 | 11/2008 | Bailey et al. | |
| 2009/0249053 A1 * | 10/2009 | Zimmer et al. | 713/2 |
| 2009/0249120 A1 * | 10/2009 | Yao et al. | 714/15 |

FOREIGN PATENT DOCUMENTS

| | | |
|---|---|---|
| JP | 2002-189615 | 7/2002 |
| JP | 2003-316582 | 11/2003 |
| JP | 2006-072931 | 3/2006 |

OTHER PUBLICATIONS

Extended European Search Report issued Aug. 30, 2012 in corresponding European Application No. 11161187.7.
Extensible Firmware Interface Specification Version 1.02, "Boot Manager", XP-002271556, Dec. 12, 2000, pp. 319-326.
Patent Abstracts of Japan, Publication No. 2002-189615, Published Jul. 5, 2002.
Patent Abstracts of Japan, Publication No. 2003-316582, Published Nov. 7, 2003.
Patent Abstracts of Japan, Publication No. 2006-072931, Published Mar. 16, 2006.
"Unified Extensible Firmware Interface Specification 2.2", Unified EFI, Inc., Sep. 2008, pp. 15-19 and 304-313.

* cited by examiner

*Primary Examiner* — Charles Ehne
(74) *Attorney, Agent, or Firm* — Staas & Halsey LLP

(57) ABSTRACT

An information processing apparatus includes a process monitor configured to monitor the status of processes executed in accordance with respective monitored driver programs which are to be monitored among driver programs associated with respective devices, an error processor configured to operate when a processing error is detected by the process monitor, to register, in a nonvolatile memory, driver information indicating the driver program with respect to which the error has been detected, and an execution controller configured to call and execute the driver programs, wherein when the information processing apparatus is started, the execution controller skips execution of the driver program indicated by the driver information registered in the nonvolatile memory.

13 Claims, 35 Drawing Sheets

FIG. 13

| | DEVICE PATH | PROTOCOL GUID | FUNCTION NAME | POINTER | |
|---|---|---|---|---|---|
| DEVICE D0 | HostBus#0–IOH–Controller#0 | **** | Supported() | → | UNMONITORED |
| | | | Start() | → | |
| | | | Read() | → | |
| | | | Write() | → | |
| DEVICE D1 | HostBus#0–IOH–Controller#1 | **** | Supported() | → | MONITORED |
| | | | Start() | → | |
| | | | Read() | → | |
| | | | Write() | → | |

241 / 242 / 243 / 244 / 245

240 DEVICE LIST

Pointers in upper group: TO MEMBER IN DRIVER IMAGE
Pointers in lower group: TO MEMBER IN MONITORING DRIVER IMAGE

FIG. 28

350 BOOT ORDER TABLE

| PRIORITY | FILE PATH |
|---|---|
| 1 | ···-FiberChannelController-HDD-boot. |
| 2 | ···-SASController-Slot0 HDD-boot. |
| 3 | ···-SASController-Slot1 HDD-boot. |

INFORMATION PROCESSING APPARATUS AND DRIVER EXECUTION CONTROL METHOD

CROSS-REFERENCE TO RELATED APPLICATION

This application is based upon and claims the benefit of priority of the prior Japanese Patent Application No. 2010-126455, filed on Jun. 2, 2010, the entire contents of which are incorporated herein by reference.

FIELD

The embodiments discussed herein are related to information processing apparatus and driver execution control methods.

BACKGROUND

Generally, when an information processing apparatus is started, the process of recognizing connected devices and enabling access to the individual recognized devices is performed prior to the execution of an OS (Operating System) program. The UEFI (United Extensible Firmware Interface) is known as one of specifications defining the procedure for enabling access to devices prior to the execution of the OS.

After powered on, an information processing apparatus complying with the UEFI specification loads, from its storage device, startup management firmware for performing the function called "boot manager", and executes the startup management firmware. In accordance with the startup management firmware, the information processing apparatus loads, into its main storage device, programs called "UEFI drivers", which are associated with respective devices connected to the information processing apparatus. The UEFI driver is a driver program describing the procedure for controlling a device associated therewith and is loaded, for example, from the same storage device as that storing the startup management firmware or from a storage area provided in the associated device.

In the following description, the expression "UEFI driver" designates the "boot service driver" as provided by the UEFI specification. The boot service driver is used before the start of the OS program and is not used after the OS program is started.

In accordance with the UEFI driver loaded into the main storage device, the information processing apparatus executes an initial setting process using the loaded UEFI driver. The initial setting process using a UEFI driver includes, for example, inspection as to whether or not the UEFI driver supports the device to be controlled, initialization of the device, and initialization of control data used in controlling the device.

Where the initial setting process using a UEFI driver has normally been completed, access to the corresponding device can be controlled by using the UEFI driver. For example, after the initial setting process using the UEFI driver is completed, the information processing apparatus calls a UEFI driver associated with a desired device in accordance with the startup management firmware, and reads out an OS boot loader from the corresponding device in accordance with the called UEFI driver. The information processing apparatus then executes the OS boot loader thus read out, to initiate the process of starting the OS program.

As an example of computer systems having the function of monitoring anomaly during the execution of programs, a computer system has been known in which the startup time for the OS program and the execution period of each program are monitored by respective independent timers and the computer system is reset depending on the logical sum of overflow outputs from the timers. In another exemplary computer system, when the computer system is restarted due to the occurrence of fault during the execution of the OS program, the OS is booted using a memory area different from that used before the restart so that the memory information dumped at the time of occurrence of the fault can be reliably saved.

Also, in connection with techniques wherein a startup program (BIOS: Basic Input/Output System) is selected from among those stored in a plurality of flash ROMs (Read Only Memories), a computer has been known in which the correctness of the startup program is determined and the startup program to be selected is changed depending on the result of the determination.

Japanese Laid-open Patent Publication No. 2002-189615
Japanese Laid-open Patent Publication No. 2006-72931
Japanese Laid-open Patent Publication No. 2003-316582
"Unified Extensible Firmware Interface Specification Version 2.2", Unified EFI, Inc., September 2008, pp. 15-19 and 304-313

The policy for the startup management firmware according to the UEFI could be one of the following two policies: The first policy is to perform the initial setting processes by using UEFI drivers associated with devices which are necessary and sufficient for starting the OS program, to make these devices ready for use. The second policy is to perform the initial setting processes by using UEFI drivers associated with as many devices as possible, among the devices connected to the information processing apparatus, to make the devices ready for use.

The second policy is very often adopted in high-versatility apparatus such as servers in which various devices are possibly connected or the OS program to be executed can be selected from among those stored in a plurality of devices. The reason is that in the case of high-versatility apparatus, the number and kinds of connected devices may vary each time the apparatus is started, with the result that selectable devices from which the OS program to be executed is read out also vary from time to time.

Where a UEFI driver containing an anomaly occurrence factor, such as a bug, is executed, the information processing apparatus fails to normally complete the execution of the UEFI driver. For example, when the initial setting process using such a UEFI driver is executed, the information processing apparatus may possibly fail to normally complete the initial setting process due to the bug contained in the executed UEFI driver. Also, even if the initial setting process is normally completed though the UEFI driver used contains a bug, it is possible that when access control is performed with respect to the corresponding device, the information processing apparatus is unable access the device or fails to normally complete the access control due to the bug in the UEFI driver.

Meanwhile, the UEFI driver (boot service driver), which is loaded by executing the startup management firmware, is not used after the OS program is started, as stated above. Thus, even if the execution of a UEFI driver associated with a device that has no involvement in the start of the OS program fails to be normally completed, the failure originally does not affect the process executed subsequently to the start of the OS program. The reason is that after the OS program is started, a device driver for the OS program, which is prepared separately from the UEFI driver, is used.

However, where the execution of a UEFI driver associated with a device that has no involvement in the start of the OS program fails to be normally completed, a problem arises in that the process fails to be continued through to the start of the OS program, regardless of whether the device with which the executed UEFI driver is associated has involvement in or no involvement in the start of the OS program. For example, where the process of the information processing apparatus stops during the execution of a UEFI driver and thus the information processing apparatus is restarted upon detection of the stoppage of the process, the process of the information processing apparatus again stops during the execution of the same UEFI driver. In such a case, the information processing apparatus is repeatedly restarted without the process being continued through to the start of the OS program. Also, where the process of the information processing apparatus stops during the execution of a UEFI driver and the process remains stopped without the information processing apparatus being restarted, the process naturally fails to be continued through to the start of the OS program.

The problem that "the process fails to be continued through to the start of the OS program where the execution of a UEFI driver associated with a device that has no involvement in the start of the OS program fails to be normally completed" is more likely to occur where the number of the UEFI drivers, which need to be made ready for use as programs for controlling access to the corresponding devices, is larger.

Further, the problem can occur not only in the information processing apparatus complying with the UEFI specification but also in other kinds of information processing apparatus in which driver programs associated with respective devices need to be made ready for use prior to the start of the OS program.

SUMMARY

According to one aspect of the present invention, an information processing apparatus which is connected with a plurality of devices and which is configured to execute driver programs associated with the respective devices to control the devices includes a process monitor configured to monitor status of processes executed in accordance with monitored driver programs, respectively, which are to be monitored among the driver programs, an error processor configured to operate when error is detected by the process monitor during execution of the process in accordance with any one of the monitored driver programs, to register, in a nonvolatile memory, driver information indicating the driver program with respect to which the error has been detected, and an execution controller configured to call and execute the driver programs associated with the respective devices, wherein when the information processing apparatus is restarted, the execution controller looks up the nonvolatile memory and skips execution of the driver program indicated by the driver information registered in the nonvolatile memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 illustrates an exemplary data structure of a device list;

FIG. 28 illustrates an exemplary data structure of a boot order table;

DESCRIPTION OF EMBODIMENTS

Figure 1:
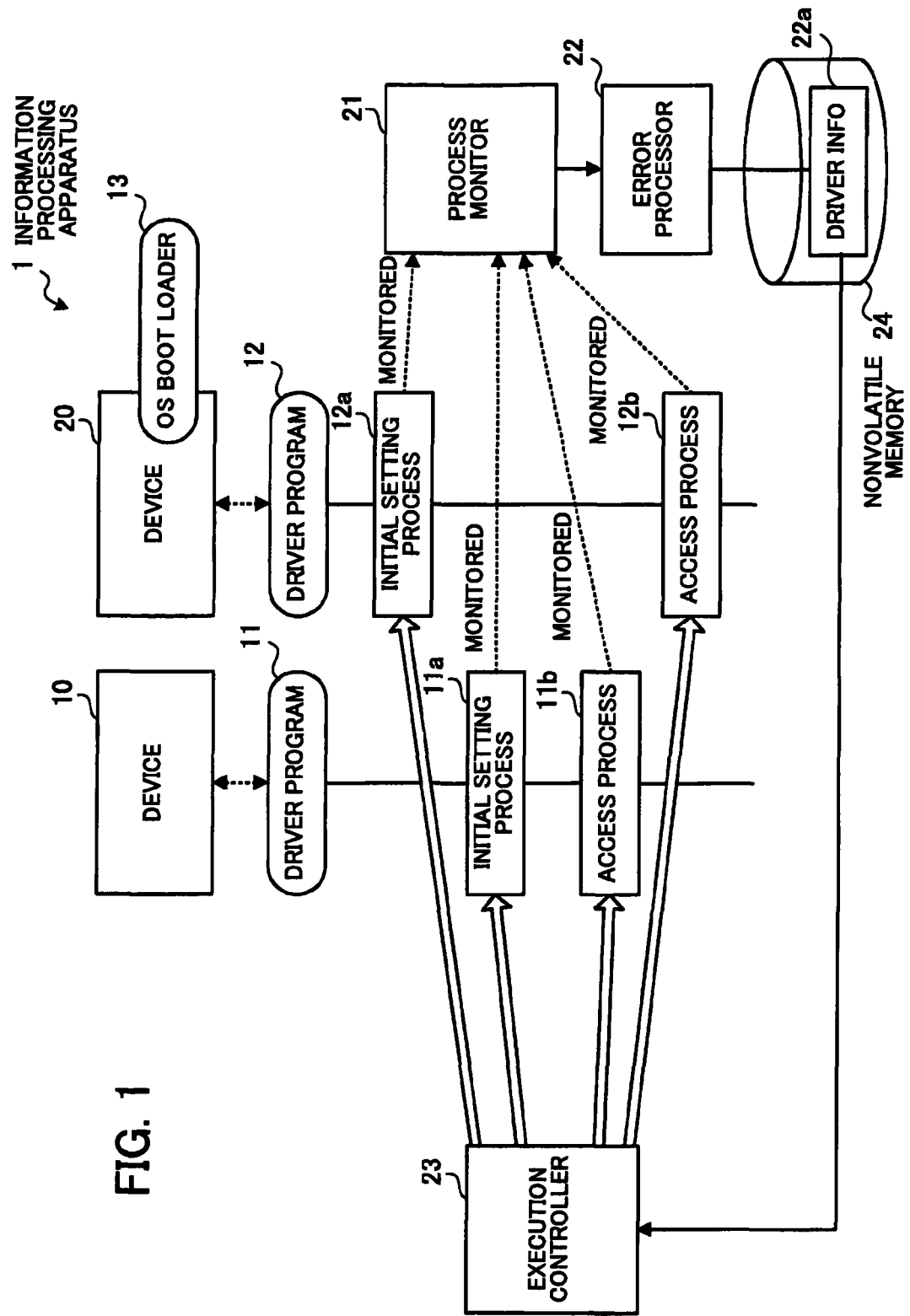
FIG. 1 illustrates an exemplary configuration and operation of an information processing apparatus according to a first embodiment.

Embodiments of the present invention will be described in detail below with reference to the accompanying drawings, wherein like reference numerals refer to like elements throughout.

First Embodiment

FIG. 1 illustrates an exemplary configuration and operation of an information processing apparatus according to a first embodiment.

The information processing apparatus 1 illustrated in FIG. 1 is connected with a plurality of devices. In FIG. 1, it is assumed that the information processing apparatus 1 is connected with two devices 10 and 20, by way of example. The information processing apparatus 1 controls the devices 10 and 20 by executing driver programs 11 and 12 associated with the respective devices 10 and 20. Both of the driver programs 11 and 12 are, however, executed only during the period of time after the information processing apparatus 1 is started and before an OS program is started.

Also, the information processing apparatus 1 comprises a process monitor 21, an error processor 22, and an execution controller 23.

The process monitor 21 monitors the status of processes executed in accordance with driver programs to be monitored, among the driver programs associated with respective devices connected to the information processing apparatus 1, in order to detect processing error. The driver programs to be monitored are selected, for example, by user's input operation. Also, as such driver programs to be monitored, driver programs for controlling devices that are not necessary for the start of the OS program are selected, for example. Alternatively, the driver programs associated with all the devices connected to the information processing apparatus 1 may be monitored.

In the example illustrated in FIG. 1, both of the driver programs 11 and 12 are monitored by the process monitor 21. The process executed by the process monitor 21 may be implemented, for example, by a watch dog timer provided in the information processing apparatus 1. Alternatively, the process of the process monitor 21 may be implemented by executing a predetermined program by a CPU (Central Processing Unit) provided in the information processing apparatus 1.

When a processing error is detected by the process monitor 21, the error processor 22 registers driver information 22a indicating a driver program with respect to which the error has been detected, in a nonvolatile memory 24 provided in the information processing apparatus 1. After the driver information 22a about the processing error detected by the process monitor 21 is registered in the nonvolatile memory 24, the error processor 22 restarts the information processing apparatus 1.

The execution controller 23 calls and executes the individual driver programs 11 and 12. Also, when the information processing apparatus 1 is started, the execution controller 23 looks up the nonvolatile memory 24 and skips execution of the driver program indicated by the driver information 22a registered in the nonvolatile memory 24.

The processes executed by the error processor 22 and the execution controller 23 are implemented, for example, by executing predetermined programs by the CPU provided in the information processing apparatus 1.

An exemplary process in which the driver programs 11 and 12 are executed in the information processing apparatus 1 will be now explained with reference to FIG. 1. In the following explanation, it is assumed that the device 20, by way of example, is a device which is necessary for the start of the OS program. Such device includes a storage device storing an OS boot loader and the OS program, and a device (e.g., bus interface, network interface and the like) on the path between a storage device in which the OS boot loader and the OS program are stored and the CPU provided in the information processing apparatus. In FIG. 1, the device 20 is assumed to be a storage device storing the OS boot loader 13. The OS boot loader is a program describing the procedure for reading out the OS program from the device and starting the OS program. The device 10, on the other hand, is assumed to be a device which is not necessary for the start of the OS program.

When the information processing apparatus 1 is started, the execution controller 23 determines whether or not any driver information 22a is registered in the nonvolatile memory 24. If no driver information 22a is registered in the nonvolatile memory 24, the execution controller 23 calls the driver programs 11 and 12 in predetermined order, for example, and executes the process explained below, in accordance with the called driver programs. The process executed by the execution controller in accordance with the driver program includes an initial setting process using the driver program, and an access process with respect to the device to be controlled by the driver program.

The initial setting process using the driver program is a process whereby the device to be controlled is made controllable with the use of the driver program. The initial setting process using the driver program may include initialization of the device, and initialization of control data which is used in controlling the device, for example.

On the other hand, the access process with respect to a device represents the process of exchanging data between the device and the CPU of the information processing apparatus 1 by executing the driver program during the period of time in which the OS program is not yet started. An exemplary process of causing the device to output data is a process wherein a file such as the OS boot loader 13 is read out from a storage area in the device. Where the device is a display device, for example, the access process with respect to the device may be a process of causing the display device to display information.

In the example illustrated in FIG. 1, after the information processing apparatus 1 is started, the execution controller 23 successively carries out an initial setting process 12a using the driver program 12, an initial setting process 11a using the driver program 11, an access process 11b with respect to the device 10, and an access process 12b with respect to the device 20 in the mentioned order. After the initial setting process 12a is completed, the information processing apparatus 1 is able to access the device 20 by using the driver program 12. Also, after the initial setting process 11a is completed, the information processing apparatus 1 is able to access the device 10 by using the driver program 11. The initial setting processes 11a and 12a may be executed in the order of recognition of the devices 10 and 20 by the CPU of the information processing apparatus 1.

Subsequently, the execution controller 23 executes the access process 11b with respect to the device 10 in accordance with the driver program 11. Further, the execution controller 23 executes the access process 12b with respect to the device 20 in accordance with the driver program 12. Let it be assumed that by performing the access process 12b, the OS boot loader 13 is read out from the device 20 by the CPU of the information processing apparatus 1.

When the driver programs 11 and 12 are called by the execution controller 23, the process monitor 21 monitors the status of the processes executed in accordance with the called driver programs. Specifically, the process monitor 21 monitors the initial setting process 12a executed in accordance with the driver program 12, the initial setting process 11a executed in accordance with the driver program 11, the access process 11b executed in accordance with the driver program 11, and the access process 12b executed in accordance with the driver program 12. If the monitored process is normally completed, the process monitor 21 stops monitoring the process.

Where no processing error has been detected by the process monitor 21 during the execution of each of the initial setting processes 12a and 11a and the access processes 11b and 12b, the CPU of the information processing apparatus 1 executes the OS boot loader 13 which has been read out from the device 20 during the access process 12b. This initiates the process of starting the OS program stored in the device 20.

The following describes an exemplary case where a processing error is detected by the process monitor 21. By way of example, let us suppose that a processing error has been detected by the process monitor 21 during the execution of the initial setting process 11a using the driver program 11. In this case, the error processor 22 registers, in the nonvolatile memory 24, the driver information 22a indicating the driver program 11 with respect to which the processing error has been detected, and then restarts the information processing apparatus 1. Instead of restarting the information processing apparatus 1 under the control of the error processor 22, the restart may be executed in response to the input operation by the user who has recognized the detection of the processing error, for example.

Figure 2:
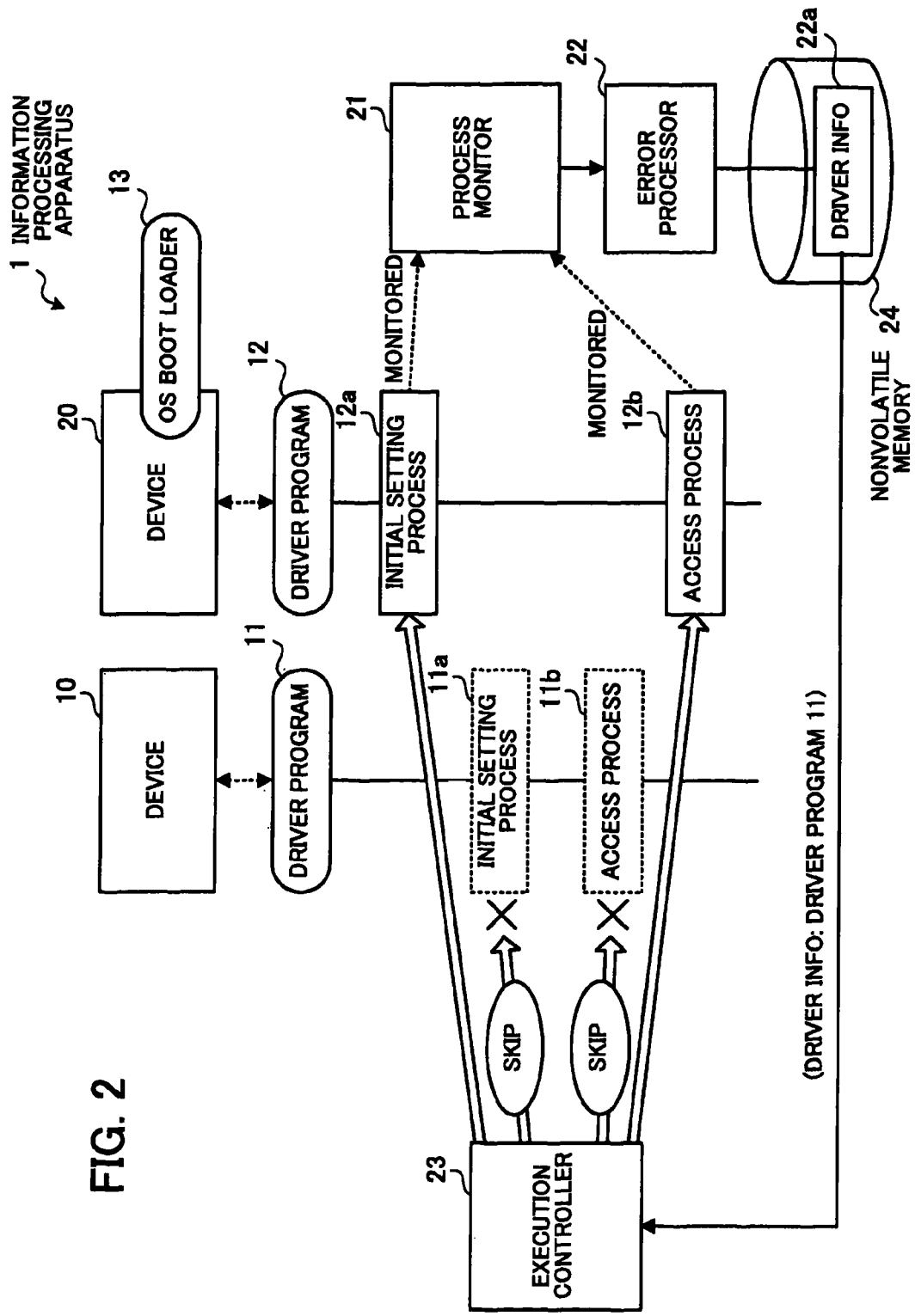
FIG. 2 illustrates exemplary processes executed in the information processing apparatus after restart.

Processes executed in the information processing apparatus 1 after the restart will be now described with reference to FIG. 2. FIG. 2 illustrates exemplary processes executed in the information processing apparatus after the restart.

When the information processing apparatus 1 is restarted, the execution controller 23 looks up the nonvolatile memory 24 and recognizes that the driver information 22a indicating the driver program 11 has been registered. Subsequently, the execution controller 23 calls the driver program 12 with respect to which no driver information is registered in the nonvolatile memory 24, and executes the initial setting process 12a in accordance with the driver program 12.

After the initial setting process 12a is normally completed, the execution controller 23 skips execution of the processes in accordance with the driver program 11 with respect to which the driver information 22a has been registered in the nonvolatile memory 24. Specifically, the execution controller 23 skips execution of the initial setting process 11a in accordance with the driver program 11 and also skips execution of the access process 11b with respect to the device 10.

After skipping the initial setting process 11a and the access process 11b, the execution controller 23 executes the access process 12b with respect to the device 20. As a result, the OS boot loader is read out from the device 20 by the CPU of the information processing apparatus 1, whereupon the CPU executes the OS boot loader to initiate the process of starting the OS program.

During the post-restart process illustrated in FIG. 2, the process monitor 21 monitors the initial setting process 12a and the access process 12b executed in accordance with the driver program 12. The initial setting process 11a and the access process 11b, on the other hand, are both skipped, and therefore, the process monitor 21 does not monitor these processes.

In this manner, when a processing error is detected during the execution of a driver program containing an anomaly occurrence factor such as a bug, the information processing apparatus 1 is restarted, then execution of the driver program with respect to which the processing error has been detected is skipped, and only normal driver programs with respect to which no processing error was detected before the restart are executed. After the restart, the information processing apparatus 1 carries on the start process by using the normal driver programs, so that the devices corresponding to the normal driver programs become accessible. Where the device corresponding to the driver program with respect to which a processing error was detected before the restart is a device that has no involvement in the start of the OS program, the restarted information processing apparatus 1 reads out the OS boot loader from any one of the devices corresponding to the normal driver programs and executes the OS boot loader, whereby the OS program is started.

Thus, where a processing error is detected during the execution of a certain driver program and if the driver program with respect to which the processing error has been detected has no involvement in the start of the OS program, the information processing apparatus 1 executes the start process after restarted, by using the driver programs other than that with respect to which the processing error has been detected, with the result that the OS program can be started. Consequently, even if any of the driver programs executed at the time of starting the information processing apparatus 1 contains an anomaly occurrence factor, the chances for the information processing apparatus 1 to carry on the start process to start the OS program increase as a whole.

If, in the configuration illustrated in FIGS. 1 and 2, both of the devices 10 and 20 store the OS program and thus the OS program can be read out from either one of the devices 10 and 20 to be executed, advantageous effects stated below can be obtained. Let it be assumed here that the access process 11b is a process of reading out the OS boot loader stored in the device 10, and that the access process 12b is a process of reading out the OS boot loader stored in the device 20.

In such a case, if error is detected during the initial setting process 11a or the access process 11b, the information processing apparatus 1 skips the initial setting process 11a and the access process 11b after restarted. Thus, since the initial setting process 11a and the access process 11b are skipped, it is not possible to read out the OS program stored in the device 10. However, since the initial setting process 12a and the access process 12b are normally executed after the information processing apparatus 1 is restarted, the OS boot loader is read out from the device 20 and the process of starting the OS program stored in the device 20 is initiated by using the OS boot loader thus read out. In this manner, even in the case where a driver program for controlling a device storing the OS program contains an anomaly occurrence factor, it is possible to carry on the start process by reading out the OS program stored in a different device and executing the OS program.

The execution controller 23 may look up the nonvolatile memory 24 each time and immediately before a driver program is read out, for example, to determine whether the driver information 22a is registered or not. Alternatively, the execution controller 23 may look up the nonvolatile memory 24 during a period of time after the information processing apparatus 1 is started and before the initial setting processes are executed in accordance with the individual driver programs, to determine whether or not the driver information 22a is registered.

In the latter case, the execution controller skips execution of the initial setting process in accordance with a driver program corresponding to the driver information 22a registered in the nonvolatile memory 24. The driver program with respect to which execution of the initial setting process has been skipped is incapable of being used as a device control program. Accordingly, the execution controller 23 does not execute the access process for the device corresponding to the driver program with respect to which execution of the initial setting process has been skipped. As a result of such processing, the number of times the nonvolatile memory 24 is looked up by the execution controller 23 can be reduced, compared with the process wherein the nonvolatile memory 24 is looked up each time and immediately before each driver program is called, whereby the processing load on the execution controller 23 can be mitigated.

The following describes an embodiment wherein a computer adopting the UEFI specification is used as the information processing apparatus.

Second Embodiment

Figure 3:
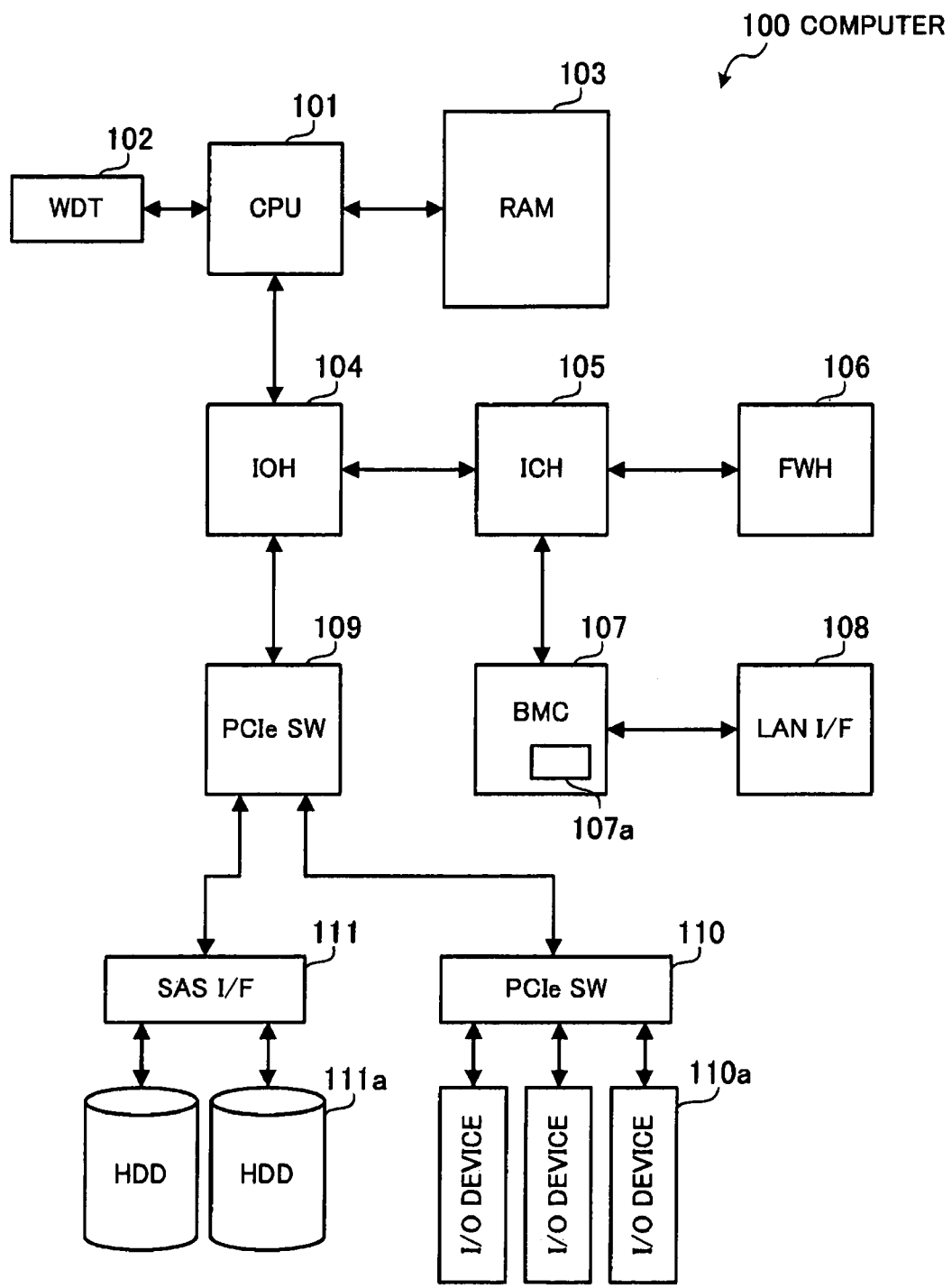
FIG. 3 illustrates an exemplary hardware configuration of a computer according to a second embodiment.

FIG. 3 illustrates an exemplary hardware configuration of a computer according to a second embodiment.

The computer 100 illustrated in FIG. 3 comprises a CPU 101, a WDT (Watch Dog Timer) 102, a RAM (Random Access Memory) 103, an IOH (In/Out Hub) 104, an ICH (In/Out Controller Hub) 105, an FWH (FirmWare Hub) 106, a BMC (Baseboard Management Controller) 107, a LAN (Local Area Network) interface (I/F) 108, PCIe (PCIexpress; PCI (Peripheral Component Interconnect)) switches 109 and 110, and a SAS (Serial Attached SCSI; SCSI (Small Computer System Interface)) interface (I/F) 111.

The CPU 101 performs integrated control of the computer 100 by executing various programs stored in nonvolatile storage media such as the FWH 106 and HDDs (Hard disk Drives) 111a, described later.

The WDT 102 monitors the processes executed by the CPU 101 in accordance with predetermined programs and, if any process fails to be completed within a fixed time, notifies the CPU 101 of the occurrence of error. The process executed by the WDT 102 may be implemented, for example, by executing a predetermined program by the CPU 101, instead of using dedicated hardware.

The RAM 103, which is a main storage device of the computer 100, temporarily stores at least part of programs to be executed by the CPU 101, as well as various data necessary for the processes in accordance with the programs.

The IOH 104 relays data to and from the CPU 101, the ICH 105 and the PCIe switch 109. The ICH 105 relays data to and from the IOH 104, the FWH 106 and the BMC 107.

The FWH 106 is a nonvolatile memory storing UEFI firmware and the like. For example, the FWH 106 is constituted by a flash ROM.

The BMC 107 is a microcontroller for managing the hardware of the computer 100. The BMC 107 performs processes such as detection of fault in LSI (Large Scale Integration) and buses inside the computer 100, and supply control of electric power and clock signal to the LSI. Also, the BMC 107 has a nonvolatile memory 107a packaged therein. An error log, for example, is written into the nonvolatile memory 107a. The nonvolatile memory 107a is, for example, a flash ROM.

The LAN interface 108 communicates with external devices via a LAN cable. To the LAN interface 108 is connected, for example, a management device for remotely managing the status of the hardware of the computer 100.

The PCIe switches 109 and 110 individually relay data to and from a plurality of PCIe buses. The PCIe switch 110 is connected with various I/O devices 110a, for example. The I/O devices 110a may include, among others, a fiber channel card and a graphics interface to which a monitor is connected, for example.

The SAS interface 111 is connected, for example, with SAS devices such as the HDDs 111a. The SAS devices may include other kinds of devices such as SSD (Solid State Drive).

Figure 4:
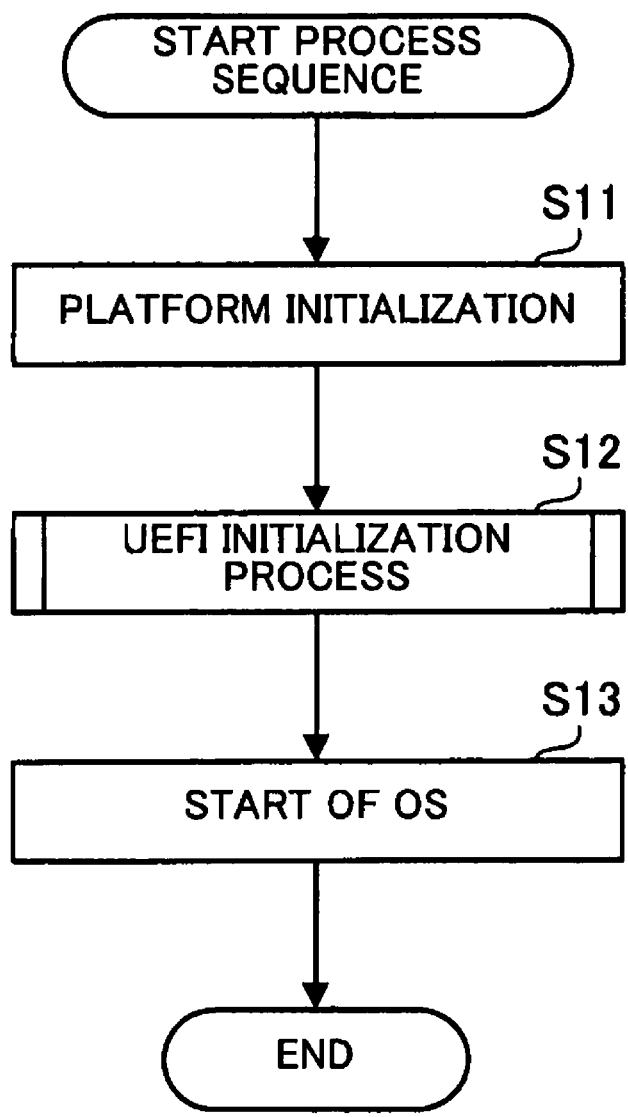
FIG. 4 is a flowchart illustrating a start process sequence of the computer.

A process of starting the computer 100 will be now described. FIG. 4 is a flowchart illustrating a start process sequence of the computer.

The start process sequence illustrated in FIG. 4 is started when the computer 100 is powered on or restarted. Upon start of the computer 100, the platform is initialized first (Step S11). During the platform initialization, power is applied to the individual devices connected to the computer 100 and also the clock signal is supplied, for example.

Subsequently, an initialization process according to the UEFI is executed (Step S12). During the UEFI initialization process, the CPU 101 of the computer 100 executes the UEFI firmware stored in the FWH 106, to make the connected devices ready for use and also to set up an environment such that the OS program can be read out from a necessary device and started.

In the last stage of the UEFI initialization process, the CPU 101 reads out the OS boot loader from a device and executes the OS boot loader. Consequently, the OS program begins to be started (Step S13).

The UEFI initialization process executed in Step S12 in FIG. 4 will be now explained. As one step of the UEFI initialization process, the CPU 101 executes initial setting processes by using respective UEFI drivers. The UEFI driver is a driver program for controlling a corresponding device connected to the computer 100. The UEFI driver is prepared for each of devices to be controlled.

The initial setting process using the UEFI driver is a process in which the UEFI driver itself is executed so that access to the corresponding device to be controlled may become controllable with the use of the UEFI driver. The initial setting process using the UEFI driver includes, for example, inspection as to whether or not the UEFI driver supports the device to be controlled, initialization of the device, and initialization of control data which is used in controlling the device.

In the following description, the expression "UEFI driver" denotes the "boot service driver." The boot service driver is used before the OS program is started, and is not used after the OS program is started. Once the OS program is started in Step S13 in FIG. 4, the CPU 101 executes device drivers for the OS program, separate from the UEFI drivers, to control the respective devices.

During the UEFI initialization process executed in Step S12, the computer 100 of this embodiment searches for all devices connected thereto, and performs the initial setting processes by using the individual UEFI drivers associated with the respective recognized devices. In this manner, all devices connected to the computer 100 are searched for and the initial setting process is performed with respect to each recognized device by using the corresponding UEFI driver.

This procedure is suited to high-versatility apparatus to which various devices may possibly be connected or in which the OS program to be executed can be selected from among those stored in a plurality of devices. The reason is that in the case of high-versatility apparatus, the number and kinds of connected devices may vary each time the apparatus is started, with the result that selectable devices from which the OS program to be executed is read out also vary from time to time. Further, in such high-versatility apparatus, among all devices connected to the apparatus, at least the devices that can be selected as a device from which the OS program is to be read out need to be individually made accessible when the apparatus is started.

However, in the case of searching for all devices connected to the computer and performing the initial setting process with respect to each recognized device by using the corresponding UEFI driver, a problem can arise in that it is highly possible that the process fails to be continued through to the start of the OS program (Step S13 in FIG. 4) due to an anomaly occurrence factor, such as a bug, contained in the UEFI driver, as explained below.

Where a UEFI driver containing an anomaly occurrence factor such as a bug is executed, the computer fails to normally complete the execution of the UEFI driver. Also, even if the initial setting process is normally completed though the UEFI driver used contains a bug, it is possible that when access control is performed with respect to the corresponding device, the computer fails to access the device or fails to normally complete the access control due to the bug contained in the UEFI driver.

Meanwhile, the UEFI driver (boot service driver), which is loaded by executing the UEFI firmware, is not used after the OS program is started, as stated above. Thus, even if the execution of a UEFI driver associated with a device that has no involvement in the start of the OS program fails to be normally completed, the failure originally does not affect the process executed subsequently to the start of the OS program. The reason is that after the OS program is started, the computer accesses the devices by using the respective device drivers for the OS program, prepared separately from the UEFI drivers.

However, when the execution of a UEFI driver associated with a device that has no involvement in the start of the OS program fails to be normally completed, the process fails to be continued through to the start of the OS program, regardless of whether the device with which the executed UEFI driver is associated has involvement in or no involvement in the start of the OS program. The problem that "the process fails to be continued through to the start of the OS program where the execution of a UEFI driver associated with a device that has no involvement in the start of the OS program fails to be normally completed" is more likely to occur where the number of the UEFI drivers, which need to be made ready for use as programs for controlling access to the corresponding devices, is larger. Thus, in the case of searching for all devices connected to the computer and performing the initial setting process with respect to each recognized device by using the corresponding UEFI driver, the possibility of the process failing to be continued through to the start of the OS program increases because the number of devices to be searched for can be large.

The computer 100 of this embodiment adopts the methodology explained below, in order to cope with the problem that "the process fails to be continued through to the start of the OS program where the execution of a UEFI driver associated with a device that has no involvement in the start of the OS program fails to be normally completed." When the process of a UEFI driver associated with a device that has no involvement in the start of the OS program stops during the execution, it is desirable that the process be skipped, if possible, to continue the start process. Also, since the most important role of the UEFI firmware is to start the OS program, it is not necessarily the case that all of the devices connected to the computer 100 need to be made ready for use before the OS program is started.

Further, even if the UEFI driver associated with a certain device contains an anomaly occurrence factor, the device driver for the OS program associated with that device is executed after the OS program is started. Thus, it is highly possible that the device which failed to be made ready for use under the control of the UEFI firmware can be used under the control of the OS program.

Accordingly, the computer 100 of this embodiment monitors the processes executed in accordance with the UEFI drivers and registers, in a nonvolatile storage medium, information indicating a UEFI driver with respect to which a processing error has been detected. When started, the computer 100 looks up the nonvolatile storage medium to identify the UEFI driver with respect to which processing error was detected in the past, and skips execution of the identified UEFI driver in order to continue the start process by means of the UEFI firmware. This procedure increases the chances for the process to be continued through to the start of the OS program even in the event a certain UEFI driver or drivers contain an anomaly occurrence factor.

The device corresponding to a UEFI driver with respect to which a processing error has been detected is not made ready for use before the OS program is started, but if the device has no involvement in the start of the OS program, it is highly possible that the device can be used after the OS program is started. Accordingly, even though the execution of such UEFI driver with respect to which a processing error has been detected is skipped, there is a low probability that a processing error will occur in conjunction with the corresponding device after the OS program is started.

Figure 5:
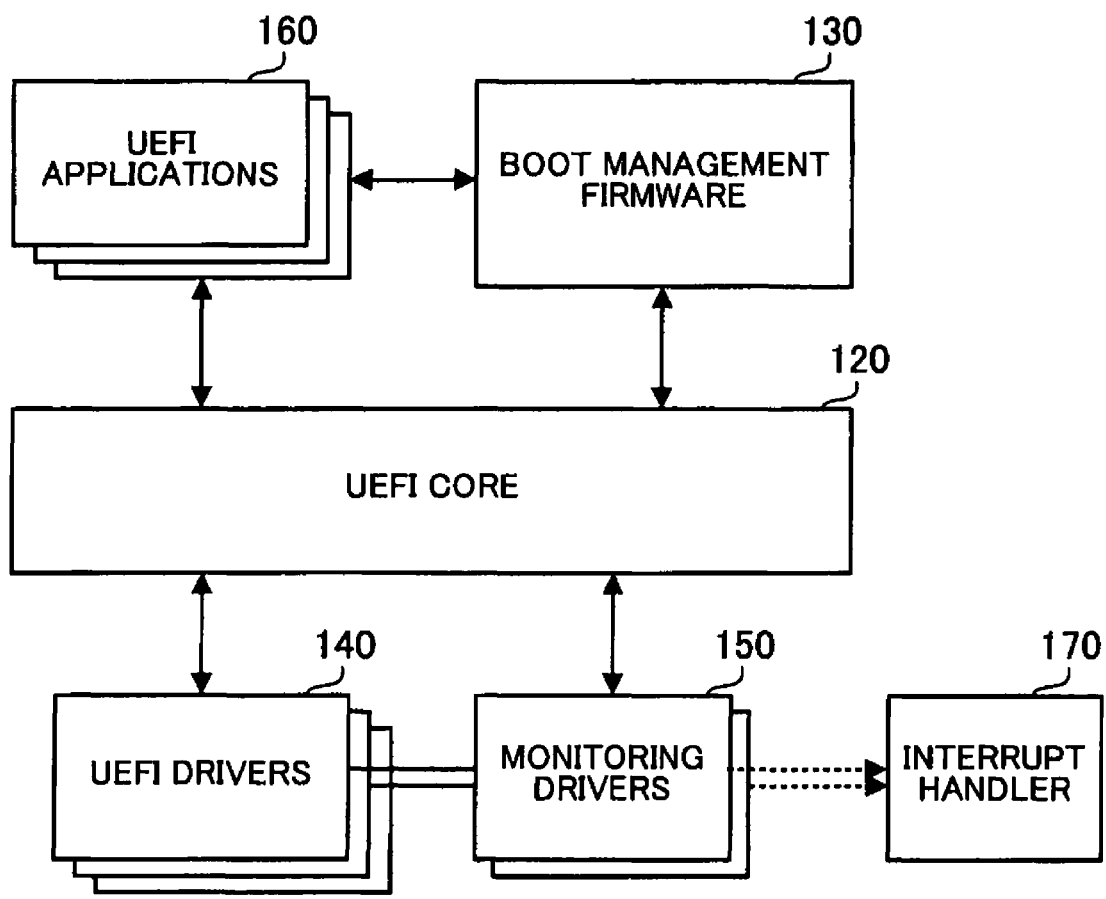
FIG. 5 illustrates exemplary programs executed during an initialization process according to the UEFI.

FIG. 5 illustrates exemplary programs executed during the initialization process according to the UEFI.

A UEFI core 120 and boot management firmware 130 illustrated in FIG. 5 are firmware for implementing the function called "boot manager" in the UEFI terminology. The UEFI core 120 and the boot management firmware 130 are stored beforehand in the FWH 106 and are executed by the CPU 101 in the course of process from the start of the computer 100 to the start of the OS program.

The UEFI core 120 is a program describing the procedure for setting up an environment such that the individual devices connected to the computer 100 can be accessed. The boot management firmware 130 is a program describing the procedure of a process that needs to be executed prior to the start of the OS program in the environment created by the UEFI core 120.

The UEFI drivers 140 are driver programs for controlling the respective devices connected to the computer 100. The UEFI drivers 140 are prepared for the respective devices to be controlled and are usually provided by the vendors of the respective devices. Each UEFI driver 140 includes a plurality of member functions, as described later. The member function is a subprogram describing the procedure of a part of the process implemented by the UEFI driver 140.

Each UEFI driver 140 may be stored either in the FWH 106 or in the storage area in the corresponding device to be controlled.

Monitoring drivers 150 are prepared for respective UEFI drivers 140 that need to be monitored, among the UEFI drivers 140. The monitoring driver 150 includes member functions whose function names are identical with those of the member functions included in the corresponding UEFI driver 140. When a member function in the monitoring driver 150 is called, the CPU 101 calls and executes the member function with a function name identical with that of the called member function, from among the member functions included in the corresponding UEFI driver 140. At this time, the CPU 101 requests the WDT 102 to monitor the status of execution of the called member function included in the UEFI driver 140.

The monitoring drivers 150 are stored beforehand in the FWH 106, for example. Where the UEFI driver 140 is stored in the storage area in the corresponding device, the corresponding monitoring driver 150 may be stored in the same storage area as that in which the UEFI driver 140 is stored.

The UEFI drivers 140 to be monitored may be determined through the user's input operation, for example. As such UEFI drivers 140 to be monitored, the UEFI drivers 140 for controlling devices that have no involvement in the start of the OS program are selected, for example.

Devices having involvement in the start of the OS program include storage devices storing the OS boot loader and the OS program, and devices on the path connecting between a storage device in which the OS boot loader and the OS program are stored and the CPU 101. In FIG. 3, if the OS boot loader and the OS program are stored in any of the HDDs 111a, for example, the devices having involvement in the start of the OS program are the HDD 111a storing the OS boot loader and the OS program, the SAS interface 111, and the PCIe switch 109. Where the OS boot loader and the OS program are stored in an external device connected to the LAN interface 108, the LAN interface 108 also is a device having involvement in the start of the OS program.

UEFI applications 160 are programs describing the procedures of various processes executed in the environment created by the UEFI core 120. The UEFI applications 160 are called, for example, during the execution of the boot management firmware 130. In some cases, a UEFI application 160 is called during the execution of another UEFI application 160. Each UEFI application 160 may be stored either in the storage area of the corresponding device or in the FWH 106.

An interrupt handler 170 is called when an execution error of a UEFI driver 140 is detected by the WDT 102. In accordance with the interrupt handler 170, the CPU 101 stores, in the nonvolatile memory 107a of the BMC 107, information indicating the UEFI driver 140 with respect to which the error has been detected, and then resets the computer 100.

When the start of the computer 100 is requested, the CPU 101 first executes the UEFI core 120. The CPU 101 looks up the nonvolatile memory 107a to identify the UEFI driver 140 with respect to which error was detected when the computer 100 was started before, and skips the process using the identified UEFI driver 140. Consequently, the UEFI driver 140 with respect to which error was detected when the computer 100 was started before is not executed by the CPU 101, thus increasing the chances for the process to be continued through to the start of the OS program. Even if there is a UEFI driver 140 that is not made ready for use in the course of the start process, the OS boot loader can be read out from the device insofar as the UEFI driver 140 for controlling the storage device storing the OS boot loader as well as the UEFI driver 140 for controlling the device on the path between the storage device and the CPU 101 can be made ready for use, whereby the booting of the OS program can be started.

Figure 6:
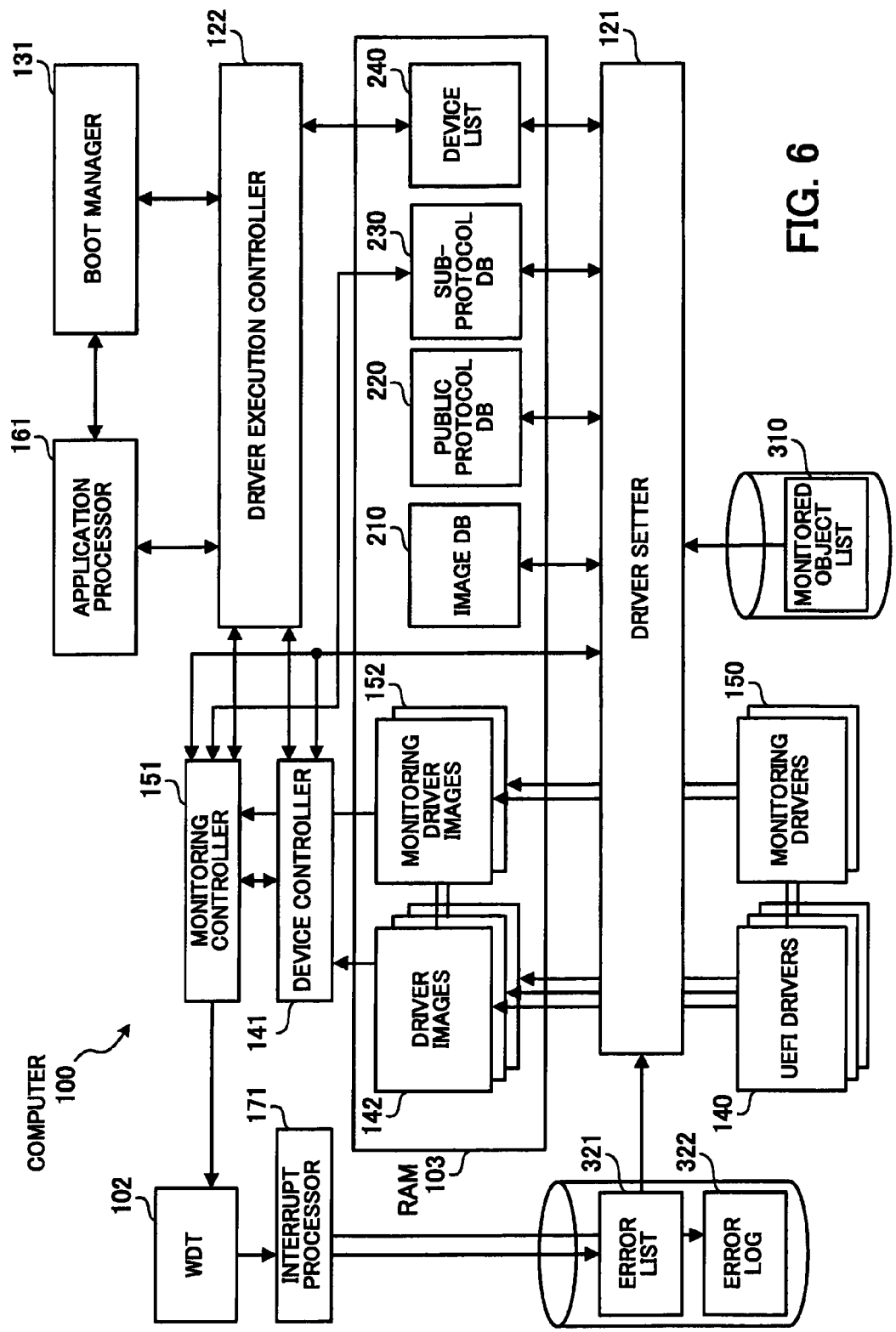
FIG. 6 is a block diagram illustrating processing functions implemented by the programs illustrated in FIG. 5.

FIG. 6 is a block diagram illustrating processing functions implemented by the programs illustrated in FIG. 5.

The computer 100 comprises a driver setter 121, a driver execution controller 122, a boot manager 131, a device controller 141, a monitoring controller 151, an application processor 161, and an interrupt processor 171.

The individual processes of the driver setter 121 and the driver execution controller 122 are implemented by executing the UEFI core 120 by the CPU 101. The process of the boot manager 131 is implemented by executing the boot management firmware 130 by the CPU 101. The process of the device controller 141 is implemented by executing the UEFI drivers 140 by the CPU 101, and the process of the monitoring controller 151 is implemented by executing the monitoring drivers 150 by the CPU 101. The process of the application processor 161 is implemented by executing the UEFI applications 160 by the CPU 101, and the process of the interrupt processor 171 is implemented by executing the interrupt handler 170 by the CPU 101.

The driver setter 121 performs the process of loading, into the RAM 103, the UEFI drivers 140 associated with all the devices connected to the computer 100, and making the corresponding devices controllable by using the loaded UEFI drivers 140. The UEFI drivers 140 loaded into the RAM 103 are called driver images 142. Also, when loading the UEFI drivers 140 into the RAM 103, the driver setter 121 looks up a monitored object list 310.

In the monitored object list 310, information about the UEFI drivers 140 to be monitored is registered in advance. In this embodiment, file GUIDs (Globally Unique IDs) by which the files of the UEFI drivers 140 to be monitored can be uniquely identified are registered in the monitored object list 310. A file GUID may be added to or deleted from the monitored object list 310 as needed in accordance with, for example, the user's input operation.

The monitored object list 310 is registered in a nonvolatile storage medium. The nonvolatile storage medium in which the monitored object list 310 is registered may be a storage medium that is accessible from the CPU 101 even when the UEFI drivers 140 are not executable yet just after the computer 100 is started. In this embodiment, the monitored object list 310 is stored in the FWH 106.

In the following description, the UEFI drivers 140 corresponding to the file GUIDs registered in the monitored object list 310 are referred to as "monitored UEFI drivers 140". Also, the UEFI drivers 140 corresponding to file GUIDs not registered in the monitored object list 310 are referred to as "unmonitored UEFI drivers 140".

When loading the monitored UEFI drivers 140, the driver setter 121 also loads, into the RAM 103, the monitoring drivers 150 corresponding to the UEFI drivers 140 in accordance with the monitored object list 310. The monitoring drivers 150 permit monitoring of the processes executed in accordance with the respective UEFI drivers 140. The monitoring drivers 150 loaded into the RAM 103 are called monitoring driver images 152.

Also, the driver setter 121 generates an image database (DB) 210, a public protocol database 220, a sub-protocol database 230 and a device list 240 in the RAM 103. The image database 210, the public protocol database 220 and the sub-protocol database 230 are generated by the driver setter 121 during the process of registration of the device list 240.

The device list 240 holds information that links the devices connected to the computer 100 with the respective UEFI drivers 140 used to control the devices. The device list 240 includes entries generated for the respective devices connected to the computer 100. Under each entry in the device list 240, a device path indicating the directory of a device is registered in association with function names indicating the member functions in the UEFI driver 140 associated with the device, and also with pointers used to call the respective member functions. Where a function name and its pointer are registered in the device list 240, the computer 100 can execute the member function which the registered pointer points to, so that the device corresponding to the member function can be controlled.

For an entry of the device corresponding to the unmonitored UEFI driver 140, pointers used to call the respective member functions in the UEFI driver 140 are registered in the device list 240. On the other hand, for an entry of the device corresponding to the monitored UEFI driver 140, pointers used to call the respective member functions in the monitoring driver 150 corresponding to the UEFI driver 140 are registered in the device list 240.

The driver setter 121 generates, in the image database 210, an entry corresponding to each of the UEFI drivers 140 and the monitoring drivers 150 loaded into the RAM 103 and registers information about each of the UEFI drivers 140 and the monitoring drivers 150. Also, by selecting one entry in the image database 210, the driver setter 121 registers, in the public protocol database 220 or the sub-protocol database 230, information about protocols included in the corresponding UEFI driver 140 or monitoring driver 150 loaded into the RAM 103. The protocol denotes herein a unit of service provided by the UEFI driver 140 and the monitoring driver 150, as described later.

The public protocol database 220 holds information about the protocols included in the unmonitored UEFI drivers 140, and information about the protocols included in the monitoring drivers 150 corresponding to the monitored UEFI drivers 140. The sub-protocol database 230, on the other hand, holds information about the protocols included in the monitored UEFI drivers 140.

Based on the protocol information registered in the public protocol database 220, the driver setter 121 registers, in the device list 240, function names and pointers indicating the respective member functions included in the individual registered protocols.

Consequently, the pointers used to call the respective member functions in the monitoring drivers 150 are registered in the device list 240, in place of the pointers used to call the respective member functions in the monitored UEFI drivers 140.

The information registered in the sub-protocol database 230 is looked up by the monitoring controller 151, described later, when a member function included in the monitoring driver 150 is executed on the basis of the pointer registered in the device list 240. In accordance with the information registered in the sub-protocol database 230, the monitoring controller 151 calls the member function in the UEFI driver 140 corresponding to the executed member function. Consequently, the member function in the UEFI driver 140 is executed and also the status of the process under execution is monitored by the monitoring controller 151.

Contents of the information registered in the image database 210, the public protocol database 220, the sub-protocol database 230 and the device list 240 will be described in detail later.

When a device access request is received from the boot manager 131 or the application processor 161, the driver execution controller 122 looks up the device list 240 and calls a member function in the corresponding UEFI driver 140.

The driver execution controller 122 receives information indicating a name shared by a plurality of devices, as a device access request, from the boot manager 131 or the application processor 161. For example, the driver execution controller 122 receives, from the boot manager 131 or the application processor 161, a common function name as a request for access of the same kind, regardless of the device to be accessed.

In the case of the process of reading out data from a device, for example, the control procedure described in the member function for implementing the control of reading out data from a device usually varies from device to device. When a request to read out data from a device is received from the boot manager 131 or the application processor 161, however, the driver execution controller 122 is given a common function name "Read( )" regardless of the device from which data is to be read out.

On accepting a common function name shared by multiple devices and device-specifying information (e.g., file path) from the boot manager 131 or the application processor 161, the driver execution controller 122 acquires, from the device list 240, the pointer corresponding to the specified function name and device. Then, the driver execution controller 122 transfers control to the member function which the acquired pointer points to, thereby calling the member function pointed to by the pointer.

Thus, regarding the information which the boot manager 131 and the application processor 161 specify when requesting the driver execution controller 122 to access a device, the common function name is used. Other information than the function names may also be formulated in conjunction with the individual function names. When data is to be written into a device, for example, a common function name "Write( )" indicating the member function for implementing the control of writing data, information indicating the device into which the data is to be written, and a filename indicating the file where the data is to be written may be specified with respect to the driver execution controller 122.

In this manner, the information specified when a device access is requested is shared among multiple devices, and it is therefore possible to provide the boot manager 131 and the application processor 161, which make a device access request, each with a device-independent interface. This is one of primary features of the process implemented by the UEFI core 120.

The device controller 141 is started each time a member function in the UEFI driver 140 loaded into the RAM 103 is called from the driver setter 121 or the driver execution controller 122. When started in response to a member function call from the driver setter 121, the device controller 141 executes the initial setting process by using the corresponding UEFI driver 140, as described later. On the other hand, when started in response to a member function call from the driver execution controller 122, the device controller 141 executes the access control with respect to the corresponding device.

The monitoring controller 151 is started when a member function in the monitoring driver 150 is called from the driver setter 121 or the driver execution controller 122. When calling a member function in the monitored UEFI driver 140, the driver setter 121 and the driver execution controller 122 call the corresponding member function in the monitoring driver 150 corresponding to the monitored UEFI driver 140. After the member function in the monitoring driver 150 is called, the monitoring controller 151 calls that member function in the UEFI driver 140 which corresponds to the called member function in the monitoring driver 150. Consequently, the device controller 141 is started to execute the process in accordance with the called member function. The monitoring controller 151 monitors the status of execution of the process by the device controller 141, in cooperation with the WDT 102.

The boot manager 131 is started when the boot management firmware 130 is executed by the CPU 101 after the process of registering information in the device list 240 by the driver setter 121 is completed, and controls the process sequence until the start of the OS program is initiated. The boot manager 131 accesses necessary devices via the driver execution controller 122 in the course of the process sequence. The device access process executed last by the boot manager 131 prior to the execution of the OS program is the process of reading out the OS boot loader from a device storing the OS program.

When reading out the OS boot loader, the boot manager 131 specifies, with respect to the driver execution controller 122, the function name "Read( )" and a file path indicating the directory where the file of the OS boot loader is located, for example. The file path of the OS boot loader includes the device path of the device storing the OS boot loader.

The driver execution controller 122 acquires, from the device list 240, the pointer of the member function corresponding to the device path and function name specified by the boot manager 131, and calls the member function which the pointer points to. Consequently, the device controller 141 is started to read out the OS boot loader indicated by the file path, from the target device. When the process of reading out the OS boot loader is completed, the driver execution controller 122 transfers control to the boot manager 131. The boot manager 131 starts the OS boot loader thus read out.

The application processor 161 executes various processes involving access to devices, in accordance with the UEFI applications 160. The application processor 161 accesses a device in the same manner as that in which the boot manager 131 accesses a device.

The OS boot loader read out under the control of the boot manager 131 is one of the UEFI applications 160. Since the process of the application processor 161 is implemented by the execution of a UEFI application 160 as stated above, the application processor 161 is started as soon as the OS boot loader is executed by the CPU 101. At this time, the application processor 161 requests the driver execution controller 122 to read out an OS loader, which is a start program dependent on the OS, from the device storing the OS program. When the OS loader is read out from the device, the application processor 161 starts the OS loader thus read out. Consequently, the OS program begins to be executed.

The interrupt processor 171 is started when a processing error is detected by the monitoring process performed by the monitoring controller 151 and the WDT 102. More specifically, if the process executed by the device controller 141 in accordance with a member function in the UEFI driver 140 is not normally completed within the fixed time, the WDT 102 notifies the CPU 101 of a processing error. When notified of such processing error, the CPU 101 executes the interrupt handler 170, with the result that the interrupt processor 171 is started.

The interrupt processor 171 registers, in an error list 321, information indicating the UEFI driver 140 with respect to which the processing error has been detected. In the error list 321 may be registered, for example, the protocol GUID of the protocol included in the UEFI driver 140, the device path of the device corresponding to the UEFI driver 140, and the file GUID identifying the file of the UEFI driver 140, as the information indicating the UEFI driver 140 with respect to which processing error has been detected.

The error list 321 is registered in a nonvolatile storage medium. The nonvolatile storage medium for registering the error list 321 may be a storage medium that can be accessed from the CPU 101 even when the UEFI drivers 140 are not executable yet after the start of the computer 100. In this embodiment, the error list 321 is registered in the nonvolatile memory 107a of the BMC 107.

The interrupt processor 171 registers, in the error list 321, information indicating the UEFI driver 140 with respect to which the processing error has been detected, and also registers information stated below, in an error log 322. The interrupt processor 171 registers, in the error log 322, information indicating the UEFI driver 140 or device with respect to which the processing error has occurred, the contents of the processing error, and the date and time of occurrence, for example. The error log 322 may be registered in a nonvolatile storage area and, in this embodiment, is registered in the nonvolatile memory 107a of the BMC 107.

After registering the information in the error list 321 and the error log 322, the interrupt processor 171 requests resetting of the computer 100.

When the driver setter 121 is started after the computer 100 is reset, the driver setter 121 looks up the error list 321 to identify a UEFI driver or drivers 140 with respect to which error was detected before the resetting of the computer 100. If any UEFI driver 140 with respect to which error was detected before the resetting is registered in the error list 321, the driver setter 121 does not register, in the device list 240, the pointers used to call the member functions in the UEFI driver 140 registered in the error list 321. Since the pointers are not registered in the device list 240, the boot manager 131 and the application processor 161 are unable to call the UEFI driver 140 with respect to which error was detected before the resetting, so that the access process with respect to the corresponding device can be skipped.

The driver setter 121 calls a member function in the UEFI driver 140 also before the pointers are registered in the device list 240, as described later. Specifically, the driver setter 121 calls member functions "Supported( )" and "Start( )" describing the procedure for executing the initial setting process by using the UEFI driver 140. In accordance with the error list 321, however, the driver setter 121 skips execution of the member functions "Supported( )" and "Start( )" included in the UEFI driver 140 with respect to which error was detected before the resetting.

With the configuration described above, error caused during the execution of the process by the device controller 141 is detected, and after the computer 100 is reset, execution of the member functions included in the UEFI driver 140 with respect to which the processing error has been detected is all skipped. Thus, by skipping execution of the member functions included in the UEFI drivers 140 with respect to which the processing error has been detected, it is possible to increase the chances for the process to be continued through to the start of the OS program. Namely, where the UEFI driver 140 with respect to which the processing error has been detected is a driver associated with a device having no involvement in the loading of the OS program, the process of starting the OS program can be completed even if execution of the UEFI driver 140 with respect to which the processing error has been detected is skipped.

Also, when calling a monitored UEFI driver 140, the driver setter 121 and the driver execution controller 122 call a member function in the corresponding monitoring driver 150. At this time, the monitoring controller 151 calls that member function in the UEFI driver 140 which corresponds to the called member function in the monitoring driver 150. Consequently, when the member function in the monitored UEFI driver 140 is executed, the process executed in accordance with the member function is monitored by the monitoring controller 151 and the WDT 102.

Figure 7:
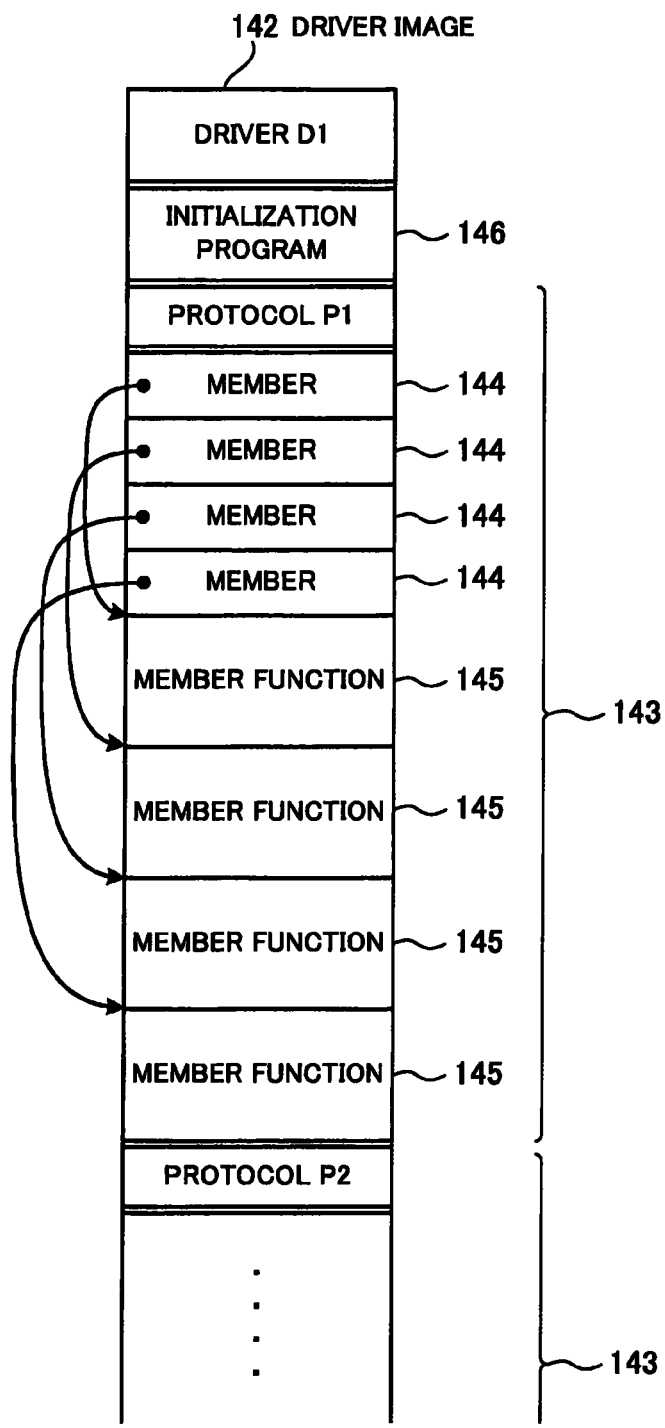
FIG. 7 illustrates an exemplary structure of a driver image.

The individual elements illustrated in FIG. 6 will be now described in detail. FIG. 7 illustrates an exemplary structure of the driver image.

The UEFI driver 140 is loaded into the RAM 103 by the driver setter 121. The driver image 142 illustrated in FIG. 7 indicates a state of the UEFI driver 140 loaded into the RAM 103.

The UEFI driver 140 includes one or more protocols 143. The protocol 143 designates a unit of service implemented by the UEFI driver 140. Each protocol is uniquely identified by its protocol GUID. The protocol GUID is described, for example, in the header of the storage area storing the corresponding protocol 143 in the UEFI driver 140.

One protocol 143 includes a plurality of members 144, and one member 144 includes a pointer pointing to one member function 145. The pointer included in each member 144 points to the beginning address of the storage area storing the corresponding member function 145, among the addresses within the driver image 142.

When a member function 145 is to be called, first, the member 144 corresponding to the member function to be called is read out by the CPU 101, and then the member function 145 pointed to by the pointer included in the read member 144 is read out and executed by the CPU 101.

The UEFI driver 140 also includes an initialization program 146 describing the procedure for registering the information about the protocols 143 in the public protocol database 220.

Figure 8:
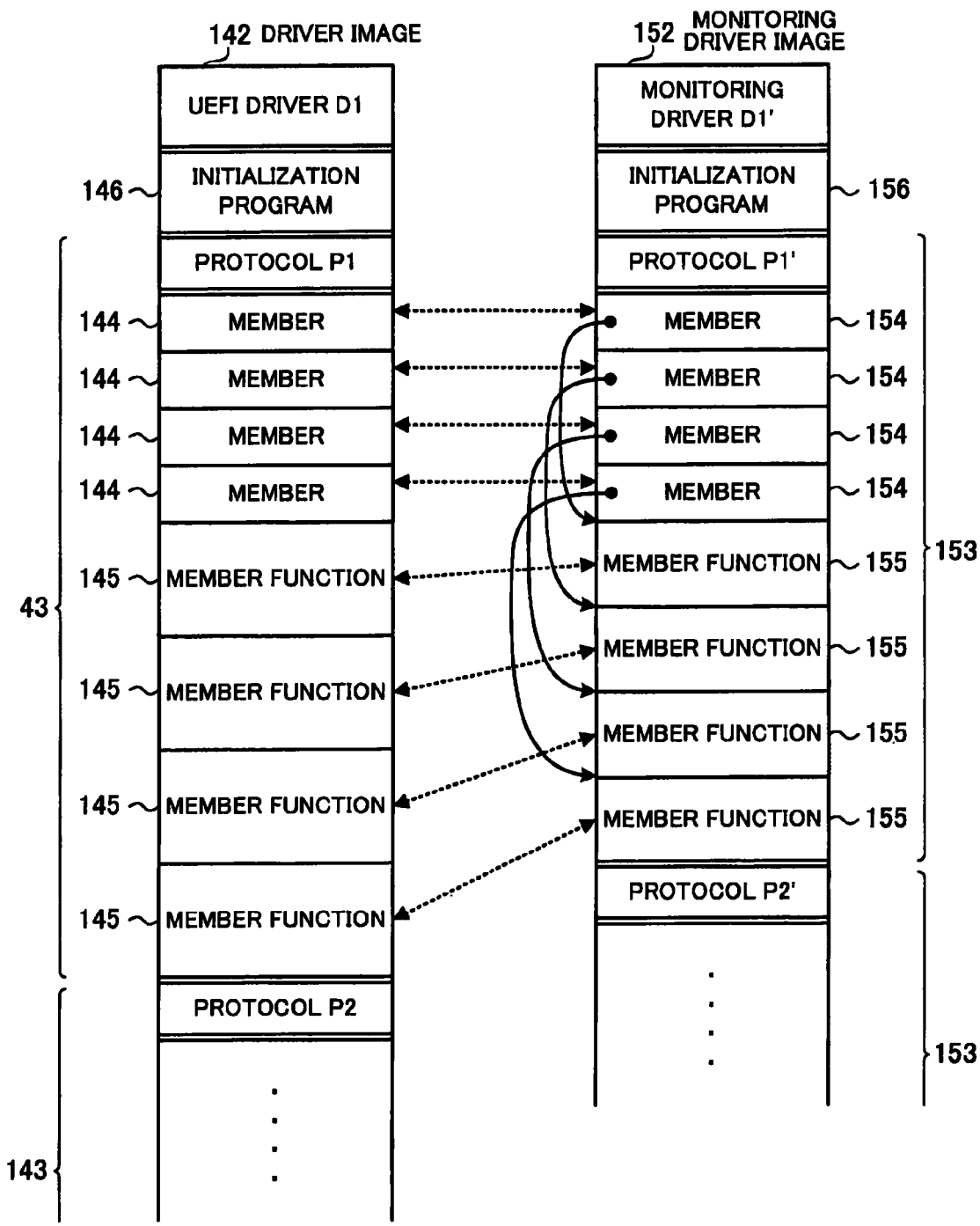
FIG. 8 illustrates an exemplary structure of a monitoring driver image.

FIG. 8 illustrates an exemplary structure of the monitoring driver image. By way of reference, FIG. 8 also illustrates the driver image of the UEFI driver 140 corresponding to the monitoring driver image.

The monitoring driver 150 includes protocols 153 equal in number to the protocols 143 included in the corresponding UEFI driver 140. The protocols 153 included in the monitoring driver 150 are identified by the same protocol GUIDs as those of the corresponding protocols 143 included in the UEFI driver 140. The protocol GUID is described, for example, in the header of the storage area storing the corresponding protocol 153 in the monitoring driver 150.

Also, each protocol 153 of the monitoring driver 150 includes members 154 equal in number to the members 144 included in the corresponding protocol 143 of the UEFI driver 140. Further, each protocol 153 of the monitoring driver 150 includes member functions 155 equal in number to the member functions 145 included in the corresponding protocol 143 of the UEFI driver 140. The member functions 155 included in the monitoring driver 150 are called using the same function names as those of the corresponding member functions included in the UEFI driver 140.

In FIG. 8, the members 144 and 154 having the same function names and the member functions 145 and 155 having the same functions names are indicated by dashed arrows.

Each member 154 included in the monitoring driver 150 includes a pointer pointing to a corresponding member function 155. The pointer included in each member 154 points to the beginning address of the storage area storing the corresponding member function 155, among the addresses within the monitoring driver image 152.

When a member function 155 is to be called, first, the member 154 corresponding to the member function to be called is read out by the CPU 101, and then the member function 155 pointed to by the pointer included in the read member 154 is read out and executed by the CPU 101. In the member function 155 is described the procedure for calling the corresponding member function 145 in the UEFI driver 140 and monitoring, by means of the WDT 102, the process executed in accordance with the called member function 145. When a member function 155 in the monitoring driver 150 is executed to call the corresponding member function 145 in the UEFI driver 140, the sub-protocol database 230 is looked up, as described later.

The monitoring driver 150 also includes an initialization program 156 describing the procedure for registering the information about the protocols 153 in the public protocol database 220.

Figure 9:
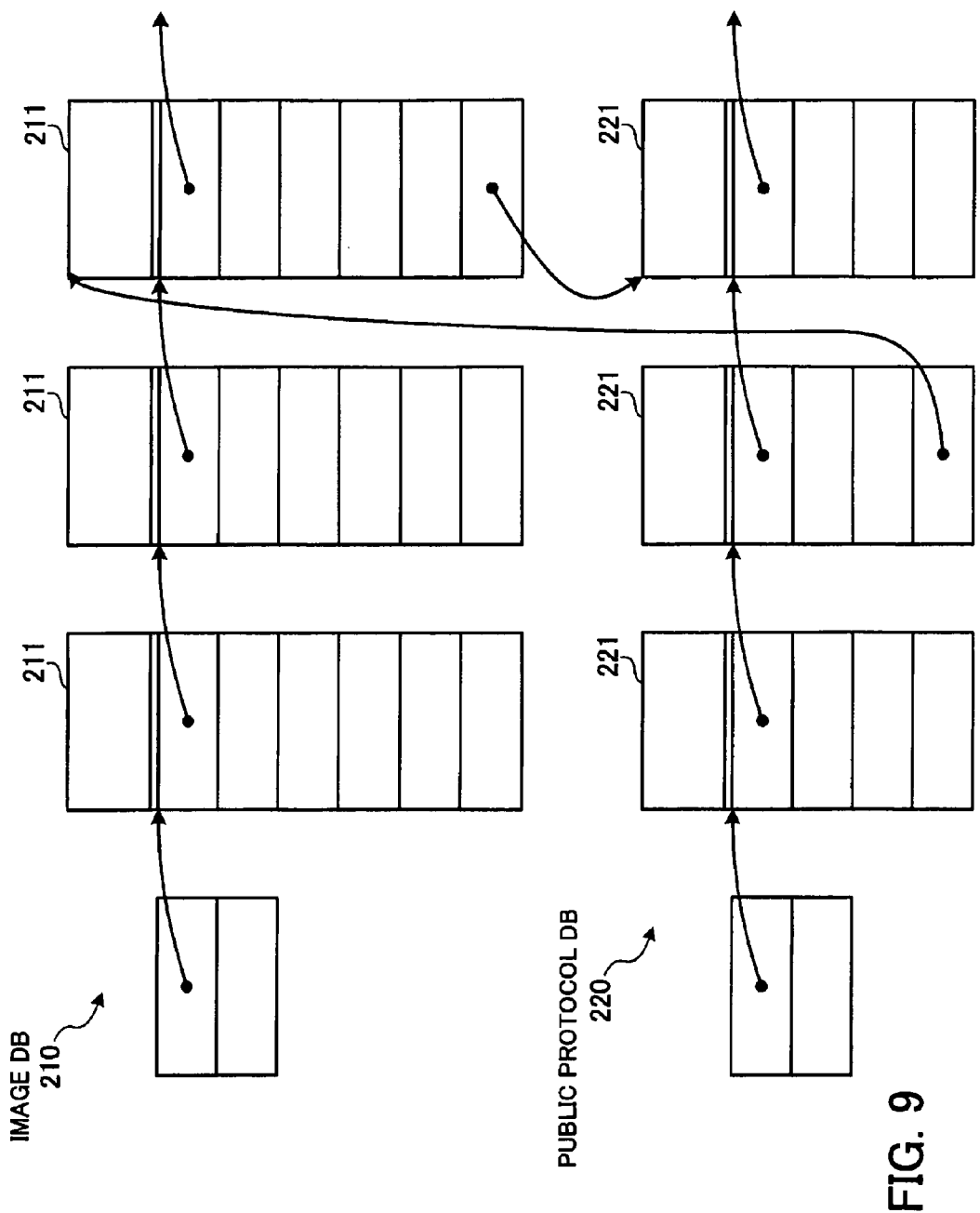
FIG. 9 illustrates an exemplary data structure of an image database (DB) and of a public protocol database.

FIG. 9 illustrates exemplary data structures of the image database and the public protocol database.

The image database 210 has one or more entries 211, and each entry 211 is linked to another so as to constitute a list structure. One entry 211 in the image database 210 corresponds to one UEFI driver 140 or one monitoring driver 150. Each time a UEFI driver 140 is loaded into the RAM 103, the driver setter 121 generates a corresponding entry 211 in the image database 210. Also, when a monitored UEFI driver 140 is loaded into the RAM 103, the driver setter 121 loads the corresponding monitoring driver 150 as well into the RAM 103. Each time a monitoring driver 150 is loaded into the RAM 103, the driver setter 121 generates a corresponding entry 211 in the image database 210.

The public protocol database 220 has one or more entries 221, and each entry 221 is linked to another so as to constitute a list structure. One entry 221 in the public protocol database 220 corresponds to one protocol included in the UEFI driver 140 or the monitoring driver 150. In the public protocol database 220, the following two kinds of entries 221 are generated: One is the entry 221 corresponding to a protocol 143 included in an unmonitored UEFI driver 140, and the other is the entry 221 corresponding to a protocol 153 included in the monitoring driver 150 corresponding to a monitored UEFI driver 140. An entry of the monitored UEFI driver 140 is generated in the sub-protocol database 230, instead of the public protocol database 220.

Each entry 221 in the public protocol database 220 has registered therein a pointer pointing to a corresponding entry 211 in the image database 210. Also, an entry 211 in the image database 210 has registered therein a pointer pointing to one or more entries 221 in the public protocol database 220, as the case may be.

Figure 10:
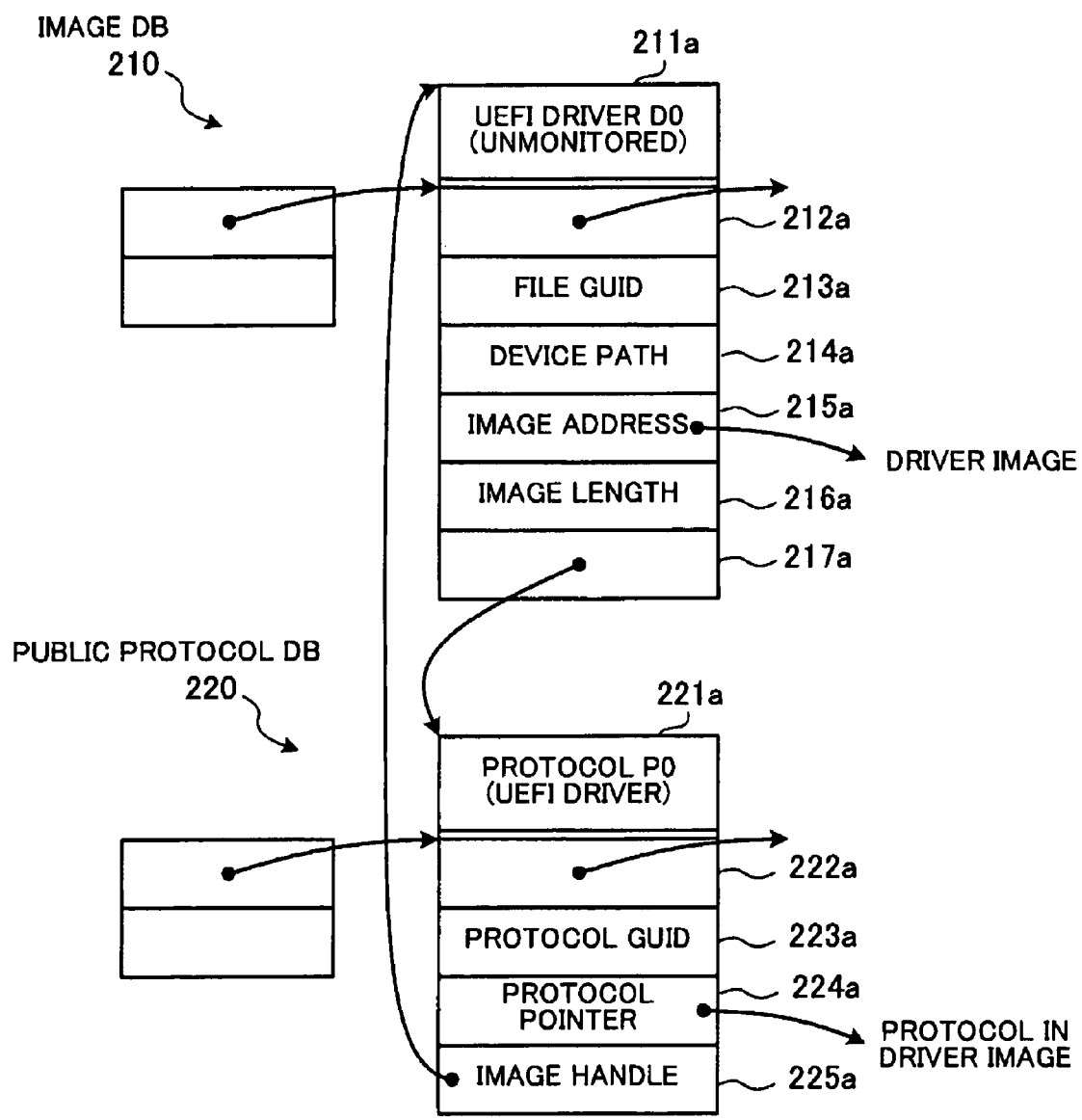
FIG. 10 illustrates exemplary entries in the image database and the public protocol database, the entries being related with a UEFI driver that is not monitored.

FIG. 10 illustrates exemplary entries in the image database and the public protocol database, the entries being associated with an unmonitored UEFI driver.

An entry 211a illustrated in FIG. 10 is one generated with respect to the UEFI driver 140, among the entries 211 generated in the image database 210. Where an unmonitored UEFI driver 140 is loaded into the RAM 103, only the entry 211a corresponding to the loaded UEFI driver 140 is generated in the image database 210.

The entry 211a corresponding to the UEFI driver 140 includes a pointer 212a, a file GUID 213a, a device path 214a, an image address 215a, an image length 216a, and a pointer 217a.

The pointer 212a points to the next entry 211 in the image database 210. The file GUID 213a is information that uniquely identifies the file of the UEFI driver 140 corresponding to this entry 211a, and the device path 214a indicates the directory of the device storing the file of the UEFI driver 140 corresponding to this entry 211a. The image address 215a is a pointer that points to the beginning of the driver image 142 corresponding to this entry 211a, and the image length 216a indicates the size of an address range that the driver image 142 corresponding to this entry 211a occupies in the RAM 103. The pointer 217a will be explained later.

Where an unmonitored UEFI driver 140 is loaded into the RAM 103, an entry 221a corresponding to a protocol 143 included in the loaded UEFI driver 140 is generated in the public protocol database 220. The entry 221a includes a pointer 222a, a protocol GUID 223a, a protocol pointer 224a, and an image handle 225a.

The pointer 222a points to the next entry 221 in the public protocol database 220. The protocol GUID 223a is identification information that uniquely identifies the protocol 143, and the protocol pointer 224a is a pointer pointing to the beginning of the corresponding protocol 143 in the driver image 142. The image handle 225a is a pointer that points to the beginning of the entry 211a of the UEFI driver 140 including the protocol 143, among the entries 211a in the image database 210.

The pointer 217a included in the entry 211a of the unmonitored UEFI driver 140, among those included in the entries 211a in the image database 210, points to that entry 221a in the public protocol database 220 which corresponds to the protocol 143 included in the same UEFI driver 140. The pointer 217a is registered in the entry 211a in the image database 210 after necessary information is registered in the corresponding entry 221a in the public protocol database 220.

Where a plurality of protocols 143 are included in an unmonitored UEFI driver 140, a plurality of entries 221a corresponding to the respective protocols 143 are generated in the public protocol database 220. Also, where an unmonitored UEFI driver 140 includes a plurality of protocols 143, as many pointers pointing to respective entries 221a in the public protocol database 220 corresponding to the respective protocols 143 are registered, as the pointer 217a, in the entry 211a of the image database 210.

By looking up the image database 210 and the public protocol database 220 configured as described above, it is possible for the driver setter 121 to perform the following process: Based on the image address 215a registered in the entry 211a in the image database 210, the driver setter 121 accesses the corresponding driver image 142. Also, based on the protocol pointer 224a registered in the entry 221a, the driver setter 121 accesses the corresponding protocol 143 in the driver image 142.

Figure 11:
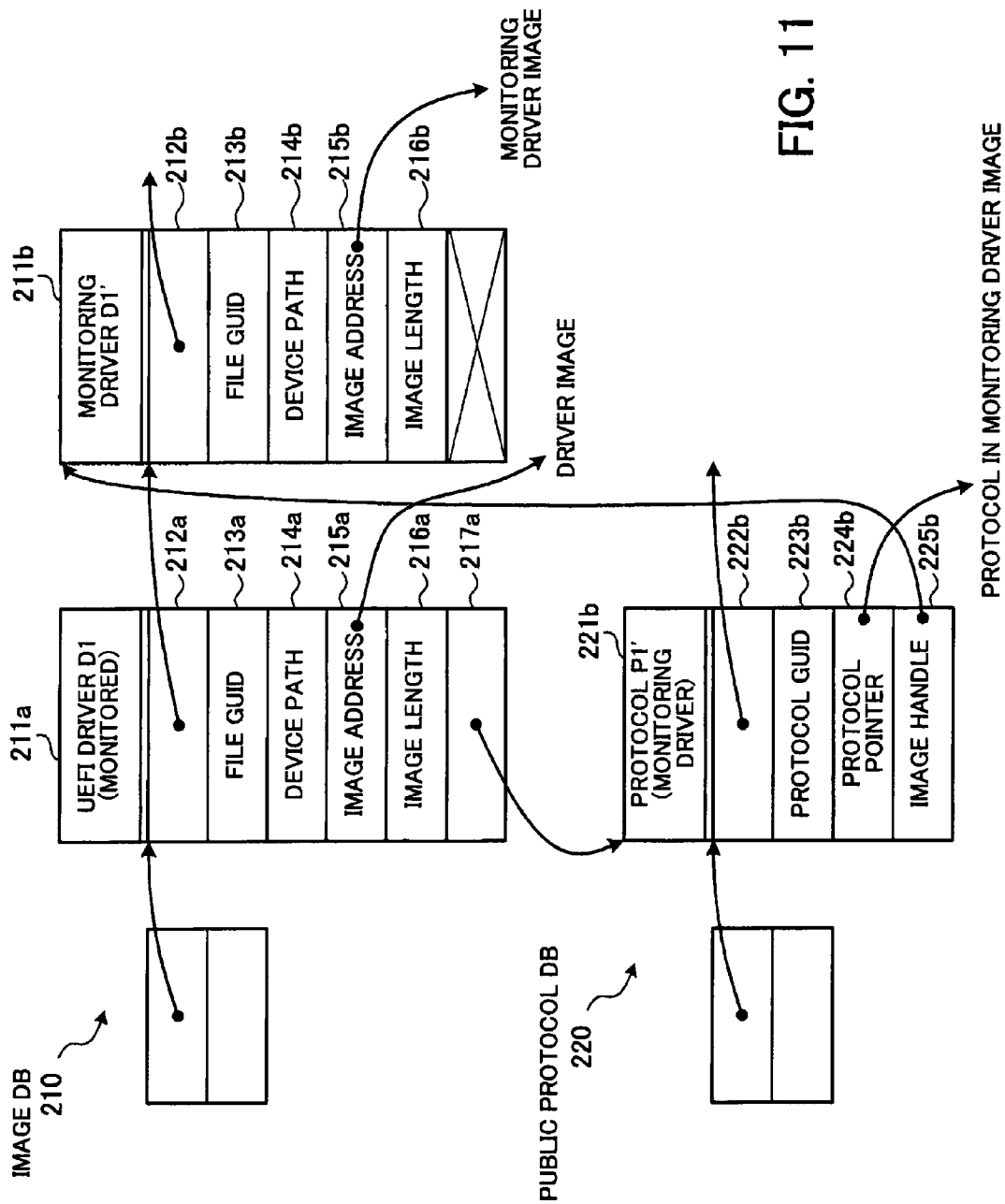
FIG. 11 illustrates exemplary entries in the image database and the public protocol database, the entries being related with a UEFI driver to be monitored.

FIG. 11 illustrates exemplary entries in the image database and the public protocol database, the entries being associated with a monitored UEFI driver.

Where a monitored UEFI driver 140 is loaded into the RAM 103, the monitoring driver 150 corresponding to the monitored UEFI driver 140 is also loaded into the RAM 103. Then, an entry 211b corresponding to the monitoring driver 150 is generated, along with the entry 211a corresponding to the monitored UEFI driver 140, in the image database 210.

The entry 211b corresponding to the monitoring driver 150 includes a pointer 212b, a file GUID 213b, a device path 214b, an image address 215b, and an image length 216b. The entry 211b corresponding to the monitoring driver 150 has no pointer registered therein that points to the beginning of an entry 221 in the public protocol database 220.

The pointer 212b points to the next entry 211 in the image database 210. The file GUID 213b is information that uniquely identifies the file of the monitoring driver 150 corresponding to this entry 211b, and the device path 214b indicates the directory of the device storing the file of the monitoring driver 150 corresponding to this entry 211b. The image address 215b is a pointer that points to the beginning of the monitoring driver image 152 corresponding to this entry 211b, and the image length 216b indicates the size of an address range that the monitoring driver image 152 corresponding to this entry 211b occupies in the RAM 103.

Where a monitored UEFI driver 140 is loaded into the RAM 103, an entry 221b corresponding to a protocol 153 included in the monitoring driver 150 is generated in the public protocol database 220. The entry 221b in the public protocol database 220 includes a pointer 222b, a protocol GUID 223b, a protocol pointer 224b, and an image handle 225b.

The pointer 222b points to the next entry 221 in the public protocol database 220. The protocol GUID 223b is identification information that uniquely identifies the protocol 153, and the protocol pointer 224b points to the beginning of the corresponding protocol 153 in the monitoring driver image 152. The image handle 225b is a pointer that points to the beginning of the entry 211b of the monitoring driver 150 including the protocol 153, among the entries 211b in the image database 210.

The pointer 217a included in the entry 211a of the monitored UEFI driver, among those included in the entries 211a of the image database 210, points to that entry 221b in the public protocol database 220 which corresponds to the protocol 153 in the corresponding monitoring driver 150.

Where a plurality of protocols 143 are included in a monitored UEFI driver 140, the monitoring driver 150 corresponding to the monitored UEFI driver 140 includes an equal number of protocols 153. In this case, a plurality of entries 221b corresponding to the respective protocols 153 are generated in the public protocol database 220. Also, a plurality of pointers pointing to the respective entries 221b in the public protocol database 220 corresponding to the respective protocols 153 are registered, as the pointer 217a, in the entry 211a in the image database 210.

The driver setter 121 looks up the image database 210 and the public protocol database 220 configured as described above, so that the process stated below can be executed. Based on the image address 215a registered in the entry 211a in the image database 210, the driver setter 121 accesses the corresponding driver image 142. Also, based on the image address 215b registered in the entry 211b in the image database 210, the driver setter 121 accesses the corresponding monitoring driver image 152. Further, based on the protocol pointer 224b registered in the entry 221b, the driver setter 121 accesses the corresponding protocol 153 in the monitoring driver image 152.

Figure 12:
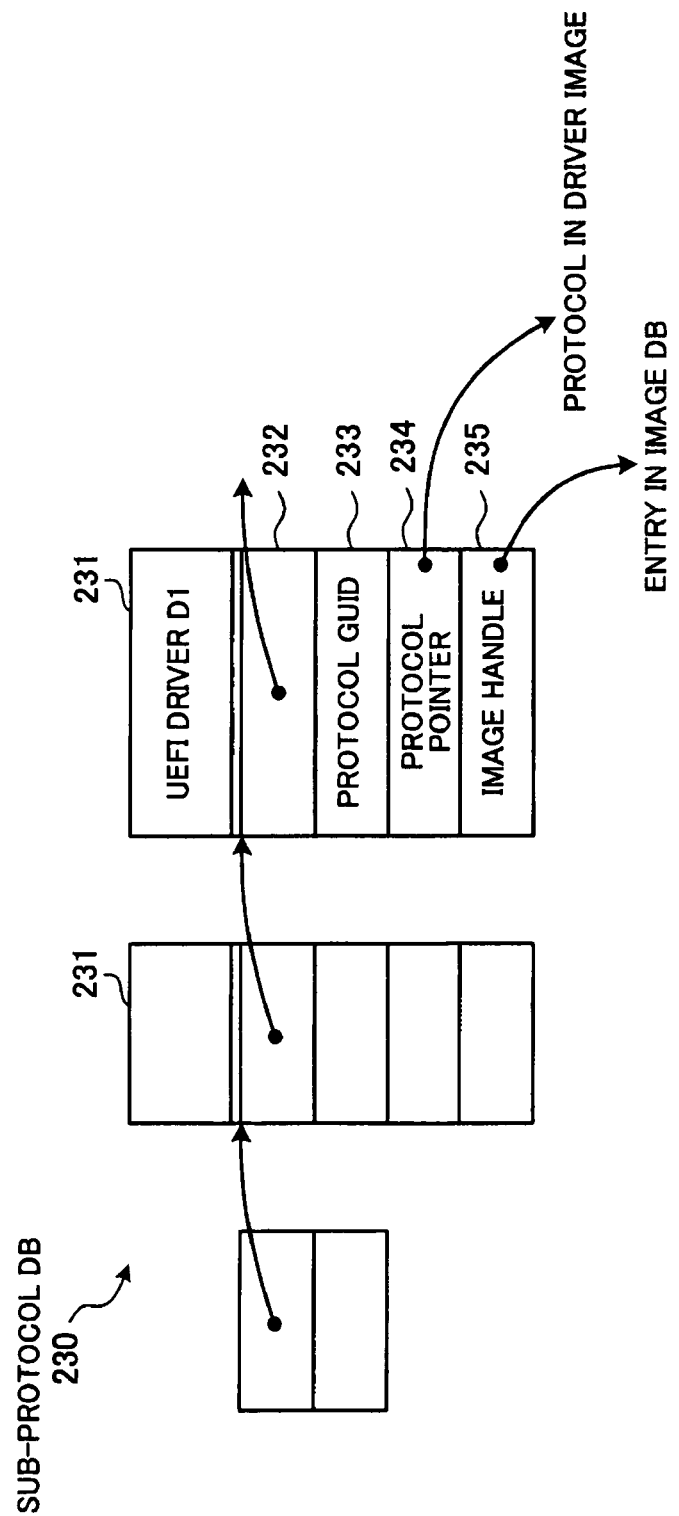
FIG. 12 illustrates an exemplary data structure of a sub-protocol database (DB)

FIG. 12 illustrates an exemplary data structure of the sub-protocol database.

The basic data structure of the sub-protocol database 230 is identical with that of the public protocol database 220. Namely, the sub-protocol database 230 has one or more entries, and each entry is linked to another so as to constitute a list structure.

In the sub-protocol database 230, an entry 231 corresponding to a protocol 143 included in a monitored UEFI driver 140 is generated. One entry 231 in the sub-protocol database 230 corresponds to one protocol in the UEFI driver 140. Thus, where a plurality of protocols 143 are included in a monitored UEFI driver 140, a plurality of entries 231 corresponding to the respective protocols 143 are generated in the sub-protocol database 230.

Each entry 231 in the sub-protocol database 230 includes a pointer 232, a protocol GUID 233, a protocol pointer 234, and an image handle 235. The pointer 232 points to the next entry 231 in the pub-protocol database 230. The protocol GUID 233 is identification information that uniquely identifies the protocol 143, and the protocol pointer 234 points to the beginning of the corresponding protocol 143 in the driver image 142. The image handle 235 is a pointer that points to the beginning of the entry 211a of the UEFI driver 140 including the protocol 143, among the entries 211a in the image database 210.

The information registered in the sub-protocol database 230 is looked up by the monitoring controller 151 when a member function included in the monitoring driver 150 is executed in accordance with the pointer registered in the device list 240, as stated above. Based on the information registered in the sub-protocol database 230, the monitoring controller 151 calls that member function in the UEFI driver 140 which corresponds to the executed member function. Consequently, the member function in the UEFI driver 140 is executed and also the status of the process under execution is monitored by the monitoring controller 151. The process of calling a member function in the monitored UEFI driver 140 by using the sub-protocol database 230 will be explained in detail later with reference to FIG. 18.

FIG. 13 illustrates an exemplary data structure of the device list.

In the device list 240, an entry 241 is generated with respect to each device. Each entry 241 holds information registered under a device path 242 of the corresponding device, a protocol GUID 243, a function name 244, and a pointer 245.

The device path 242 is information indicating the directory of the device corresponding to the entry 241. The protocol GUID 243 is identification information that identifies the protocol 143 included in the UEFI driver 140 for controlling the device corresponding to the entry 241. Where a UEFI driver 140 includes a plurality of protocols 143, protocol GUIDs 243 identifying the respective protocols 143 are registered in one entry 241 of the device list 240.

The function name 244 indicates the name of the member function 145 included in the protocol 143. Usually, a plurality of function names 244 are registered with respect to one protocol GUID 243. The pointer 245 points to that member in the driver image 142 or the monitoring driver image 152 which corresponds to the function name 244. The pointer 245 is used to call that member function 145 in the UEFI driver 140 which corresponds to the function name 244.

Where a UEFI driver 140 includes a plurality of protocols 143, the function names 244 and the pointers 245 are registered in association with a corresponding one of the protocol GUIDs 243 corresponding to the respective protocols 143.

Information registered as the pointer 245 differs depending on whether the entry 241 to which the pointer 245 belongs is for a device corresponding to a monitored UEFI driver 140 or not. In the entry 241 for a device corresponding to an unmonitored UEFI driver 140, a pointer pointing to that member 144 in the driver image 142 which corresponds to the function name 244 is registered as the pointer 245. On the other hand, in the entry 241 for a device corresponding to a monitored UEFI driver 140, a pointer pointing to that member 154 in the monitoring driver image 152 which corresponds to the function name 244 is registered as the pointer 245. In the example illustrated in FIG. 13, the UEFI driver 140 associated with "DEVICE D0" is an unmonitored UEFI driver, and the UEFI driver 140 associated with "DEVICE D1" is a monitored UEFI driver.

The driver execution controller 122 receives, from the boot manager 131 or the application processor 161, a request to call a member function 145 included in a certain UEFI driver 140. The boot manager 131 or the application processor 161 makes such a call request to the driver execution controller 122 by specifying the device path and the function name. The driver execution controller 122 acquires, from the device list 240, the pointer pointing to the member 144 corresponding to the specified device path and function name, and calls the member function 145 in accordance with the pointer.

Where the member function 145 with respect to which a call request has been made is included in an unmonitored UEFI driver 140, the driver execution controller 122 directly calls the member function 145 in the UEFI driver 140 in accordance with the pointer 245 in the device list 240. As a result, the device controller 141 is started.

On the other hand, where the member function 145 with respect to which a call request has been made is included in a monitored UEFI driver 140, the driver execution controller 122 calls the member function 155 with the same function name in the monitoring driver 150, in accordance with the pointer 245 in the device list 240. Consequently, the monitoring controller 151 is started. The monitoring controller 151 causes the WDT 102 to start counting and also looks up the sub-protocol database 230. Then, the monitoring controller 151 selects, from the sub-protocol database 230, the entry 231 wherein the protocol GUID 233 of the protocol 153 to which the called member function 155 belongs is registered. In accordance with the protocol pointer 234 registered in the selected entry 231, the monitoring controller 151 calls the corresponding member function 145 in the UEFI driver 140. As a result, the device controller 141 is started.

As stated above in connection with the device list 240, where the entry 241 to which the pointer 245 belongs is for a device corresponding to a monitored UEFI driver 140, information that points to the member function 155 in the monitoring driver 150 is registered as the pointer 245 in the device list 240. Consequently, when a member function 145 in a monitored UEFI driver 140 is called, the member function 155 in the monitoring driver 150 is also called, in addition to the member function 145 in the monitored UEFI driver 140. Where a monitored UEFI driver 140 is called via the driver execution controller 122, therefore, the status of execution of the called UEFI driver 140 is monitored by the monitoring controller 151 and the WDT 102.

The driver setter 121 registers nothing in the field of the pointer 245 of the entry 241 associated with a device whose device path is registered in the error list 321. An initial value of the pointer is "NULL". Thus, where the driver setter 121 registers nothing as the pointer, "NULL" remains intact as the value of the pointer 245.

Figure 14:
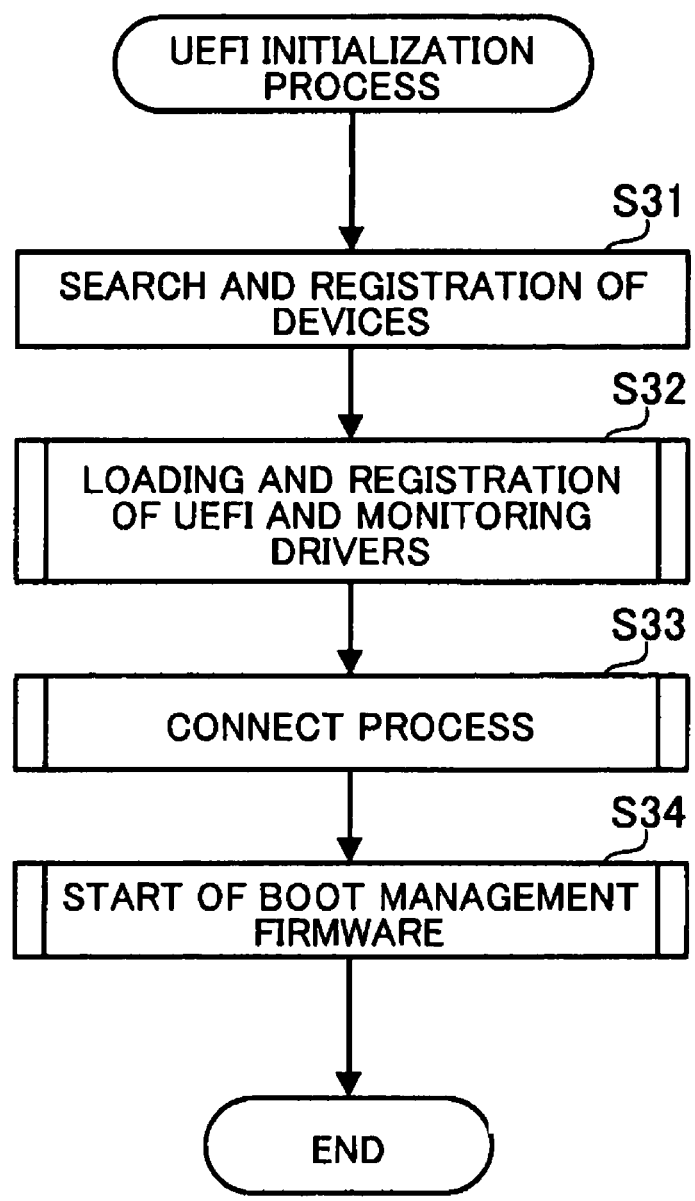
FIG. 14 is a flowchart illustrating a whole procedure of the initialization process according to the UEFI.

The initialization process according to the UEFI will be now described with reference to flowcharts and sequence diagrams. FIG. 14 is a flowchart illustrating a whole procedure of the UEFI initialization process.

Step S31: After the execution of Step S11 illustrated in FIG. 4 is completed, the CPU 101 of the computer 100 executes the UEFI core 120. Consequently, the driver setter 121 and the driver execution controller 122 are started.

The driver setter 121 searches for devices connected to the computer 100 and registers, in the RAM 103, information indicating the recognized devices. As such devices, the LAN interface 108, the PCIe switches 109 and 110, the I/O devices 110a, the SAS interface 111, the HDDs 111a and the like are recognized, for example. At this time, the driver setter 121 registers the device paths of the recognized devices in the device list 240.

Step S32: The driver setter 121 loads, into the RAM 103, the UEFI drivers 140 associated with the devices recognized in Step S31, and generates the driver images 142. Each time a UEFI driver 140 is loaded into the RAM 103, the driver setter 121 generates, in the image database 210, an entry 211a corresponding to the loaded UEFI driver 140.

Also, if the file GUID of the loaded UEFI driver 140 coincides with any one registered in the monitored object list 310, the driver setter 121 loads, into the RAM 103, the monitoring driver 150 corresponding to the loaded UEFI driver 140. Consequently, a monitoring driver image 152 is generated in the RAM 103. Each time a monitoring driver 150 is loaded into the RAM 103, the driver setter 121 generates, in the image database 210, an entry 211b corresponding to the loaded monitoring driver 150.

Further, the driver setter 121 registers, in either the public protocol database 220 or the sub-protocol database 230, information about the protocols 143 included in the UEFI driver 140 loaded into the RAM 103.

Where the loaded UEFI driver 140 is an unmonitored UEFI driver, the driver setter 121 registers, in the public protocol database 220, information about the protocols 143 included in the UEFI driver 140.

On the other hand, where the loaded UEFI driver 140 is a monitored UEFI driver, the driver setter 121 registers, in the sub-protocol database 230, information about the protocols 143 included in the UEFI driver 140. In addition, the driver setter 121 registers, in the public protocol database 220, information about the protocols 153 included in the monitoring driver 150 corresponding to the UEFI driver 140.

The above process of registering protocol information in the public protocol database 220 and the sub-protocol database 230 is called "protocol installation".

Step S33: The driver setter 121 executes a "connect process" by which each UEFI driver 140 loaded into the RAM 103 is made to be able to execute the access control with respect to the corresponding device. In the connect process, the driver setter 121 calls the member functions "Supported( )" and "Start( )" included in the UEFI driver 140, to start the device controller 141.

In accordance with the member functions "Supported( )" and "Start( )", the device controller 141 executes the initial setting process for the UEFI driver 140. As the last step of the initial setting process, the device controller 141 requests the driver setter 121 to register, in the field of the pointer 245 in the device list 240, pointers pointing to all members 144 included in the UEFI driver 140.

When calling the member function "Supported( )" in a monitored UEFI driver 140, the driver setter 121 calls the member function "Supported( )" included in the monitoring driver 150 corresponding to the UEFI driver 140. Similarly, when calling the member function "Start( )" in a monitored UEFI driver 140, the driver setter 121 calls the member function "Start( )" included in the monitoring driver 150 corresponding to the UEFI driver 140.

When the member functions "Supported( )" and "Start( )" included in the monitoring driver 150 are called, the monitoring controller 151 is started. In accordance with the member functions "Supported( )" and "Start( )", the monitoring controller 151 causes the WDT 102 to start counting and also calls the member functions "Supported( )" and "Start( )" included in the UEFI driver 140 corresponding to the monitoring driver 150.

With respect to the UEFI driver 140 associated with a device whose device path is registered in the error list 321, the driver setter 121 skips the connect process. Among the entries 241 in the device list 240, the entry 241 of the device corresponding to the UEFI driver 140 with respect to which the connect process has been skipped has "NULL" as the value of the pointer 245.

Step S34: The driver setter 121 calls the boot management firmware 130 to start the boot manager 131. The boot manager 131 requests the driver execution controller 122 to read out the OS boot loader.

Specifically, the boot manager 131 specifies, with respect to the driver execution controller 122, the function name "Read( )" and the file path of the OS boot loader. The driver execution controller 122 acquires, from the field of the pointer 245 in the device list 240, the pointer of the member 144 specified by the device path included in the file path and by the function name, and calls the member function pointed to by the acquired pointer. In this case, however, the called member function can either be the member function 145 included in a UEFI driver 140 or the member function 155 included in a monitoring driver 150.

When the member function 145 included in a UEFI driver 140 is called, the device controller 141 is started. The device controller 141 thus started reads out, from the target device, the OS boot loader indicated by the file path.

On the other hand, when the member function 155 included in a monitoring driver 150 is called, the monitoring controller 151 is started. The monitoring controller 151 first causes the WDT 102 to start counting and then calls the function "Read( )" included in the corresponding UEFI driver 140. Consequently, the device controller 141 is started to read out the OS boot loader from the target device.

On completion of the readout of the OS boot loader, the driver execution controller 122 transfers control back to the boot manager 131. The boot manager 131 starts the OS boot loader, and as a result, the application processor 161 is started.

The application processor 161 requests the driver execution controller 122 to read out the OS loader from the device storing the OS program. Thus, the OS loader is read out from the device, and the application processor 161 starts the OS loader. Consequently, the OS program is started.

The boot manager 131 may call various UEFI applications 160 other than the OS boot loader prior to the start of the OS boot loader. Such UEFI applications 160 to be called may, for example, be an application for performing the process of outputting, in response to a request from an external control terminal, device control information to the control terminal, or an application for performing the process of changing the settings of the device control information. In this case, communication with the control terminal is carried out via the LAN interface 108, for example. When the UEFI application 160 for implementing the communication with the control terminal is executed, therefore, the UEFI driver 140 associated with the LAN interface 108 is called by the application processor 161.

Also, when a function name is specified by the boot manager 131 or the application processor 161 but no pointer that points to the member function with the specified function name is registered in the device list 240, the driver execution controller 122 returns "NULL" to the boot manager 131 or the application processor 161. When "NULL" is received from the driver execution controller 122, the boot manager 131 or the application processor 161 executes the subsequent process, if any.

For example, after requesting the driver execution controller 122 to read out the OS boot loader from a certain device, the boot manager 131 may receive "NULL" from the driver execution controller 122. In such a case, if there is another device storing the OS boot loader, the boot manager 131 requests the driver execution controller 122 to read out the OS boot loader from that device.

Figure 15:
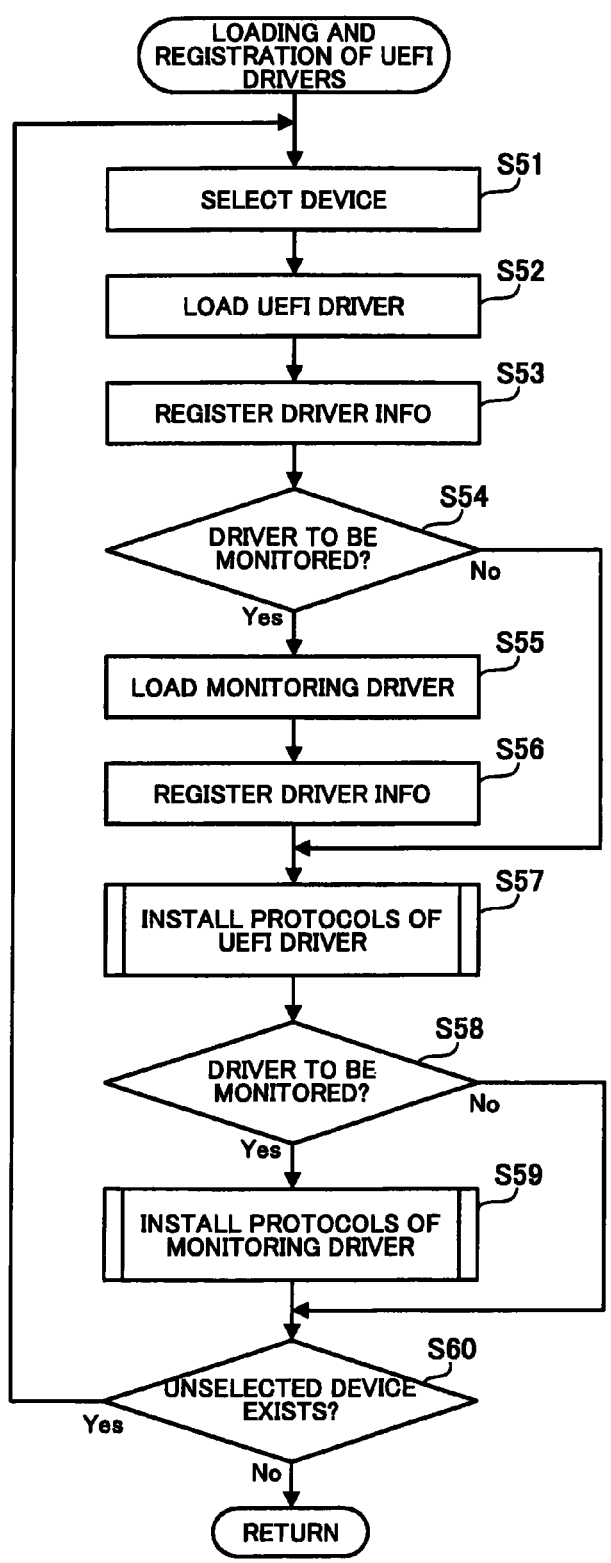
FIG. 15 is a flowchart illustrating the procedure of the process executed in Step S32 in FIG. 14.

FIG. 15 is a flowchart illustrating the procedure of the process executed in Step S32 in FIG. 14.

Step S51: The driver setter 121 selects one entry 241 in the device list 240, thereby selecting a device connected to the computer 100.

Step S52: The driver setter 121 loads, into the RAM 103, the UEFI driver 140 associated with the device selected in Step S51. For example, the driver setter 121 loads, into the RAM 103, the UEFI driver 140 of which the file path includes the device path of the device selected in Step S51. The driver image 142 of the loaded UEFI driver 140 is generated in the RAM 103.

Step S53: The driver setter 121 generates, in the image database 210, an entry 211a corresponding to the loaded UEFI driver 140. Then, the driver setter 121 registers, in the generated entry 211a, the file GUID 213a, device path 214a, image address 215a and image length 126a of the UEFI driver 140 loaded in Step S52.

Step S54: On the basis of the information registered in the monitored object list 310, the driver setter 121 determines whether or not the UEFI driver 140 loaded in Step S52 is to be monitored. If the file GUID of the loaded UEFI driver 140 coincides with any one registered in the monitored object list 310, the driver setter 121 judges that the loaded UEFI driver 140 is to be monitored.

The driver setter 121 executes Step S55 if the loaded UEFI driver 140 is to be monitored (Yes in S54), and executes Step S57 if the loaded UEFI driver 140 need not be monitored (No in S54).

Step S55: The driver setter 121 loads, into the RAM 103, the monitoring driver 150 corresponding to the loaded UEFI driver 140. The monitoring driver image 152 of the loaded monitoring driver 150 is generated in the RAM 103.

Step S56: The driver setter 121 generates, in the image database 210, an entry 211b corresponding to the loaded monitoring driver 150. Subsequently, the driver setter 121 registers, in the generated entry 211b, the file GUID 213b, device path 214b, image address 215b and image length 126b of the monitoring driver 150 loaded in Step S55.

The driver setter 121 executes the aforementioned Steps S51 through S56 in accordance with the description of a function "LoadImage( )" included in the UEFI core 120. After the execution of Step S56, the driver setter 121 continues its process in accordance with a function "Dispatch( )" included in the UEFI core 120, so that the following Steps S57 to S60 are executed.

Step S57: The computer 100 starts to install the protocols 143 included in the UEFI driver 140 loaded into the RAM 103. The procedure for installing the protocols 143 will be described with reference to FIG. 16.

Step S58: Based on the information registered in the monitored object list 310, the driver setter 121 determines whether or not the UEFI driver 140 loaded in Step S52 is to be monitored. If the file GUID of the loaded UEFI driver 140 coincides with any one registered in the monitored object list 310, the driver setter 121 judges that the loaded UEFI driver 140 is to be monitored.

The driver setter 121 executes Step S59 if the loaded UEFI driver 140 is to be monitored (Yes in S58), and executes Step S60 if the loaded UEFI driver 140 need not be monitored (No in S58).

In order to judge whether the loaded UEFI driver 140 is to be monitored or not, the driver setter 121 may determine whether or not any monitoring driver 150 was loaded in Step S55, or whether or not any entry 211b was generated in Step S56.

Step S59: The computer 100 starts to install the protocols 153 included in the monitoring driver 150 loaded into the RAM 103. The procedure for installing the protocols 153 will be described with reference to FIG. 17.

Step S60: The driver setter 121 looks up the device list 240 to determine whether there is an unselected device or not. The driver setter 121 executes Step S51 if it is judged that there is an unselected device, and executes Step S33 in FIG. 14 if it is judged that there is no unselected device.

Figure 16:
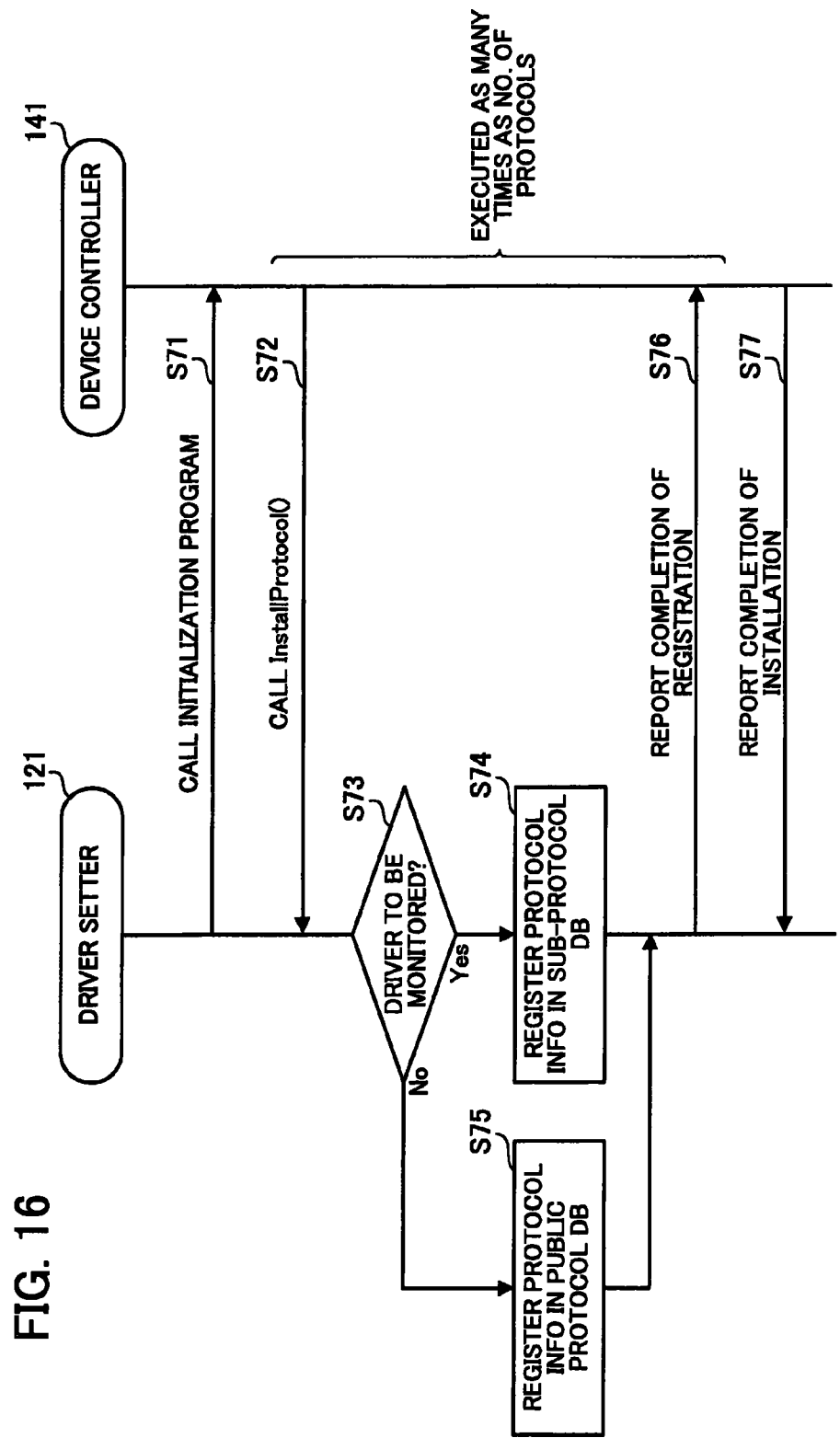
FIG. 16 is a sequence diagram illustrating the procedure of the process executed in Step S57 in FIG. 15.

FIG. 16 is a sequence diagram illustrating the procedure of the process executed in Step S57 in FIG. 15.

Step S71: The driver setter 121 calls the initialization program 146 included in the UEFI driver 140 loaded in Step S52. The initialization program 146 is called by transferring control to the beginning of the driver image 142 in accordance with the image address 215a registered in the entry 211a in the image database 210. The device controller 141 is started as soon as the called initialization program 146 is executed by the CPU 101.

Step S72: In accordance with the initialization program 146, the device controller 141 calls a function "InstallProtocol( )" included in the UEFI core 120. At this time, the device controller 141 notifies the driver setter 121 of the protocol GUID of a protocol 143 included in the UEFI driver 140, as an argument.

The driver setter 121 executes the following Steps S73 to S75 in accordance with the description of the function "InstallProtocol( )".

Step S73: Based on the information registered in the monitored object list 310, the driver setter 121 determines whether or not the UEFI driver 140 loaded in Step S52 is to be monitored. If the file GUID of the loaded UEFI driver 140 coincides with any one registered in the monitored object list 310, the driver setter 121 judges that the loaded UEFI driver 140 is to be monitored.

The driver setter 121 executes Step S74 if the loaded UEFI driver 140 is to be monitored (Yes in S73), and executes Step S75 if the loaded UEFI driver 140 need not be monitored (No in S73).

In order to judge whether the loaded UEFI driver 140 is to be monitored or not, the driver setter 121 may determine whether or not any monitoring driver 150 was loaded in Step S55, or whether or not any entry 211b was generated in Step S56.

Step S74: The driver setter 121 generates, in the sub-protocol database 230, an entry 231 corresponding to the loaded UEFI driver 140. The driver setter 121 then registers, in the field of the protocol GUID 243 in the generated entry 231, the protocol GUID received from the device controller 141 in Step S72. Also, the driver setter 121 registers, in the entry 231, the protocol pointer 234 and image handle 235 of the protocol 143 corresponding to the protocol GUID.

Step S75: The driver setter 121 generates an entry 221a of the UEFI driver 140 in the public protocol database 220. Then, the driver setter 121 registers, in the field of the protocol GUID 223a in the generated entry 221a, the protocol GUID received from the device controller 141 in Step S72. Also, the driver setter 121 registers a pointer pointing to that protocol 143 in the UEFI driver 140 which corresponds to the protocol GUID, in the field of the protocol pointer 224a in the entry 221a. Further, the driver setter 121 registers, in the field of the image handle 225a in the entry 221a, a pointer pointing to the entry 211a generated in the image database 210 in Step S53. Moreover, the driver setter 121 registers a pointer pointing to the beginning of the generated entry 221b in the field of the pointer 217a in the entry 211a generated in Step S53.

Step S76: The driver setter 121 notifies the device controller 141 that the registration process with respect to the protocol database has been completed.

Where a plurality of protocols 143 are included in the UEFI driver 140 loaded into the RAM 103 in Step S52, the device controller 141 repeatedly executes Step S72 a number of times corresponding to the number of the protocols 143 included in the UEFI driver 140. Each time Step S72 is executed, the device controller 141 notifies the driver setter 121 of the protocol GUID of a different protocol 143 included in the UEFI driver 140. Consequently, information about all the protocols 143 included in the UEFI driver 140 is registered in the public protocol database 220 or the sub-protocol database 230.

Step S77: The device controller 141 notifies the driver setter 121 of the completion of the installation process. Subsequently, Step S58 in FIG. 15 is executed.

Figure 17:
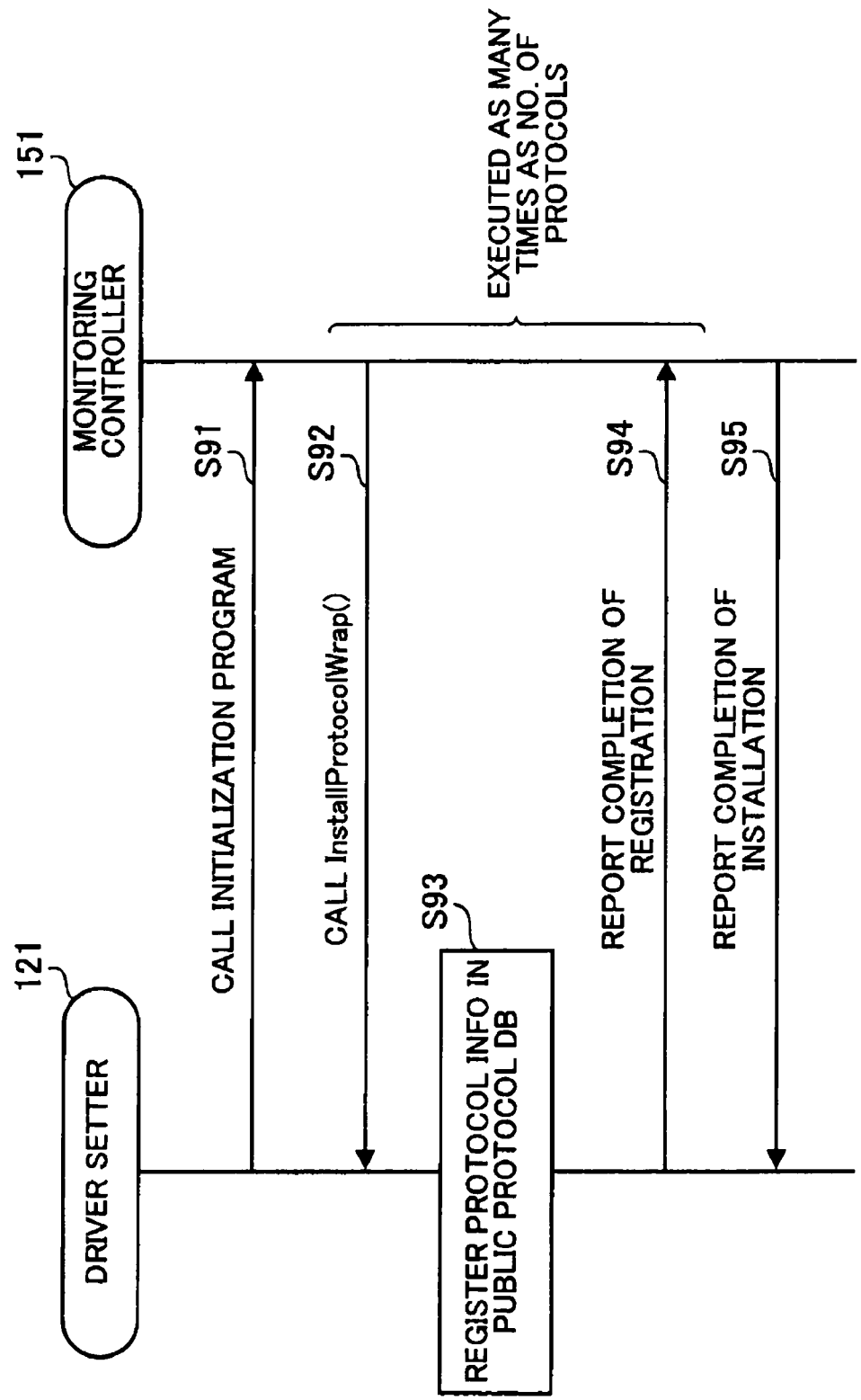
FIG. 17 is a sequence diagram illustrating the procedure of the process executed in Step S59 in FIG. 15.

FIG. 17 is a sequence diagram illustrating the procedure of the process executed in Step S59 in FIG. 15.

Step S91: The driver setter 121 calls the initialization program 156 included in the monitoring driver 150 loaded in Step S55. The initialization program 156 is called by transferring control to the beginning of the monitoring driver image 152 in accordance with the image address 215b registered in the entry 211b in the image database 210. The monitoring controller 151 is started as soon as the called initialization program 156 is executed by the CPU 101.

Step S92: In accordance with the initialization program 156, the monitoring controller 151 calls a function "InstallProtocolWrap( )" included in the UEFI core 120. At this time, the monitoring controller 151 notifies the driver setter 121 of the protocol GUID of a protocol 153 included in the monitoring driver 150, as an argument.

The driver setter 121 executes the following Step S93 in accordance with the description of the function "InstallProtocolWrap( )".

Step S93: The driver setter 121 generates an entry 221b of the monitoring driver 150 in the public protocol database 220. Then, the driver setter 121 registers, in the field of the protocol GUID 223b in the generated entry 221b, the protocol GUID received from the device controller 141 in Step S92. Also, the driver setter 121 registers a pointer pointing to that protocol 153 in the monitoring driver 150 which corresponds to the protocol GUID, in the field of the protocol pointer 224b in the entry 221b. Further, the driver setter 121 registers, in the field of the image handle 225b in the entry 221b, a pointer pointing to the entry 211b generated in the image database 210 in Step S56.

Step S94: The driver setter 121 notifies the monitoring controller 151 that the registration process with respect to the public protocol database 220 has been completed.

Where a plurality of protocols 153 are included in the monitoring driver 150 loaded into the RAM 103 in Step S55, the monitoring controller 151 repeatedly executes Step S92 a number of times corresponding to the number of the protocols 153 included in the monitoring driver 150. Each time Step S92 is executed, the monitoring controller 151 notifies the driver setter 121 of the protocol GUID of a different protocol 153 included in the monitoring driver 150. As a result, information about all the protocols 153 included in the monitoring driver 150 is registered in the public protocol database 220.

Step S95: The monitoring controller 151 notifies the driver setter 121 of the completion of the installation process. Subsequently, Step S60 in FIG. 15 is executed.

The process explained above with reference to FIGS. 15 to 17 completes the registration of information in the image database 210, the public protocol database 220 and the sub-protocol database 230. Where an unmonitored UEFI driver 140 is loaded into the RAM 103, an entry 220a corresponding to the protocol 153 included in the loaded UEFI driver 140 is generated in the public protocol database 220. Also, a protocol pointer 224a pointing to the protocol 143 included in the loaded UEFI driver 140 is registered in the entry 220a.

On the other hand, where a monitored UEFI driver 140 is loaded into the RAM 103, an entry 221b corresponding to the protocol 153 included in the monitoring driver 150 is generated in the public protocol database 220. Instead of the protocol pointer 224a pointing to the protocol 143 included in the loaded UEFI driver 140, the protocol pointer 224b pointing to the corresponding protocol 153 included in the monitoring driver 150 is registered in the entry 221b.

For the protocol 143 included in the monitored UEFI driver 140, a corresponding entry is generated in the sub-protocol database 230, instead of the public protocol database 220. Thus, the protocol pointer 234 pointing to the protocol 143 included in the monitored UEFI driver 140 is registered in the entry 231 in the sub-protocol database 230.

The driver setter 121 then executes the connect process in Step S33 in FIG. 14. In and after the connect process, when a member function 145 in a monitored UEFI driver 140 is called, the corresponding member function 155 in the monitoring driver 150 corresponding to the monitored UEFI driver 140 is called first. Prior to proceeding to the explanation of the connect process, therefore, the process executed when a member function 155 of the monitoring driver 150 is called will be described.

When a member function 155 included in a monitoring driver 150 is called, the monitoring controller 151 is started. The monitoring controller 151 thus started calls that member function 145 in the UEFI driver 140 which corresponds to the called member function 155 in the monitoring driver 150. This permits the process executed in accordance with the member function 145 in the monitored UEFI driver 140 to be monitored by the monitoring controller 151 and the WDT 102.

Figure 18:
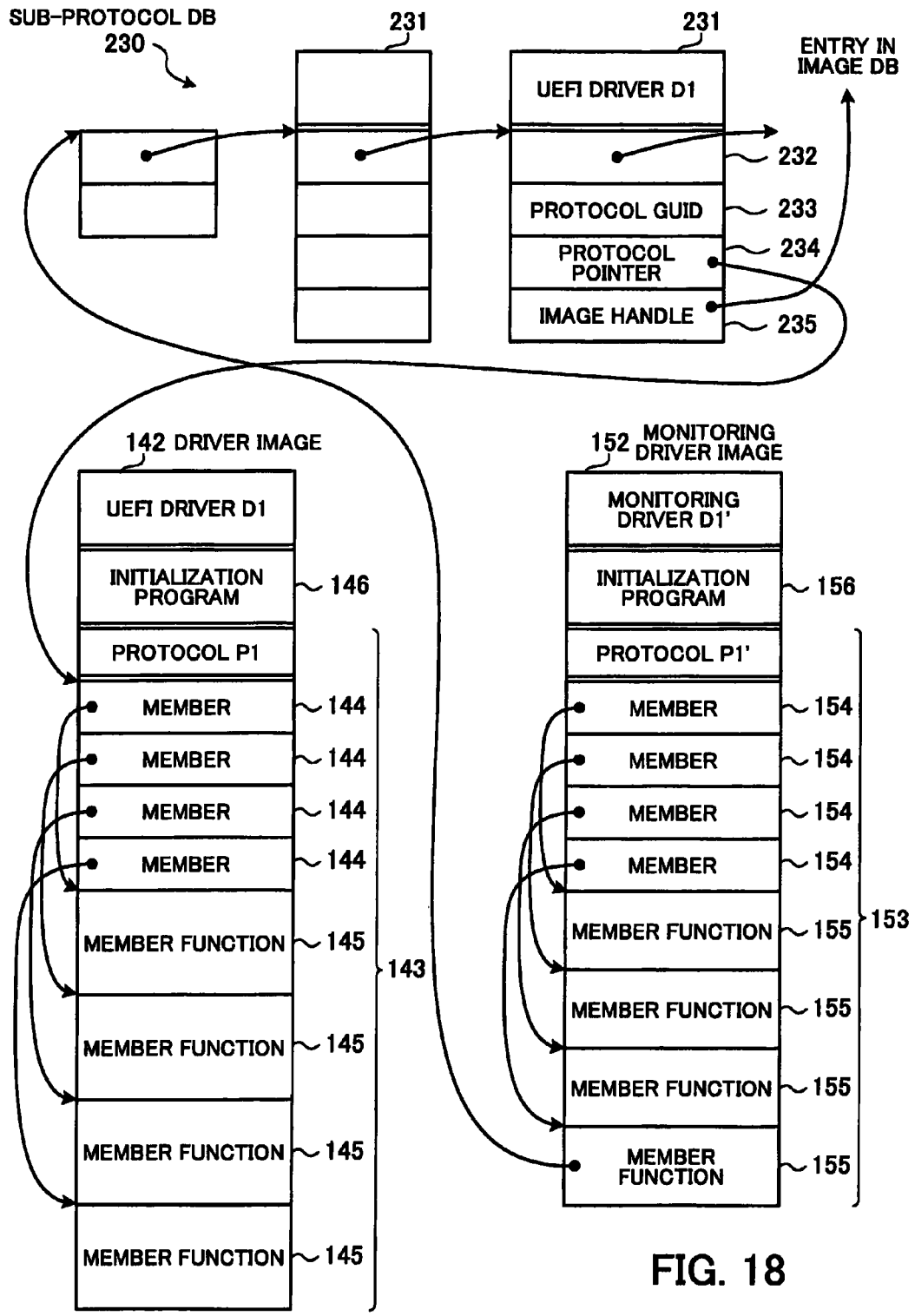
FIG. 18 illustrates the relationship among the sub-protocol database, the UEFI driver, and the monitoring driver.

The monitoring controller 151 calls the member function 145 in the UEFI driver 140 on the basis of the information registered in the sub-protocol database 230. FIG. 18 illustrates the relationship among the sub-protocol database, the UEFI driver, and the monitoring driver.

When a member function 155 included in the monitoring driver 150 is called, the monitoring controller 151 is started and looks up the sub-protocol database 230. The monitoring controller 151 selects, from the sub-protocol database 230, the entry 231 wherein the protocol GUID 233 of the protocol 153 to which the called member function 155 belong is registered. Then, in accordance with the protocol pointer 234 included in the selected entry 231, the monitoring controller 151 accesses the driver image 142 of the UEFI driver 140 corresponding to the monitoring driver 150 and transfers control to the member 144 having the same function name as that of the called member function 155. Consequently, the member function 145 in the UEFI driver 140 corresponding to the called member function 155 is executed. By looking up the sub-protocol database 230, the monitoring controller 151 can easily call the corresponding member function 155 in the UEFI driver 140.

Figure 19:
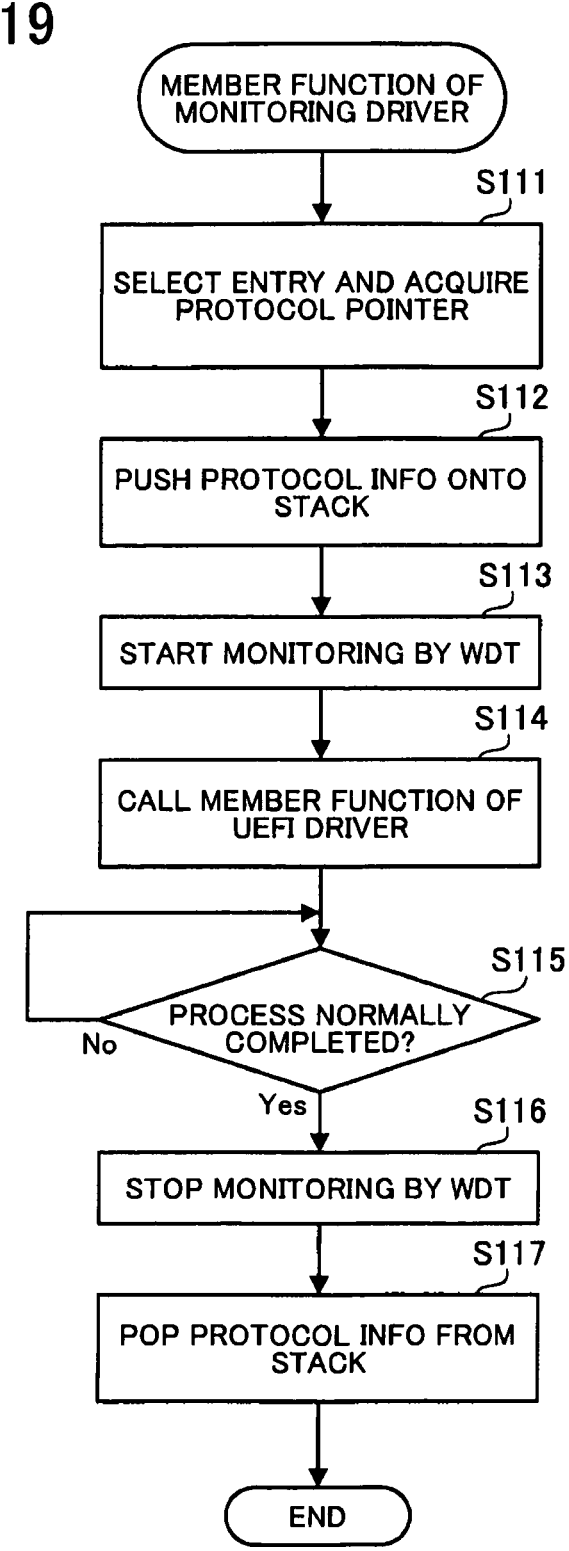
FIG. 19 is a flowchart illustrating the procedure of a process executed when a member function of the monitoring driver is called.

FIG. 19 is a flowchart illustrating the procedure of the process executed when a member function included in a monitoring driver is called.

Step S111: When a member function 155 included in a monitoring driver 150 is called, the monitoring controller 151 is started. The monitoring controller 151 selects, from the sub-protocol database 230, the entry 231 wherein the protocol GUID 233 of the protocol 153 to which the called member function 155 belongs is registered, as explained above with reference to FIG. 18. Then, the monitoring controller 151 acquires the protocol pointer 234 included in the selected entry 231.

Step S112: The monitoring controller 151 pushes protocol information, which is information about the protocol corresponding to the entry 231 selected in Step S111, onto a stack generated in the RAM 103. The protocol information and the stack will be explained with reference to FIG. 20.

Step S113: The monitoring controller 151 causes the WDT 102 to start monitoring. Where the WDT 102 is stopped with its count reset, for example, the monitoring controller 151 causes the WDT 102 to start counting.

Step S114: In accordance with the protocol pointer 234 acquired in Step S111, the monitoring controller 151 accesses the driver image 142 of the UEFI driver 140. Then, the monitoring controller 151 transfers control to the member 144 with the same function name as that of the called member function 155, to thereby call the member function 145 in the UEFI driver 140 corresponding to the member 144. Consequently, the member function 145 in the UEFI driver 140 is executed, and the device controller 141 performs the process in accordance with the member function 145.

Step S115: The monitoring controller 151 determines whether or not the process executed by the device controller 141 in accordance with the called member function 145 has been normally completed. If the process in accordance with the member function 145 is normally completed (Yes in S115), the device controller 141 notifies the monitoring controller 151, which called the member function 145, that the process has been normally completed. If the notification indicative of normal completion of the process is received from the device controller 141 within a fixed time after the execution of Step S113, the monitoring controller 151 executes Step S116.

If the process of the device controller 141 is not completed within the fixed time after the execution of Step S113, timeout occurs in the WDT 102. In such a case, the CPU 101 executes the interrupt handler 170, so that the interrupt processor 171 is started. The process executed by the interrupt processor 171 will be explained with reference to FIG. 21.

Step S116: The monitoring controller 151 causes the WDT 102 to stop monitoring the process. For example, the monitoring controller 151 causes the WDT 102 to stop counting and resets the count.

Step S117: The monitoring controller 151 causes the protocol information which was pushed in Step S112 to be popped from the stack generated in the RAM 103.

In accordance with the above process illustrated in FIG. 19, when a member function 155 in a monitoring driver 150 is called, the corresponding member function 145 in the UEFI driver 140 is called. At the same time, the process executed in accordance with the called member function 145 is monitored by the WDT 102. It is therefore possible to reliably judge whether the member function 145 in the monitored UEFI driver 140 contains an anomaly occurrence factor or not.

Figure 20:
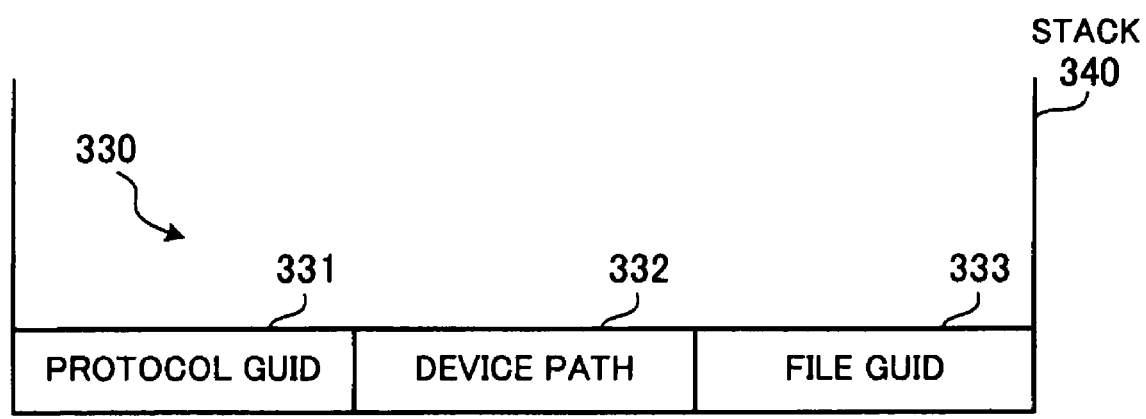
FIG. 20 illustrates an example of protocol information registered in a stack.

FIG. 20 illustrates an example of the protocol information registered in the stack.

In Step S112, the protocol information 330 is pushed onto the stack 340 generated in the RAM 103. The protocol information 330 may be information whereby at least the UEFI driver to be monitored by the WDT 102 can be identified. In this embodiment, the protocol information 330 is information about the protocol corresponding to the entry 231 selected in Step S111 and includes a protocol GUID 331, a device path 332, and a file GUID 333.

In this case, in Step S112, the monitoring controller 151 registers the protocol GUID 233 registered in the entry 231 selected in Step S111, in the protocol information 330 as the protocol GUID 331. Also, in accordance with the image handle 235 registered in the entry 231 selected in Step S111, the monitoring controller 151 looks up the entry 211a in the image database 210. Then, the monitoring controller 151 registers the device path 214a and file GUID 213a registered in the entry 211a in the image database 210, as the device path 332 and the file GUID 333 in the protocol information 330.

Meanwhile, the stack 340 is a form of storage area for holding information on the process to be monitored by the WDT 102 and is prepared in the RAM 103. As explained below with reference to FIG. 21, if timeout occurs in the WDT 102, the interrupt processor 171 reads out the protocol information 330 registered in the stack 340 and registers the read information in the error list 321.

The stack 340 may also be used as a storage area for managing the process executed by the CPU 101, for example. In this case, when the protocol information 330 is pushed onto the stack 340, the stack 340 may already hold information about the program including the member function 145 with which the protocol information 330 is associated.

Figure 21:
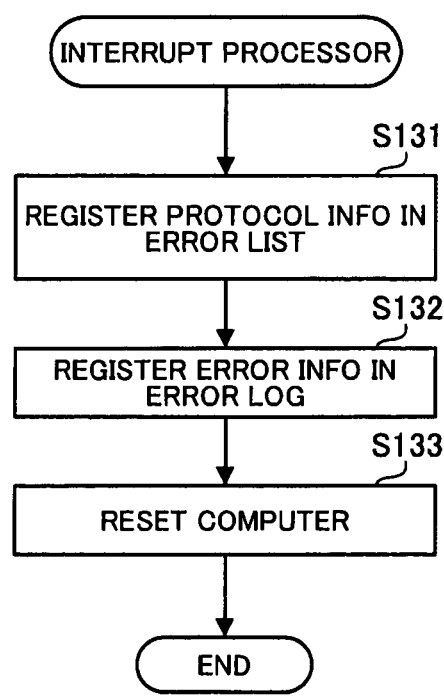
FIG. 21 is a flowchart illustrating the procedure of a process executed by an interrupt processor.

FIG. 21 is a flowchart illustrating the procedure of the process executed by the interrupt processor. If timeout occurs in the WDT 102, the interrupt processor 171 executes the process described below.

Step S131: The interrupt processor 171 reads out the protocol information 330 registered in the stack 340 as the top entry, and registers the protocol information 330 in the error list 321.

Information to be registered in the error list 321 may be information by which at least the UEFI driver with respect to which error has been detected can be identified. Preferably, the information registered in the error list 321 is information that can be collated directly with the information registered in the device list 240. Thus, only the device path 332, for example, among the items included in the protocol information 330, may be registered in the error list 321.

Step S132: The interrupt processor 171 registers, in the error log 322, information indicating the UEFI driver 140 or device with respect to which the processing error has occurred, the contents of the processing error, the date and time of the occurrence and the like.

Step S133: The interrupt processor 171 resets the computer 100. The information registered in the error list 321 and the error log 322 is retained even after the computer 100 is reset.

In accordance with the above process illustrated in FIG. 21, if error is detected by the WDT 102 during the execution of the process in accordance with a member function 145 in a UEFI driver 140, information identifying the UEFI driver 140 which is regarded as the cause of the error is registered in the error list 321. Thus, after the computer 100 is restarted, execution of the UEFI driver 140 identified by the information registered in the error list 321 can be skipped without fail.

After registering necessary information in the error list 321 and the error log 322, the interrupt processor 171 restarts the computer 100. Accordingly, even in cases where a processing error has been detected, the computer 100 carries on its process without the need for any particular manipulation by the user, making it possible to shorten the processing time required until the start of the OS program in the event of a processing error occurring.

If the UEFI driver 140 with respect to which a processing error has been detected has involvement in the start of the OS program, the computer 100 may possibly fail to continue the start process. In such a case, the error log 322 may be analyzed and appropriate measures, such as updating of the UEFI driver 140 containing an anomaly occurrence factor, may be taken by the administrator of the computer 100 so that the computer 100 can be restored.

Figure 22:
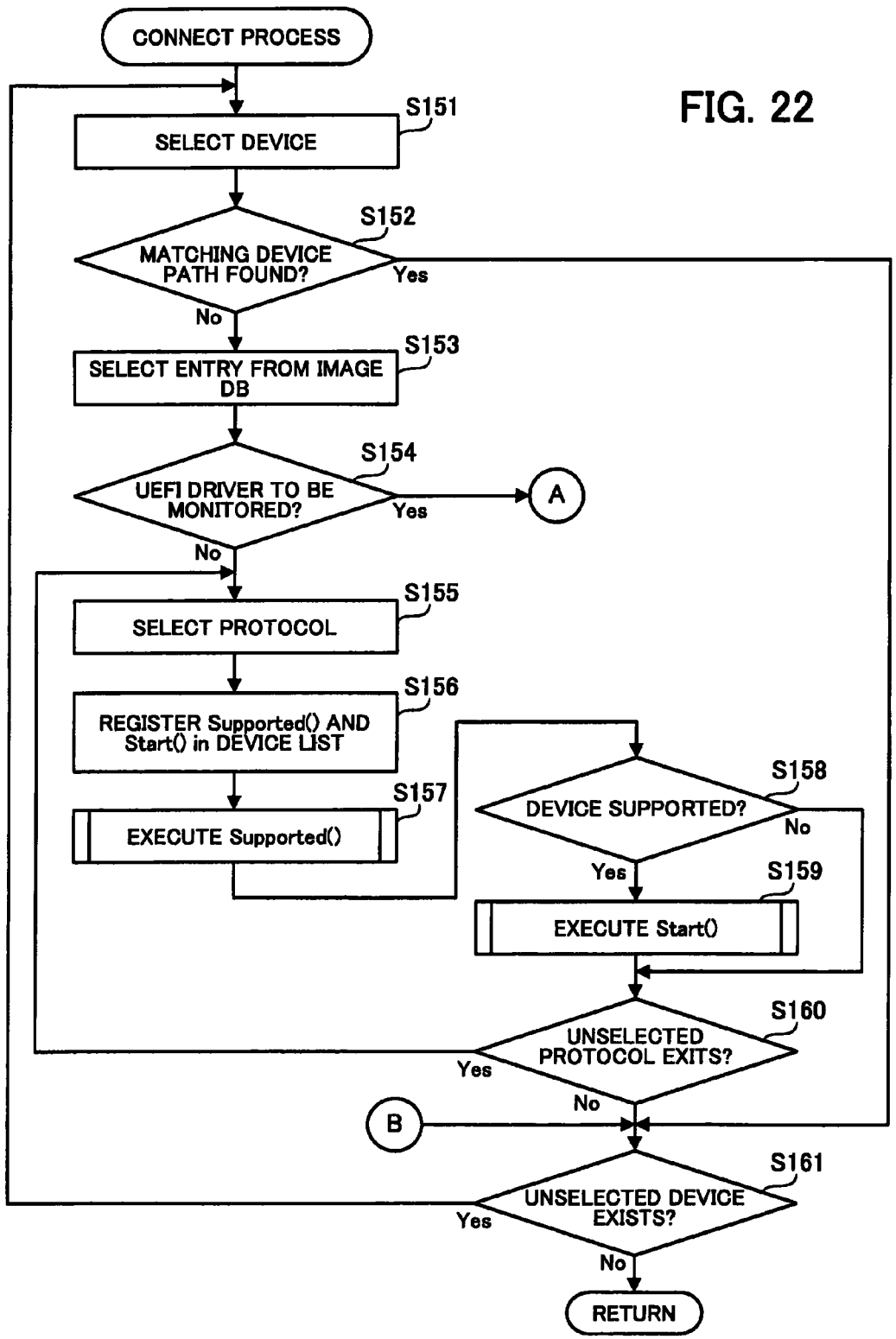
FIG. 22 is a flowchart (first half) illustrating the procedure of a process executed in Step S33 in FIG. 14.
Figure 23:
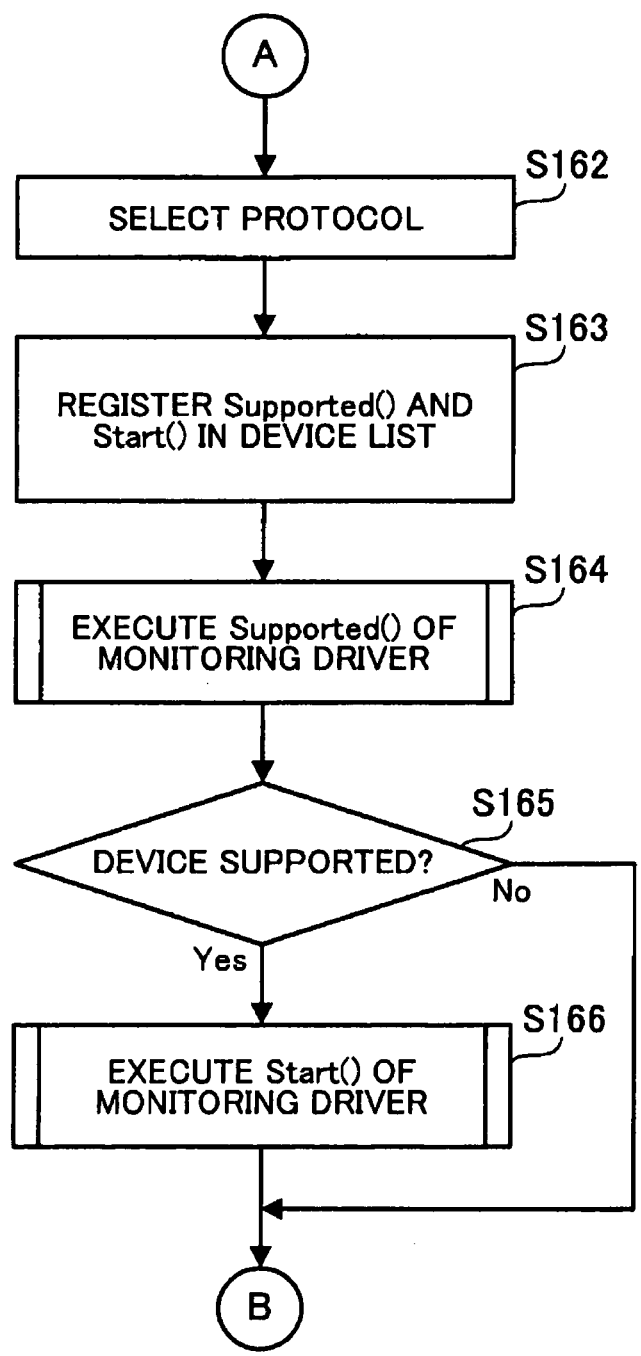
FIG. 23 is a flowchart (second half) illustrating the procedure of a process executed in Step S33 in FIG. 14.

The following explains in detail the process executed after the registration of information in the image database 210, the public protocol database 220 and the sub-protocol database 230 is completed. FIGS. 22 and 23 are flowcharts illustrating the procedure of the process executed in Step S33 in FIG. 14.

Step S151: The driver setter 121 selects one entry 231 in the device list 240, thereby selecting a corresponding device.

Step S152: The driver setter 121 determines whether or not the device path 242 registered in the entry 231 selected in Step S151 coincides with any device path 332 registered in the error list 321. The driver setter 121 executes Step S161 if a matching device path is found (Yes in S152), and executes Step S153 if no matching device path is found (No in S152).

In Step S151, the driver setter 121 may select a device by selecting an entry 211a of UEFI driver 140 generated in the image database 210, instead of selecting an entry 231 in the device list 240. In this case, the driver setter 121 determines in Step S152 whether or not the file GUID 213a registered in the selected entry 211a coincides with any file GUID 333 registered in the error list 321.

Step S153: The driver setter 121 selects the entry 211a of the UEFI driver 140 associated with the device selected in Step S151, from among the entries 211 generated in the image database 210. Specifically, the driver setter 121 acquires the device path 242 from the entry 241 selected from the device list 240 in Step S151. Then, the driver setter 121 selects, from among the entries 211 in the image database 210, the entry 211 in which is registered the device path 214 identical with the device path 242 acquired from the device list 240.

Step S154: It is determined whether or not the UEFI driver 140 associated with the device selected in Step S151 is to be monitored. If the UEFI driver 140 associated with the device selected in Step S151 is to be monitored (Yes in S154), Step S162 is executed, and if the UEFI driver 140 need not be monitored (No in S154), Step S155 is executed. Specifically, if the pointer 217a in the entry 241 selected in Step S153 points to the entry 221b corresponding to a protocol 153 in a monitoring driver 150, among the entries 221 in the public protocol database 220, Step S162 is executed. On the other hand, if the pointer 217a in the entry 241 selected in Step S153 points to the entry 221a corresponding to a protocol 143 in a UEFI driver 140, among the entries 221 in the public protocol database 220, Step S155 is executed.

Step S155: The driver setter 121 selects a protocol 143 associated with the device selected in Step S151. Specifically, the driver setter 121 acquires a pointer 217a from the entry 211a selected from the image database 210 in Step S153, and selects that entry 221a in the public protocol database 220 which the acquired pointer 217a points to.

Step S156: The driver setter 121 registers, in the device list 240, information about the functions "Supported( )" and "Start( )", among the member functions 145 included in the protocol 143 selected in Step S155. The functions "Supported( )" and "Start( )" describe the procedure of the initial setting process for the protocol 143.

In Step S156, the driver setter 121 first acquires the protocol GUID 223a and the protocol pointer 224a from the entry 221a selected from the public protocol database 220 in Step S155. Then, in accordance with the acquired protocol pointer 224a, the driver setter 121 accesses the region of the corresponding protocol 143 in the driver image 142.

Subsequently, the driver setter 121 generates pointers pointing to the respective members 144 corresponding to the functions "Supported( )" and "Start( )" included in the accessed region of the protocol 143. The driver setter 121 then registers the protocol GUID 223a acquired from the entry 221a in the public protocol database 220, the functions names of the functions "Supported( )" and "Start( )", and the pointers pointing to the respective members 144 corresponding to the functions, in the respective fields in the device list 240 as the protocol GUID 243, the function name 244, and the pointer 245.

Step S157: The driver setter 121 calls the function "Supported( )" in the protocol 143 selected in Step S155. As a result, the device controller 141 is started. The device controller 141 thus started determines whether or not the UEFI driver 140 including the protocol 143 supports the target device.

The process executed in Step S157 will be explained with reference to FIG. 26.

Step S158: In accordance with the decision made by the device controller 141 in Step S157, the driver setter 121 determines whether the UEFI driver 140 supports the target device or not. If the UEFI driver 140 supports the target device (Yes in S158), Step S159 is executed. On the other hand, if the UEFI driver 140 does not support the target device (No in S158), the driver setter 121 executes Step S160.

Step S159: The driver setter 121 calls the function "Start( )" in the protocol 143 selected in Step S155. Consequently, the device controller 141 is started. The device controller 141 initializes the target device as well as the control information used in controlling the device. Subsequently, the device controller 141 requests the driver setter 121 to register, in the device list 240, information about the remaining member functions 145 in the protocol 143 selected in Step S155. In response to the request from the device controller 141, the driver setter 121 registers the functions names of the remaining member functions 145 and points pointing to the respective members 144 corresponding to the functions, in the respective fields in the device list 240 as the function name 244 and the pointer 245. As a result of the process thus performed, the protocol 143 selected in Step S155 is made ready for use as a program for controlling the corresponding device.

The process executed in Step S159 will be explained with reference to FIG. 27.

Step S160: The driver setter 121 determines whether or not there is a protocol 143 which is not selected yet from among the protocols 143 associated with the device selected in Step S151. Specifically, the driver setter 121 determines whether all of the pointers 217a in the entry 211a selected from the image database 210 in Step S153 have been selected or not.

If there is an unselected pointer 217a in the entry 211a in the image database 210 (Yes in S160), the driver setter 121 executes Step S155. In Step S155, an unselected pointer 217a is selected from the entry 211a in the image database 210, and that entry 221a in the public protocol database 220 which the selected pointer 217a points to is selected. On the other hand, if all of the pointers 217a in the entry 211a in the image database 210 have been selected (No in S160), the driver setter 121 executes Step S161.

Step S161: The driver setter 121 determines whether or not there is a device which is not selected yet in Step S151 among the devices connected to the computer 100. The decision is made by determining whether or not there is an entry 231 which is not selected yet among those registered in the device list 240. If there is an unselected device (Yes in S161), the driver setter 121 executes Step S151. In Step S151, an unselected entry 231 is selected from the device list 240. On the other hand, if all of the devices have been selected (No in S161), the driver setter 121 terminates the connect process, whereupon Step S34 in FIG. 14 is executed.

Step S162: The driver setter 121 selects that protocol 153 in the monitoring driver 150 which corresponds to the device selected in Step S151. Specifically, the driver setter 121 acquires a pointer 217a from the entry 211a selected from the image database 210 in Step S153, and selects that entry 221b in the public protocol database 220 which the acquired pointer 217a points to.

Step S163: The driver setter 121 registers, in the device list 240, information about the functions "Supported( )" and "Start( )", among the member functions 155 included in the protocol 153 selected in Step S162.

In Step S163, the driver setter 121 first acquires the protocol GUID 223b and the protocol pointer 224b from the entry 221b selected from the public protocol database 220 in Step S162. Then, in accordance with the acquired protocol pointer 224b, the driver setter 121 accesses the region of the corresponding protocol 153 in the monitoring driver image 152.

Subsequently, the driver setter 121 generates pointers pointing to the respective members 154 corresponding to the functions "Supported( )" and "Start( )" included in the accessed region of the protocol 153. The driver setter 121 then registers the protocol GUID 223b acquired from the entry 221b in the public protocol database 220, the functions names of the functions "Supported( )" and "Start( )", and the pointers pointing to the respective members 154 corresponding to the functions, in the respective fields in the device list 240 as the protocol GUID 243, the function name 244, and the pointer 245.

Step S164: The driver setter 121 calls the function "Supported( )" in the protocol 153 selected in Step S162. Consequently, the monitoring controller 151 is started. The monitoring controller 151 calls the function "Supported( )" in the corresponding UEFI driver 140 and requests the WDT 102 to monitor the process executed in accordance with the UEFI driver 140. As a result of the process executed in accordance with the function "Supported( )" of the UEFI driver 140, a decision indicating whether the UEFI driver 140 supports the target device or not is output.

The process executed in Step S164 will be explained with reference to FIG. 24.

Step S165: In accordance with the decision obtained in Step S164, the driver setter 121 determines whether the UEFI driver 140 supports the target device or not. If the UEFI driver 140 supports the target device (Yes in S165), Step S166 is executed. On the other hand, if the UEFI driver 140 does not support the target device (No in S165), the driver setter 121 executes Step S161.

Step S166: The driver setter 121 calls the function "Start( )" in the protocol 153 selected in Step S162. As a result, the monitoring controller 151 is started. The monitoring controller 151 calls the function "Start( )" in the corresponding UEFI driver 140 and requests the WDT 102 to monitor the process executed in accordance with the UEFI driver 140.

The process executed in Step S166 will be explained with reference to FIG. 25. When the execution of Step S166 is finished, the driver setter 121 executes Step S161.

In the above process illustrated in FIGS. 22 and 23, when selecting a protocol of which the functions "Supported( )" and "Start( )" are to be executed, the driver setter 121 selects the entry 221, one at a time, from the public protocol database 220 (Step S155 or Step S162). The public protocol database 220 has registered therein the entries 220b corresponding to the protocols 153 in the monitoring drivers 150, instead of the entries corresponding to the protocols 143 in the monitored UEFI drivers 140, as stated above. Thus, by selecting an entry 221b in the public protocol database 220 in Step S162, the driver setter 121 automatically accesses a protocol 153 in a monitoring driver 150 in Step S163.

Accordingly, before calling the functions "Supported( )" and "Start( )" included in a monitored UEFI driver 140, the driver setter 121 calls the functions "Supported( )" and "Start( )" included in the corresponding monitoring driver 150. As a result, the status of execution of the functions "Supported( )" and "Start( )" included in the monitored UEFI driver 140 is monitored by the WDT 102.

Namely, by causing the driver setter 121 to execute a simple process of successively selecting the entries 221 in the public protocol database 220, the status of execution of the functions "Supported( )" and "Start( )" included in the monitored UEFI drivers 140 can be reliably monitored. If an error is detected during the execution of the function "Supported( )" or "Start( )" included in a monitored UEFI driver 140, the computer 100 is reset and then execution of the UEFI driver 140 with respect to which the error has been detected is skipped.

In the process illustrated in FIG. 22, for example, if the device path of the device selected in Step S151 coincides with any device path registered in the error list 321, execution of the functions "Supported( )" and "Start( )" included in the UEFI driver 140 associated with the selected device is skipped. Accordingly, even in cases where an anomaly occurrence factor is contained in the function "Supported( )" or "Start( )" in any monitored UEFI driver 140, the start process can be continued.

In particular, the functions "Supported( )" and "Start( )" included in every UEFI driver 140 to be monitored are invariably called by the driver setter 121 in the process of the start process. The fact that the status of execution of the functions "Supported( )" and "Start( )" is monitored without fail is highly effective in achieving the advantage that the start process can be continued.

Figure 24:
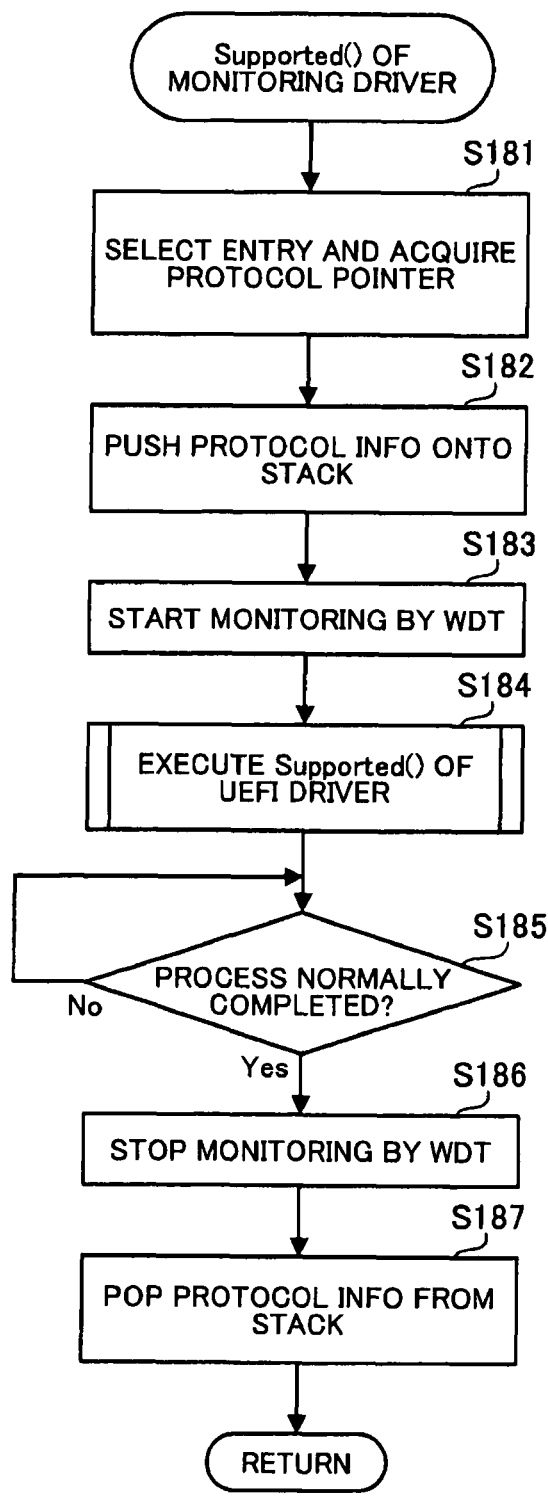
FIG. 24 is a flowchart illustrating the procedure of a process executed in Step S164 in FIG. 23.

FIG. 24 is a flowchart illustrating the procedure of the process executed in Step S164 in FIG. 23. The process illustrated in FIG. 24 corresponds to the case where the function "Supported( )" is applied as the member function to the process illustrated in FIG. 19.

Step S181: When the function "Supported( )" in the monitoring driver 150 is called, the monitoring controller 151 is started. The monitoring controller 151 selects, from the sub-protocol database 230, the entry 231 wherein the protocol GUID 233 of the protocol 153 to which the function "Supported( )" belongs is registered. Then, the monitoring controller 151 acquires the protocol pointer 234 included in the selected entry 231.

Step S182: The monitoring controller 151 pushes the protocol information, which is information about the protocol corresponding to the entry 231 selected in Step S181, onto the stack generated in the RAM 103.

Step S183: The monitoring controller 151 causes the WDT 102 to start monitoring the process.

Step S184: In accordance with the protocol pointer 234 acquired in Step S181, the monitoring controller 151 accesses the driver image 142 of the UEFI driver 140. Then, the monitoring controller 151 transfers control to the member 144 corresponding to the function "Supported( )" in the driver image 142, to thereby call the function "Supported( )". Consequently, the function "Supported( )" of the UEFI driver 140 is executed, and the device controller 141 performs the process in accordance with the function "Supported( )".

The process executed in Step S184 will be explained with reference to FIG. 26.

Step S185: The monitoring controller 151 determines whether or not the process executed by the device controller 141 in accordance with the function "Supported( )" has been normally completed. If the process executed in accordance with the function "Supported( )" is normally completed, the device controller 141 notifies the monitoring controller 151, which called the function "Supported( )", that the process has been normally completed. If the notification indicative of normal completion of the process is received from the device controller 141 within the fixed time after the execution of Step S183 (Yes in S185), the monitoring controller 151 executes Step S186.

Step S186: The monitoring controller 151 causes the WDT 102 to stop monitoring the process.

Step S187: The monitoring controller 151 causes the protocol information which was registered in Step S182 to be popped from the stack generated in the RAM 103.

In accordance with the above process illustrated in FIG. 24, when the function "Supported( )" in the monitoring driver 150 is called, the function "Supported( )" in the UEFI driver 140 is called by the process of the monitoring controller 151. At the same time, the process executed in accordance with the called function "Supported( )" is monitored by the WDT 102. It is therefore possible to reliably judge whether the function "Supported( )" in the monitored UEFI driver 140 contains an anomaly occurrence factor or not.

Figure 25:
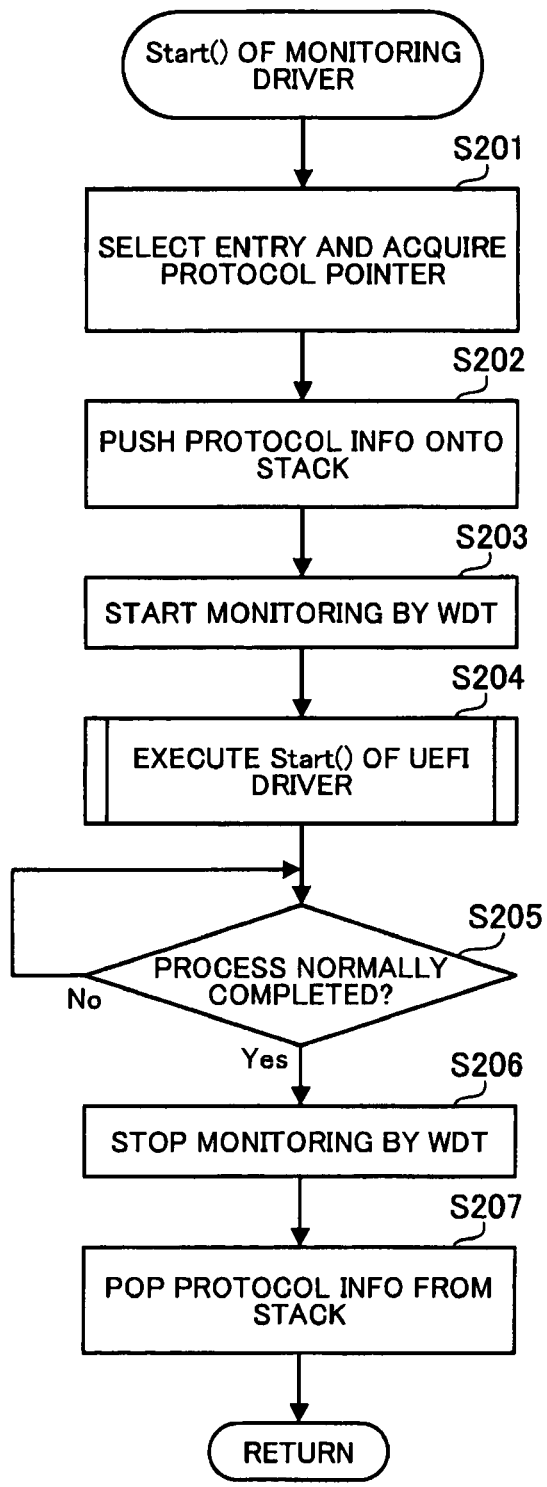
FIG. 25 is a flowchart illustrating the procedure of a process executed in Step S166 in FIG. 23.

FIG. 25 is a flowchart illustrating the procedure of the process executed in Step S166 in FIG. 23. The process illustrated in FIG. 25 corresponds to the case where the function "Start( )" is applied as the member function to the process illustrated in FIG. 19.

Step S201: When the function "Start( )" in the monitoring driver 150 is called, the monitoring controller 151 is started. The monitoring controller 151 selects, from the sub-protocol database 230, the entry 231 wherein the protocol GUID 233 of the protocol 153 to which the function "Start( )" belongs is registered. Then, the monitoring controller 151 acquires the protocol pointer 234 included in the selected entry 231.

Step S202: The monitoring controller 151 pushes the protocol information, which is information about the protocol corresponding to the entry 231 selected in Step S201, onto the stack generated in the RAM 103.

Step S203: The monitoring controller 151 causes the WDT 102 to start monitoring the process.

Step S204: In accordance with the protocol pointer 234 acquired in Step S201, the monitoring controller 151 accesses the driver image 142 of the UEFI driver 140. Then, the monitoring controller 151 transfers control to the member 144 corresponding to the function "Start( )" in the driver image 142, to thereby call the function "Start( )". Consequently, the function "Start( )" of the UEFI driver 140 is executed, and the device controller 141 performs the process in accordance with the function "Start( )".

The process executed in Step S204 will be explained with reference to FIG. 27.

Step S205: The monitoring controller 151 determines whether or not the process executed by the device controller 141 in accordance with the function "Start( )" has been normally completed. If the process executed in accordance with the function "Start( )" is normally completed, the device controller 141 notifies the monitoring controller 151, which called the function "Start( )", that the process has been normally completed. If the notification indicative of normal completion of the process is received from the device controller 141 within the fixed time after the execution of Step S203 (Yes in S205), the monitoring controller 151 executes Step S206.

Step S206: The monitoring controller 151 causes the WDT 102 to stop monitoring the process.

Step S207: The monitoring controller 151 causes the protocol information which was registered in Step S202 to be popped from the stack generated in the RAM 103.

In accordance with the above process illustrated in FIG. 25, when the function "Start( )" in the monitoring driver 150 is called, the function "Start( )" in the UEFI driver 140 is called by the process of the monitoring controller 151. Simultaneously, the process executed in accordance with the called function "Start( )" is monitored by the WDT 102. It is therefore possible to reliably judge whether the function "Start( )" in the monitored UEFI driver 140 contains an anomaly occurrence factor or not.

Figure 26:
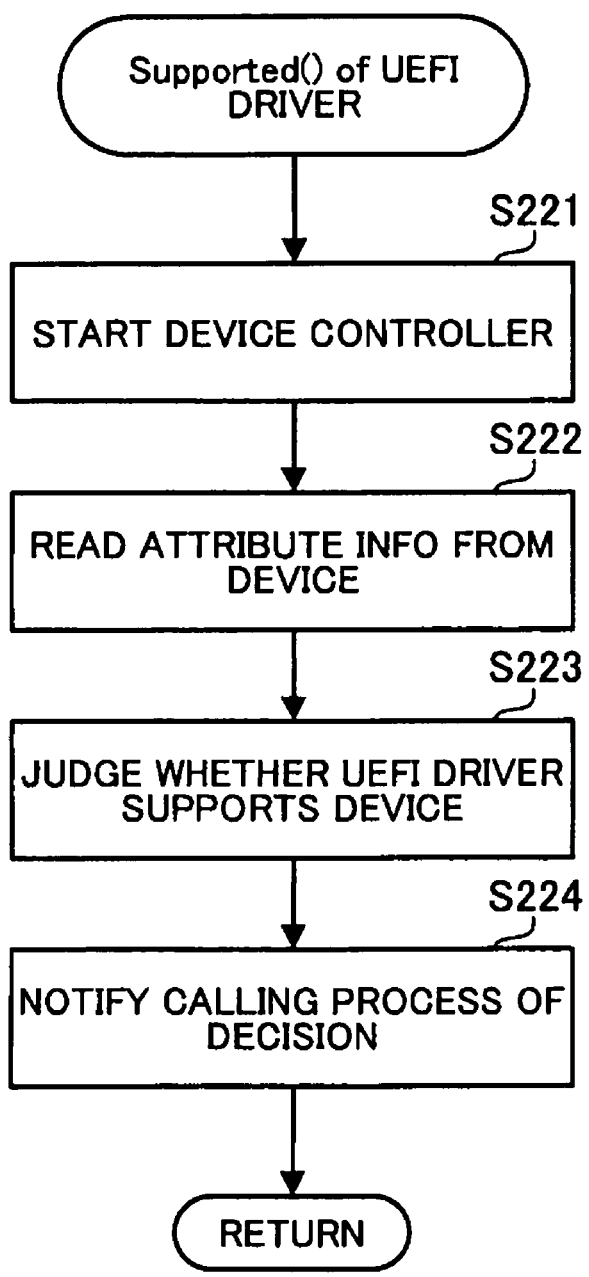
FIG. 26 is a flowchart illustrating the procedure of a process executed when a function "Supported( )" of a UEFI driver is called.

FIG. 26 is a flowchart illustrating the procedure of the process executed when the function "Supported( )" in the UEFI driver is called. The process illustrated in FIG. 26 corresponds to Step S157 in FIG. 22 and Step S184 in FIG. 24.

Step S221: The device controller 141 is started as soon as the function "Supported( )" is called. In the case of Step S157 in FIG. 22, the function "Supported( )" is called from the driver setter 121. In the case of Step S184 in FIG. 24, on the other hand, the function "Supported( )" is called from the monitoring controller 151.

Step S222: The device controller 141 reads out attribute information from the corresponding device. The attribute information is stored beforehand in a nonvolatile storage area provided in the device.

An interface controller connected to a PCI (Peripheral Component Interconnect) bus, for example, is provided with a nonvolatile storage area called PCI configuration register. The PCI configuration register stores various attribute information about the device. The attribute information includes, for example, a vendor ID, a device ID, a revision ID, and a class code.

Step S223: The device controller 141 compares the attribute information read out in Step S222 with the attribute information about the UEFI driver 140, included in the UEFI driver 140. Based on the result of the comparison of the attribute information, the device controller 141 judges whether the UEFI driver 140 supports the target device or not.

In the case of the information obtained from the PCI configuration register, for example, the class code includes information called base class, subclass, and program interface. Where the base class, the subclass and the program interface respectively indicate values "01h", "06h" and "01h", for example, the device in question is an interface controller of serial ATA (Advanced Technology Attachment).

Based on the individual values of the base class, subclass, and program interface included in the class code and the revision ID, for example, the device controller 141 decides whether the UEFI driver 140 supports the target device or not.

Step S224: The device controller 141 notifies the calling process of the result of the decision in Step S223. Where the function "Supported( )" was called in Step S157 in FIG. 22, the driver setter 121 is notified of the result of the decision, and where the function "Supported( )" was called in Step S184 in FIG. 24, the monitoring controller 151 is notified of the result of the decision.

Figure 27:
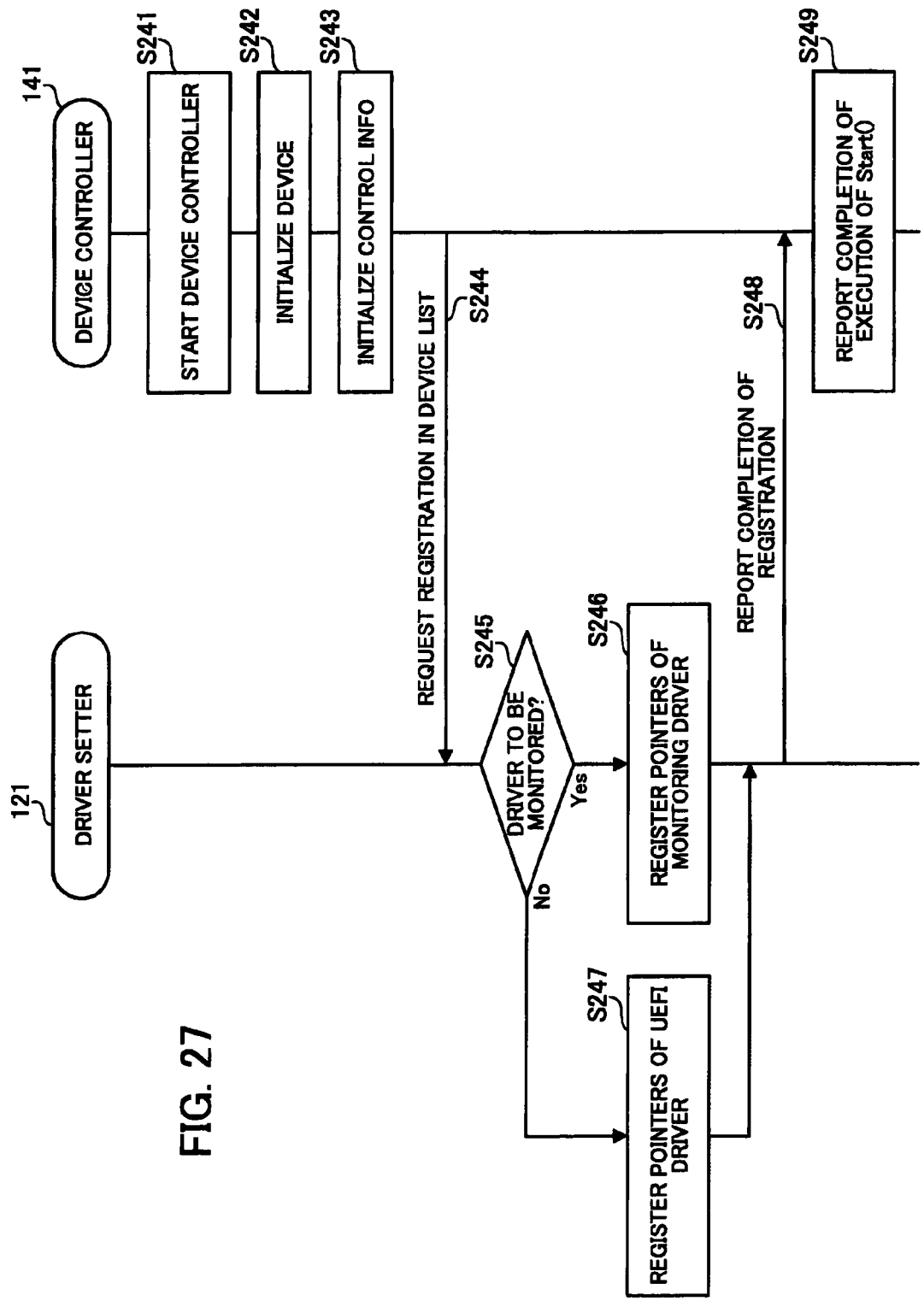
FIG. 27 is a sequence diagram illustrating the procedure of a process executed when a function "Start( )" of a UEFI driver is called.

FIG. 27 is a sequence diagram illustrating the procedure of the process executed when the function "Start( )" in the UEFI driver is called. The process illustrated in FIG. 27 corresponds to Step S159 in FIG. 22 and Step S204 in FIG. 25.

Step S241: The device controller 141 is started as soon as the function "Start( )" is called. In the case of Step S159 in FIG. 22, the function "Start( )" is called from the driver setter 121, and in the case of Step S204 in FIG. 25, the function "Start( )" is called from the monitoring controller 151.

Step S242: The device controller 141 initializes the target device. For example, the device controller 141 initializes register values in the device.

Step S243: The device controller 141 initializes the control information used in controlling the device. For example, the device controller 141 allocates a region in the RAM 103 to the control information and stores initial values of the control information in the allocated region.

Step S244: The device controller 141 requests the driver setter 121 to perform a registration process with respect to the device list 240. At this time, the device controller 141 notifies the driver setter 121 of the protocol GUID of the protocol 143 to be processed and the file GUID of the UEFI driver 140 to which the protocol 143 to be processed belongs.

Step S245: The driver setter 121 determines whether or not the UEFI driver 140 to which the protocol 143 to be processed belongs is a monitored UEFI driver. If the file GUID notified in Step S244 coincides with any GUID registered in the monitored object list 310, the driver setter 121 judges that the UEFI driver 140 is to be monitored.

If the UEFI driver 140 to which the protocol 143 belongs is to be monitored (Yes in S245), the driver setter 121 executes Step S246. On the other hand, if the UEFI driver 140 to which the protocol 143 belongs need not be monitored (No in S245), the driver setter 121 executes Step S247.

Step S246: The driver setter 121 registers, in the device list 240, information about the member functions 155, except the functions "Supported( )" and "Start( )", included in the protocol 153 in the monitoring driver 150.

Specifically, in this process, the driver setter 121 selects the entry 221b wherein the protocol GUID notified in Step S244 from the device controller 141 is registered, from among the entries 221b in the public protocol database 220. Then, in accordance with the protocol pointer 224b registered in the selected entry 221b, the driver setter 121 accesses the region of the corresponding protocol 153 in the monitoring driver image 152.

The driver setter 121 generates pointers pointing to the respective members 154 corresponding to the member functions 155, except the functions "Supported( )" and "Start( )", included in the accessed region of the protocol 153. Subsequently, the driver setter 121 registers the generated pointers and the function names corresponding to the generated pointers, in the respective fields in the device list 240 as the pointer 245 and the function name 244.

The process then proceeds to Step S248.

Step S247: The driver setter 121 registers, in the device list 240, information about the member functions 145, except the functions "Supported( )" and "Start( )", included in the protocol 143 in the UEFI driver 140.

In this process, the driver setter 121 selects the entry 221a wherein the protocol GUID notified in Step S244 from the device controller 141 is registered, from among the entries 221a in the public protocol database 220. Then, in accordance with the protocol pointer 224a registered in the selected entry 221a, the driver setter 121 accesses the region of the corresponding protocol 143 in the driver image 142.

The driver setter 121 generates pointers pointing to the respective members 144 corresponding to the member functions 145, except the functions "Supported( )" and "Start( )", included in the accessed region of the protocol 143. Subsequently, the driver setter 121 registers the generated pointers and the function names corresponding to the generated pointers, in the respective fields in the device list 240 as the pointer 245 and the function name 244.

The process then proceeds to Step S248.

Step S248: The driver setter 121 notifies the device controller 141 that the registration process with respect to the device list 240 has been normally completed.

Step S249: The device controller 141 notifies the calling process that the execution of the function "Start( )" has normally been completed. Where the function "Start( )" was called in Step S159 in FIG. 22, the driver setter 121 is notified of the completion of the execution, and where the function "Start( )" was called in Step S204 in FIG. 25, the monitoring controller 151 is notified of the completion of the execution.

In the above process illustrated in FIG. 27, where the entry 241 selected from the device list 240 corresponds to a monitored UEFI driver 140, information indicating the members 154 in the corresponding monitoring driver 150 is registered as the pointer 245 in the entry 241. When a member function 145 included in a monitored UEFI driver 140 is to be called, therefore, the driver execution controller 122 calls the corresponding member function 155 in the monitoring driver 150 in accordance with the pointer 245 registered in the device list 240.

Thus, when a monitored UEFI driver 140 is called by the driver execution controller 122, the driver execution controller 122 does not recognize that the driver called is a driver to be monitored, and yet the status of execution of the called UEFI driver 140 can be monitored. If error is detected during the execution of the called UEFI driver 140, the computer 100 is reset and then execution of the UEFI driver 140 with respect to which error was detected before the resetting is skipped.

In the process described above with reference to FIG. 22, where the device path of the device selected in Step S151 coincides with any device path registered in the error list 321, registration of the pointers 245 in that entry 241 in the device list 240 which corresponds to the device is skipped. Since the pointers 245 are not registered in the entry 241 in the device list 240, the driver execution controller 122 is unable to call the member functions 145 included in the UEFI driver 140 with respect to which processing error was detected before the resetting.

Thus, since the member functions 145 included in the UEFI driver 140 with respect to which processing error was detected before the resetting are not called, it is possible to avoid a situation where, when the boot manager 131 or the application processor 161 accesses a certain device, anomaly occurs during the access control process due to a fault in the UEFI driver 140 associated with the device to be accessed, making it impossible for the process to be continued. Accordingly, even in cases where any of the UEFI drivers 140 associated with a plurality of devices connected to the computer 100 contains an anomaly occurrence factor, the chances for the process to be continued through to the start of the OS program increase.

When the application processor 161, for example, accesses a device, the driver execution controller 122 calls the member function 145 included in the UEFI driver 140 in accordance with the request from the application processor 161. If the member function 145 fails to be called, however, the driver execution controller 122 notifies the application processor 161 that the requested call failed. Where the device to be accessed has no involvement in the start of the OS program, the application processor 161 skips the access to the device. In this case, the start process of the computer 100 is continued.

Also, when the boot manager 131 accesses a device, the driver execution controller 122 calls the member function 145 included in the UEFI driver 140 in accordance with the request from the boot manager 131. If the member function 145 fails to be called, however, the driver execution controller 122 notifies the boot manager 131 that the requested call failed, as in the case of the request from the application processor 161.

Where the device to be accessed has no involvement in the start of the OS program, the boot manager 131 skips the access to the device. In this case the start process of the computer 100 is continued. Even in cases where the access to the device involves reading out the OS boot loader from the device, the access to the device may be skipped if the boot manager 131 can read out the OS boot loader from another device. Thus, also in this case, the start process of the computer 100 can be continued.

As an exemplary process executed by the driver execution controller 122 to call a member function 145 included in a UEFI driver 140, the process of reading out the OS boot loader will be explained. The following explanation of the exemplary process is based on the assumption that the OS program and the OS boot loader are stored in a plurality of devices, and that one of the devices is selected in order of priority so that the OS program stored in the selected device may be started.

FIG. 28 illustrates an exemplary data structure of a boot order table.

The boot order table 350 illustrated in FIG. 28 is a table in which information indicating at least devices selectable as a device from which the OS program is to be read out is registered in order of priority. The boot order table 350 may be stored beforehand in a nonvolatile storage area accessible from the boot manager 131 and, in this embodiment, is stored in the FWH 106.

In the example illustrated in FIG. 28, the file paths of the OS boot loader are registered in the boot order table 350 in descending order of priority. Each file path includes information about the directory of a device storing the OS boot loader, and information about the directory of the OS boot loader in the device. For example, in FIG. 28, information that the OS boot loader with the filename "boot" is to be read out from the HDD connected to the fiber channel controller via a fiber cable is registered as a process with the highest priority. As a process with the second highest priority, information that the OS boot loader with the filename "boot" is to be read out from the HDD connected to the slot "0" of the SAS controller is registered. In accordance with the information registered in this manner in the boot order table 350, the boot manager 131 selects a device from which the OS boot loader is to be read out.

Figure 29:
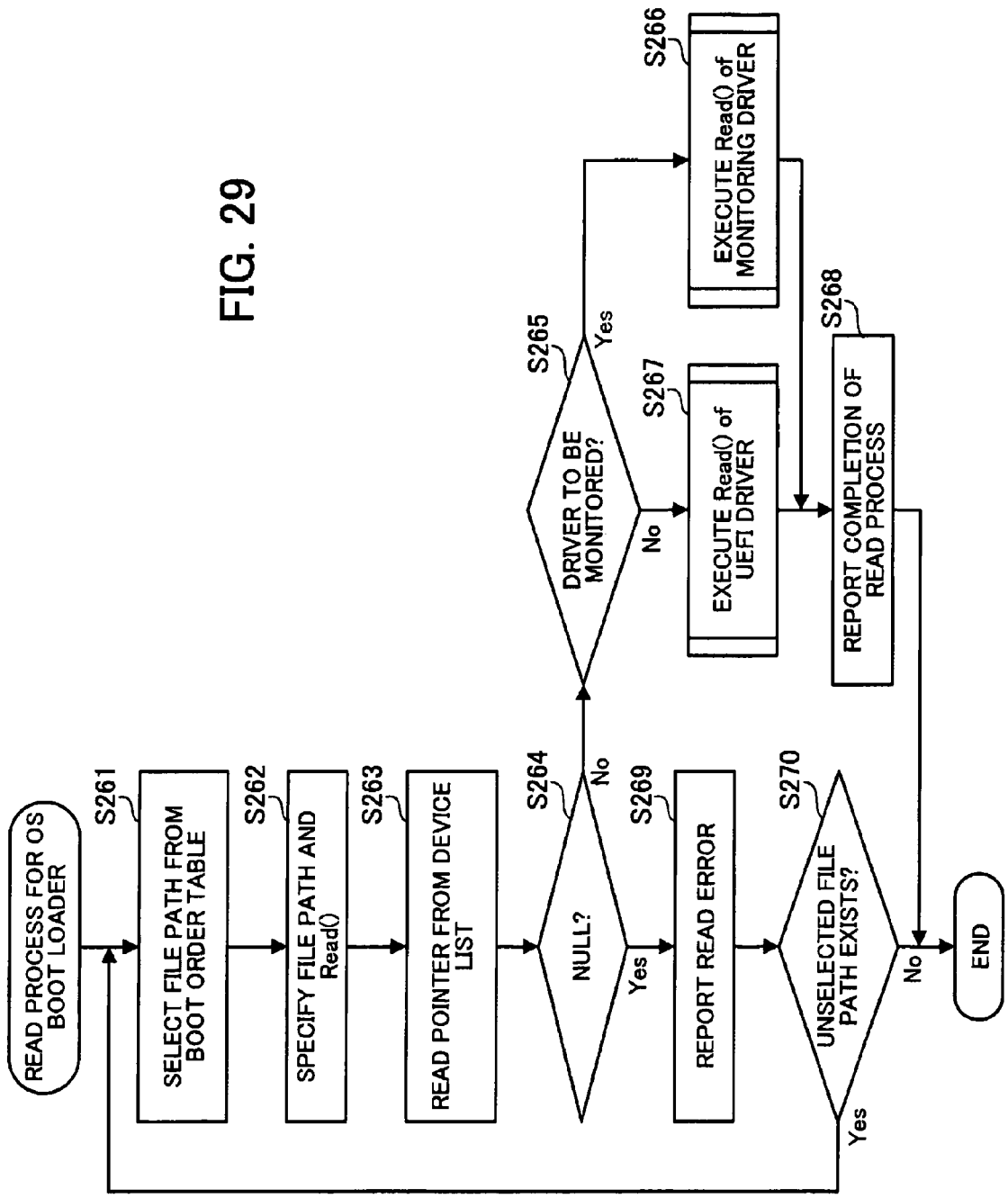
FIG. 29 is a flowchart illustrating the procedure of a process for reading an OS boot loader.

FIG. 29 is a flowchart illustrating a procedure for reading out the OS boot loader.

Step S261: The boot manager 131 selects the file path with the highest priority, from among the unselected file paths registered in the boot order table 350.

Step S262: The boot manager 131 specifies, with respect to the driver execution controller 122, the selected file path and the function name "Read( )" to request the driver execution controller 122 to read out the OS boot loader from the device.

Step S263: The driver execution controller 122 selects, from among the entries 241 in the device list 240, the entry 241 in which the device path in the specified file path is registered. Then, the driver execution controller 122 reads out the value of the pointer 245 corresponding to the function name "Read( )", among the pointers 245 in the selected entry 241.

Step S264: The driver execution controller 122 determines whether the value of the pointer 245 thus read out indicates "NULL" or not. If the value of the pointer 245 is "NULL" (Yes in S264), the driver execution controller 122 executes Step S269, and if the value of the pointer 245 is not "NULL" (No in S264), the driver execution controller 122 executes Step S265.

Step S265: It is determined whether or not the UEFI driver 140 associated with the device to be accessed is a UEFI driver to be monitored. If the UEFI driver 140 associated with the device to be accessed is a monitored UEFI driver (Yes in S265), Step S266 is executed, and if the UEFI driver 140 need not be monitored (No in S265), Step S267 is executed.

Namely, if it is judged in Step S265 that the pointer 245 read out in Step S263 points to a member 154 in the monitoring driver 150, Step S266 is executed. On the other hand, if the pointer 245 read out in Step S263 points to a member 144 in the UEFI driver 140, Step S267 is executed.

Step S266: The driver execution controller 122 transfers control to that member 154 in the monitoring driver image 152 which the pointer 245 read out in Step S263 points to, to thereby call the function "Read( )" in the monitoring driver 150. Consequently, the monitoring controller 151 is started. The monitoring controller 151 calls the function "Read( )" in the UEFI driver 140 in accordance with the function "Read( )", and requests the WDT 102 to monitor the process executed in accordance with the function "Read( )" of the UEFI driver 140.

The process executed in Step S266 will be explained with reference to FIG. 30.

Step S267: The driver execution controller 122 transfers control to that member 144 in the driver image 142 which the pointer 245 read out in Step S263 points to, to thereby call the function "Read( )" in the UEFI driver 140. As a result, the device controller 141 is started. The device controller 141 reads out the OS boot loader from the corresponding device in accordance with the function "Read( )".

The process executed in Step S267 will be explained with reference to FIG. 31.

Step S268: The driver execution controller 122 notifies the boot manager 131 that the OS boot loader has been normally read out.

Step S269: The driver execution controller 122 notifies the boot manager 131 that a read error has occurred.

Step S270: The boot manager 131 determines whether or not there is an unselected file path in the boot order table 350. If there is an unselected file path (Yes in S270), the boot manager 131 executes Step S261. If, on the other hand, all of the file paths in the boot order table 350 have been selected (No in S270), the boot manager 131 terminates the process. In this case, although the OS program fails to be started, the user can identify the UEFI driver 140 as a cause of the start failure by analyzing the contents of the error log 322.

Figure 30:
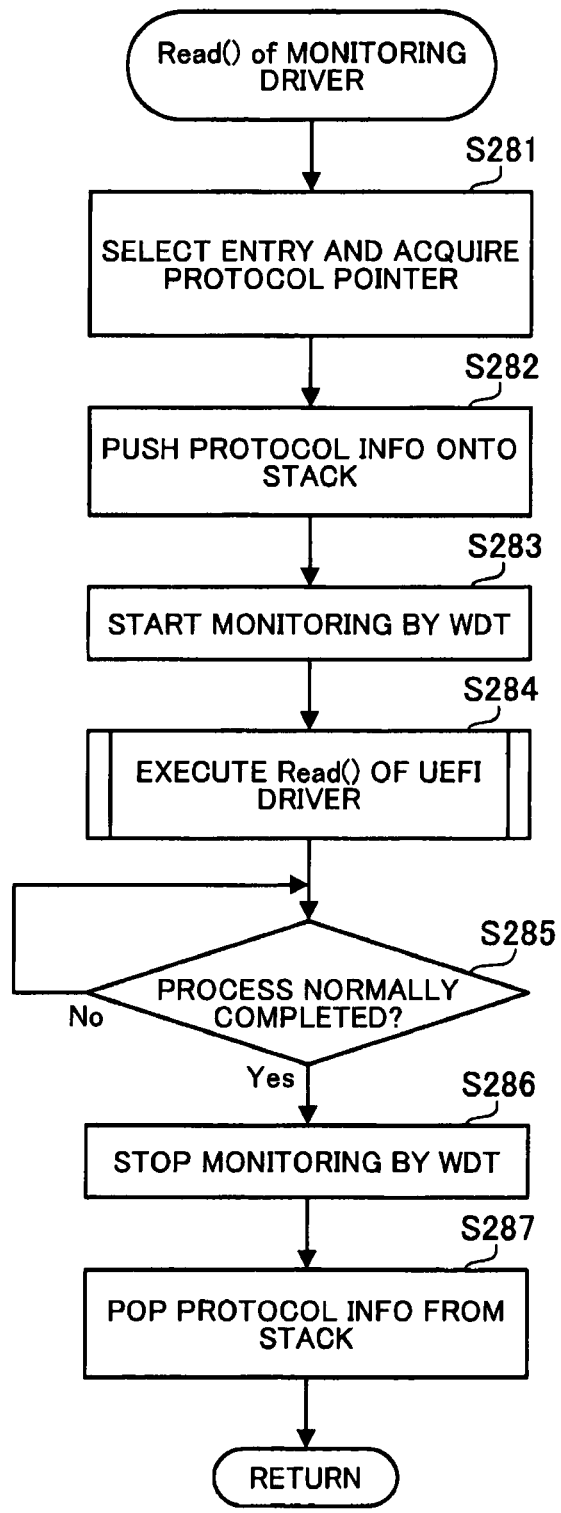
FIG. 30 is a flowchart illustrating the procedure of a process executed in Step S266 in FIG. 29.

FIG. 30 is a flowchart illustrating the procedure of the process executed in Step S266 in FIG. 29. The process illustrated in FIG. 30 corresponds to the case where the function "Read( )" is applied as the member function in the process illustrated in FIG. 19.

Step S281: When the function "Read( )" in the monitoring driver 150 is called, the monitoring controller 151 is started. The monitoring controller 151 selects, from the sub-protocol database 230, the entry 231 wherein the protocol GUID 233 of the protocol 153 to which the function "Read( )" belongs is registered. Then, the monitoring controller 151 acquires the protocol pointer 234 included in the selected entry 231.

Step S282: The monitoring controller 151 pushes the protocol information, which is information about the protocol corresponding to the entry 231 selected in Step S281, onto the stack generated in the RAM 103.

Step S283: The monitoring controller 151 causes the WDT 102 to start monitoring the process.

Step S284: In accordance with the protocol pointer 234 acquired in Step S281, the monitoring controller 151 accesses the driver image 142 of the UEFI driver 140. Then, the monitoring controller 151 transfers control to the member 144 corresponding to the function "Read( )" in the driver image 142, to thereby call the function "Read( )". Consequently, the function "Read( )" in the UEFI driver 140 is executed, and the device controller 141 reads out the OS boot loader from the device in accordance with the function "Read( )".

The process executed in Step S284 will be explained with reference to FIG. 31.

Step S285: The monitoring controller 151 determines whether or not the process executed by the device controller 141 in accordance with the function "Read( )" has been normally completed. If the process executed in accordance with the function "Read( )" is normally completed, the device controller 141 notifies the monitoring controller 151, which called the function "Read( )", that the process has been normally completed. If the notification indicative of normal completion of the process is received from the device controller 141 within the fixed time after the execution of Step S283 (Yes in S285), the monitoring controller 151 executes Step S286.

Step S286: The monitoring controller 151 causes the WDT 102 to stop monitoring the process.

Step S287: The monitoring controller 151 causes the protocol information which was registered in Step S282 to be popped from the stack generated in the RAM 103.

Figure 31:
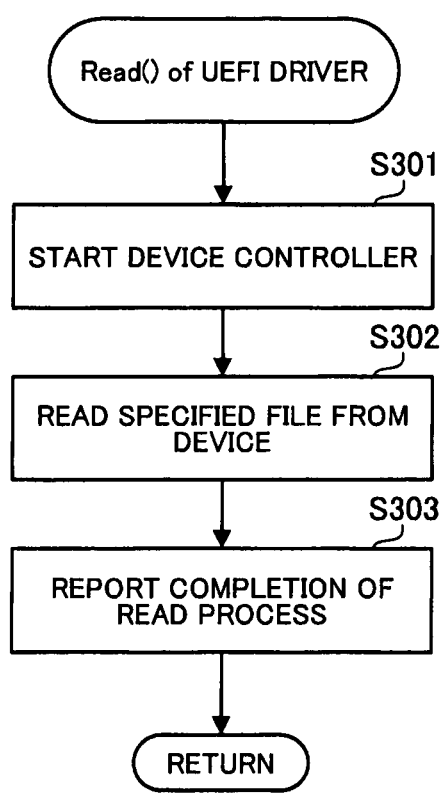
FIG. 31 is a flowchart illustrating the procedure of a process executed when a function "Read( )" of a UEFI driver is called.

FIG. 31 is a flowchart illustrating the procedure of a process executed when the function "Read( )" in the UEFI driver is called. The process illustrated in FIG. 31 corresponds to Step S267 in FIG. 29 and Step S284 in FIG. 30.

Step S301: The device controller 141 is started as soon as the function "Read( )" is called. In the case of Step S267 in FIG. 29, the function "Read( )" is called from the driver execution controller 122, and in the case of Step S284 in FIG. 30, the function "Read( )" is called from the monitoring controller 151. At this time, the device controller 141 is notified of the file path by the calling process.

Step S302: The device controller 141 reads out, from the device, the OS boot loader specified by the file path, and stores the OS boot loader in the RAM 103.

Step S303: The device controller 141 notifies the calling process that the read process has been normally completed. Where the function "Read( )" was called in Step S267 in FIG. 20, the driver execution controller 122 is notified of the completion of the process, and where the function "Read( )" was called in Step S284 in FIG. 30, the monitoring controller 151 is notified on the completion of the process.

In accordance with the aforementioned process illustrated in FIGS. 29 to 31, if the OS boot loader fails to be read out from a certain device, the process of reading out the OS boot loader from that device is skipped. In such a case, if the OS boot loader can be read out from another device with lower priority, the process of starting the OS program can be continued. Thus, even in cases where an anomaly occurrence factor is contained in any of the UEFI drivers 140, the chances for the OS program to be started increase.

In the event that the OS boot loader fails to be read out from all the devices registered in the boot order table 350, the start process of the computer 100 stops. In this case, however, information indicating the cause of the failure to read out the OS boot loader is recorded in the error log 322. Thus, the administrator of the computer 100 can take appropriate measures, such as updating of the UEFI driver 140 containing an anomaly occurrence factor, by analyzing the error log 322.

In the second embodiment described above, when a member function 145 included in a monitored UEFI driver 140 is executed, the status of the execution is monitored. If error is detected during the execution of the member function 145, the computer 100 is reset, and then execution of all member functions 145 in the UEFI driver 140 including the member function 145 with respect to which the error has been detected is skipped. According, even if any UEFI driver 140 contains an anomaly occurrence factor, the chances for the OS program to be started increase. Namely, if the UEFI driver 140 with respect to which the error has been detected has no involvement in the start of the OS program, the OS program can be normally started by skipping the execution of the UEFI driver 140 with respect to which the error has been detected, and executing the other UEFI drivers 140.

Especially, in the case of a highly scalable computer, a large number of devices can possibly be connected to the computer, resulting in an increase in the number of the UEFI drivers 140 that need to be read into the RAM 103 so as to be made ready for use. As the number of the UEFI drivers 140 that need to be read into the RAM 103 increases, the possibility of the UEFI drivers 140 containing an anomaly occurrence factor such as a bug increases. However, with the computer 100 described above, the chances for the start process to be continued increase even in cases where the possibility of the UEFI drivers 140 containing an anomaly occurrence factor is thought to be high.

Third Embodiment

Figure 32:
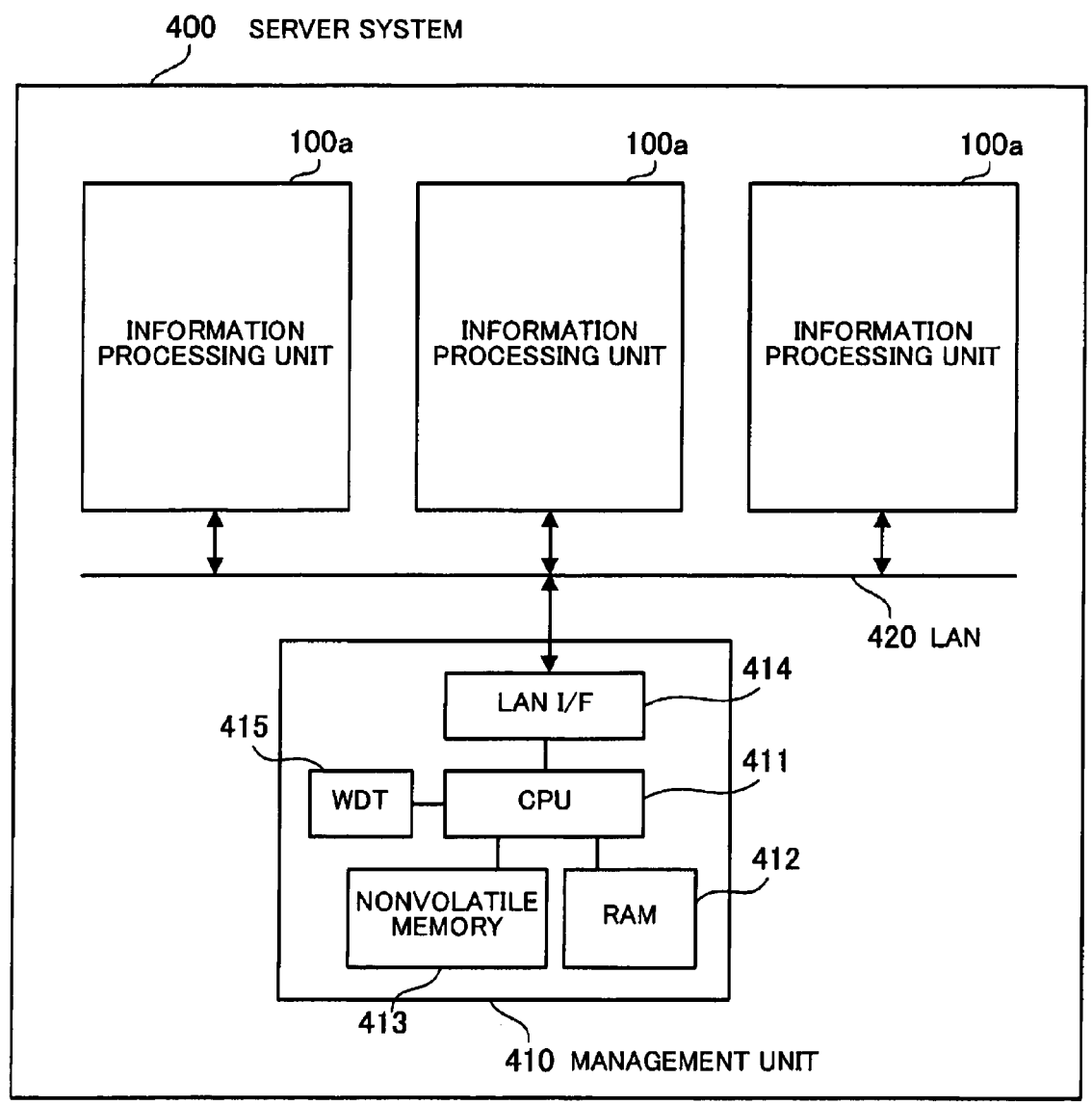
FIG. 32 illustrates an exemplary configuration of a server system according to a third embodiment.

FIG. 32 illustrates an exemplary configuration of a server system according to a third embodiment.

The server system 400 illustrated in FIG. 32 has a construction such that one or more information processing units 100a and a management unit 410 are arranged inside an identical housing. The information processing units 100a and the management unit 410 are connected together by a LAN 420, for example.

The information processing units 100a each execute various processes as a server. Each information processing unit 100a has a hardware configuration similar to that of the computer 100 illustrated in FIG. 3. The information processing units 100a can be inserted into and removed from the housing of the server system 400, for example.

The management unit 410 manages the individual information processing units 100a inside the housing. For example, the management unit 410 monitors the hardware status of the individual information processing units 100a and controls the power-on and power-off of the individual information processing units 100a. In this embodiment, the management unit 410 has a watch dog timer function for monitoring the status of execution of UEFI drivers in the individual information processing units 100a and the function of recording, in the information processing units 100a, information about UEFI drivers with respect to which processing error has been detected.

The management unit 410 includes a CPU 411, a RAM 412, a nonvolatile memory 413, a LAN interface (I/F) 414, and a watch dog timer (WDT) 415. The CPU 411 executes various firmware programs stored in the nonvolatile memory 413, to perform integrated control of the whole management unit 410. The RAM 412 temporarily stores at least part of programs to be executed by the CPU 411 as well as various data necessary for the processes executed in accordance with such programs.

The nonvolatile memory 413 stores programs executed by the CPU 411 as well as various data. The LAN interface 414 is connected to the LAN 420 and communicates with the individual information processing units 100*a*. The WDT 415 monitors the status of execution of predetermined processes at the request of the CPU 411. In this embodiment, the CPU 411 is capable of controlling the counting operation of the WDT 415 at the request of the information processing units 100*a*. The process executed by the WDT 415 may be implemented, for example, by executing a predetermined program by the CPU 411, instead of using dedicated hardware.

Figure 33:
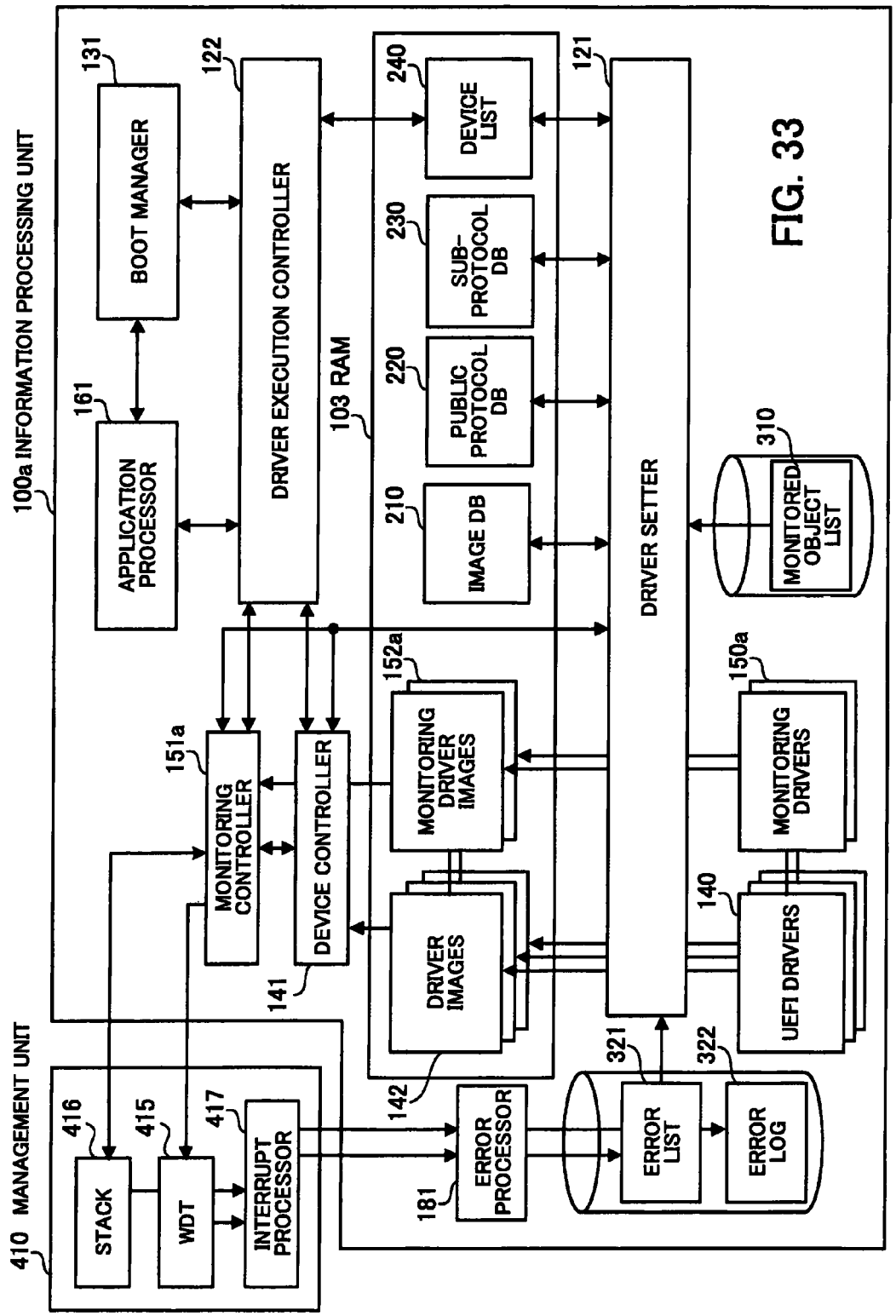
FIG. 33 illustrates an exemplary configuration of processing functions implemented by individual devices of the server system.

FIG. 33 illustrates an exemplary configuration of processing functions of the individual units in the server system. In the following description, like reference numerals are used to refer to like elements also appearing in the aforementioned second embodiment.

The information processing unit 100*a* includes, among the processing functions of the computer 100 illustrated in FIG. 6, the driver setter 121, the driver execution controller 122, the boot manager 131, the device controller 141 and the application processor 161. Further, the information processing unit 100*a* includes a monitoring controller 151*a* and an error processor 181.

The monitoring controller 151*a* executes processes in accordance with monitoring drivers 150*a*. Like the monitoring drivers 150 illustrated in FIG. 6, the monitoring drivers 150*a* are prepared for the respective UEFI drivers 140 to be monitored. The monitoring drivers 150*a* are stored beforehand in the FWH 106 of the information processing unit 100*a*, for example. The driver setter 121 loads the monitoring drivers 150*a* and generates monitoring driver images 152*a* in the RAM 103.

The structure of information contained in the monitoring driver 150*a* is basically identical with that of the monitoring driver 150 illustrated in FIG. 6. Specifically, the monitoring driver 150*a* includes protocols equal in number to the protocols 143 included in the corresponding UEFI driver 140. Each protocol in the monitoring driver 150*a* includes members equal in number to the members 144 included in the corresponding protocol 143 in the UEFI driver 140. Also, each protocol in the monitoring driver 150*a* includes member functions equal in number to the member functions 145 included in the corresponding protocol 143 in the UEFI driver 140. The individual member functions included in the monitoring driver 150*a* are called by using function names identical with those of the corresponding member functions included in the UEFI driver 140. Each member included in the monitoring driver 150*a* includes a pointer pointing to a corresponding member function. There is a difference, however, between the procedure described in the individual member functions in the monitoring driver 150*a* and that described in the individual member functions in the monitoring driver 150 illustrated in FIG. 6, as explained below.

The process executed by the monitoring controller 151*a* in accordance with the monitoring driver 150*a* is identical with that executed by the monitoring controller 151 illustrated in FIG. 6, except the following: The monitoring controller 151*a* requests the WDT 415 in the management unit 410, not an internal WDT of the information processing unit 100*a*, to start and stop the counting operation. Also, when causing the WDT 415 to start counting, the monitoring controller 151*a* requests the management unit 410 to push the protocol information 330 onto a stack 416 generated in the 412 of the management unit 410. Then, when causing the WDT 415 to stop counting, the monitoring controller 151*a* requests the management unit 410 to pop the protocol information 330 from the stack 416 of the management unit 410. The stack 416 is a form of storage area for holding information about the process monitored by the WDT 415, like the stack 340 illustrated in FIG. 20, and is prepared in the RAM 412 of the management unit 410.

When a processing error is detected by the management unit 410, the error processor 181 registers, in the error list 321 and the error log 322, information transmitted from the management unit 410. Also, at the request of the management unit 410, the error processor 181 resets the information processing unit 100*a*. The process executed by the error processor 181 is implemented, for example, by executing predetermined firmware by the BMC 107.

The management unit 410, on the other hand, includes an interrupt processor 417. The process of the interrupt processor 417 is implemented, for example, by executing a predetermined program by the CPU 411 of the management unit 410. The process executed by the interrupt processor 417 is basically identical with that executed by the interrupt processor 171 illustrated in FIG. 6.

If a processing error is detected by the WDT 415 during the execution of the process in accordance with a UEFI driver 140, the interrupt processor 417 generates information to be registered in the error list 321 and the error log 322, on the basis of the protocol information 330 registered in the stack 416. Then, the interrupt processor 417 transmits the generated information to the information processing unit 100*a* and requests that the information be registered in the error list 321 and the error log 322. The information registered in the error list 321 and the error log 322 may be identical with that registered in the case of the computer 100.

Further, after requesting the registration of the information in the error list 321 and the error log 322, the interrupt processor 417 requests the error processor 181 to reset the information processing unit 100*a*.

Figure 34:
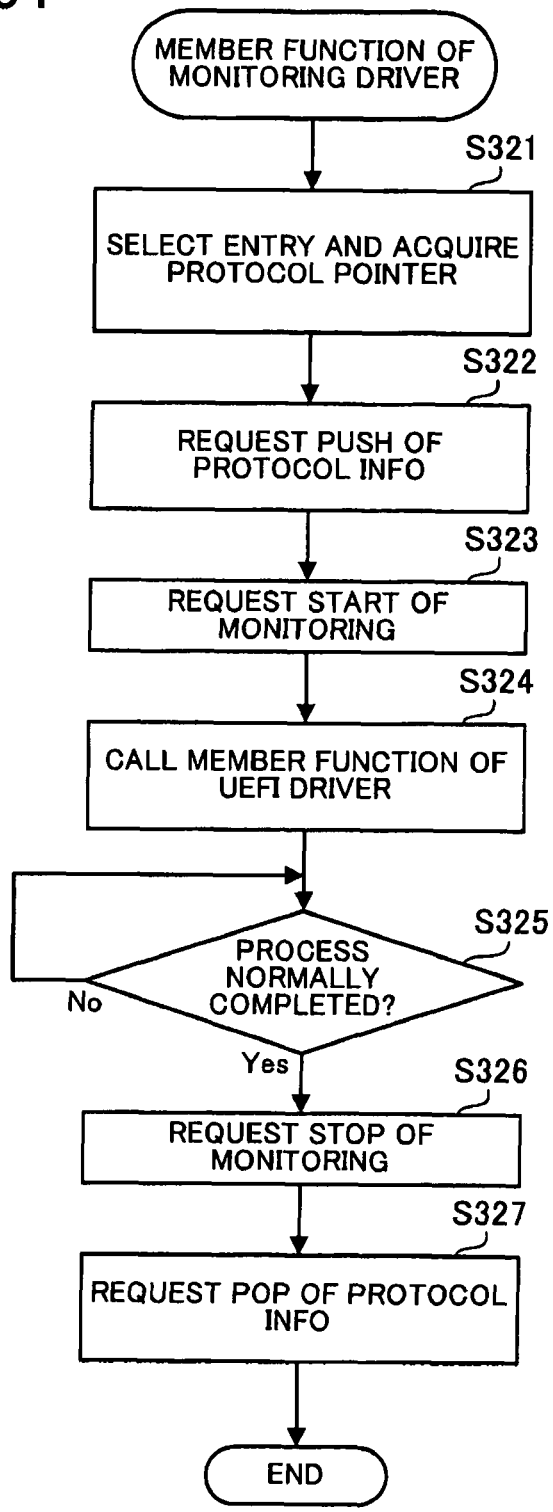
FIG. 34 is a flowchart illustrating the procedure of a process executed in the third embodiment when a member function of a monitoring driver is called.

FIG. 34 is a flowchart illustrating the procedure of a process executed in the third embodiment when a member function in a monitoring driver is called.

Step S321: When a member function in a monitoring driver 150*a* is called, the monitoring controller 151*a* is started. The monitoring controller 151*a* selects, from the sub-protocol database 230, the entry 231 wherein the protocol GUID 233 of the protocol to which the called member function belongs is registered. Then, the monitoring controller 151*a* acquires the protocol pointer 234 included in the selected entry 231.

Step S322: The monitoring controller 151*a* transmits the protocol information 330, which is information about the protocol corresponding to the entry 231 selected in Step S321, to the management unit 410 and requests the management unit 410 to push the protocol information 330 onto the stack 416. Consequently, the protocol information 330 is stored in the stack 416 generated in the RAM 412 of the management unit 410.

Step S323: The monitoring controller 151*a* requests the management unit 410 to cause the WDT 415 to start monitoring the process. Where the WDT 415 is stopped with its count reset, for example, the monitoring controller 151*a* requests the management unit 410 to cause the WDT 415 to start counting. As a result, the WDT 415 of the management unit 410 starts the counting operation.

Step S324: The monitoring controller 151*a* accesses the driver image 142 of the UEFI driver 140 in accordance with the protocol pointer 234 acquired in Step S321, and calls the corresponding member function 145 in the UEFI driver 140. Consequently, the member function 145 is executed, and the device controller 141 performs the process in accordance with the member function 145.

Step S325: The monitoring controller 151*a* determines whether or not the process executed by the device controller 141 in accordance with the called member function 145 has been normally completed. If a notification indicative of normal completion of the process is received from the device controller 141 within a fixed time after the execution of Step S323 (Yes in S325), the monitoring controller 151a executes Step S326.

If the process executed by the device controller 141 is not completed within the fixed time after the execution of Step S323, timeout occurs in the WDT 415 of the management unit 410. At this time, the interrupt processor 417 is started in the management unit 410. The process executed by the interrupt processor 417 will be explained with reference to FIG. 35.

Step S326: The monitoring controller 151a requests the management unit 410 to cause the WDT 415 to stop monitoring the process. For example, the monitoring controller 151a requests the management unit 410 to cause the WDT 415 to stop counting and reset the count.

Step S327: The monitoring controller 151a requests the management unit 410 to cause the protocol information 330 which was registered in Step S322 to be popped from the stack 416. Consequently, the protocol information 330 is deleted from the stack 416 of the management unit 410.

Figure 35:
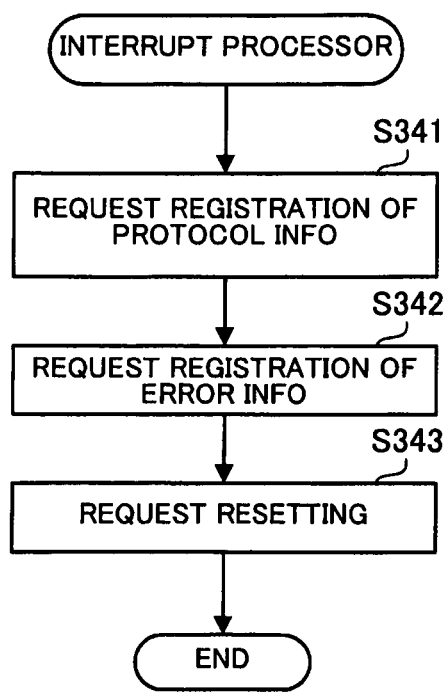
FIG. 35 is a flowchart illustrating the procedure of a process executed by an interrupt processor in a management unit.

FIG. 35 is a flowchart illustrating the procedure of the process executed by the interrupt processor of the management unit. If timeout occurs in the WDT 415, the interrupt processor 417 executes the process explained below.

Step S341: The interrupt processor 417 reads out the protocol information 330 registered in the stack 416 as the top entry. Then, the interrupt processor 417 transmits the protocol information 330 to the information processing unit 100a and requests that the protocol information 330 be registered in the error list 321. The error processor 181 of the information processing unit 100a registers, in the error list 321, the protocol information 330 transmitted from the management unit 410.

Step S342: The interrupt processor 417 transmits, to the information processing unit 100a, information indicating the UEFI driver 140 or device with respect to which the processing error has been occurred, the contents of the processing error and the date and time of the occurrence, and requests the information processing unit 100a to register the information in the error log 322. The error processor 181 of the information processing unit 100a registers, in the error log 322, the information transmitted from the management unit 410.

Step S343: The interrupt processor 417 transmits a reset request to the information processing unit 100a. In response to the reset request from the management unit 410, the error processor 181 of the information processing unit 100a resets the information processing unit 100a. The information registered in the error list 321 and the error log 322 is retained even after the information processing unit 100a is reset.

In the third embodiment described above, when a member function in a monitoring driver 150a is called, the corresponding member function 145 in the UEFI driver 140 is called. At the same time, the process executed in accordance with the called member function 145 is monitored by the WDT 415 of the management unit 410. It is therefore possible to reliably judge whether the member function 145 in the monitored UEFI driver 140 contains an anomaly occurrence factor or not.

Also, if error is detected by the WDT 415 during the execution of the process in accordance with the member function 145 in the UEFI driver 140, information identifying the UEFI driver 140 which is regarded as the cause of the error is registered in the error list 321. Thus, after the information processing unit 100a is restarted, execution of the UEFI driver 140 identified by the information registered in the error list 321 can be skipped without fail.

In the aforementioned third embodiment, when a processing error is detected by the WDT 415 during the execution of the process in accordance with a UEFI driver 140, the interrupt processor 417 requests that the necessary information be registered in the error list 321 and the error log 322, before requesting the resetting of the information processing unit 100a. As an alternative, when a processing error is detected by the WDT 415 during the execution of the process in accordance with a UEFI driver 140, the interrupt processor 417 may request the resetting of the information processing unit 100a before transmitting the information to be registered in the error list 321 and the error log 322.

In this case, when the information processing unit 100a is restarted, for example, the error processor 181 of the information processing unit 100a receives, from the interrupt processor 417 of the management unit 410, the information to be registered in the error list 321 and the error log 322. The error processor 181 then registers the received information in the error list 321 and the error log 322. After a notification indicative of completion of the registration of the information in the error list 321 is received from the error processor 181, the driver setter 121 starts loading the UEFI drivers 140. This process provides the same advantageous effects as those achieved by the third embodiment.

Although in the second and third embodiments described above, the UEFI driver 140 is explained as the boot service driver, the UEFI driver 140 may include both the boot service driver and a "Runtime Driver" standardized by the UEFI. In this case, however, the Runtime Driver is preferably not registered in the monitored object list 310.

The processing functions of the apparatus according to the foregoing individual embodiments can be implemented by a computer. In this case, a program is prepared in which is described the process for performing the functions of the individual apparatus. The program is executed by a computer, whereupon the aforementioned processing functions are accomplished by the computer. The program describing the process may be recorded on computer-readable recording media. As such computer-readable recording media, magnetic recording devices, optical discs, magneto-optical recording media, semiconductor memories and the like may be used. Magnetic recording devices include an HDD, a flexible disk (FD) and a magnetic tape. Optical discs include a DVD (Digital Versatile Disc), a DVD-RAM, a CD-ROM (Compact Disc-Read Only Memory), a CD-R (Recordable) and a CD-RW (ReWritable). Magneto-optical recording media include an MO (Magneto-Optical disk).

To market the program, portable recording media, such as DVDs and CD-ROMs, on which the program is recorded may be put on sale. Alternatively, the program may be stored in the storage device of a server computer and may be transferred from the server computer to other computers via a network.

A computer which is to execute the program stores in its storage device the program recorded on a portable recording medium or transferred from the server computer, for example. Then, the computer loads the program from its storage device and executes the process in accordance with the program. The computer may load the program directly from the portable recording medium to perform the process in accordance with the program. Also, as the program is transferred from the server computer, the computer may sequentially execute the process in accordance with the received program.

Further, at least some of the aforementioned processing functions may be implemented by an electronic circuit such as a DSP (Digital Signal Processor), an ASIC (Application Specific Integrated Circuit), or a PLD (Programmable Logic Device).

The information processing apparatus and the driver execution control method, both described above, serve to increase the chances for the process to be continued even in cases where a certain driver program or programs contain an anomaly occurrence factor.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. An information processing apparatus connected with a plurality of devices and configured to execute driver programs associated with the respective devices to control the devices, the information processing apparatus comprising:
   a process monitor configured to monitor status of processes executed in accordance with monitored driver programs, respectively, which are to be monitored among the driver programs;
   an error processor configured to operate when error is detected by the process monitor during execution of the process in accordance with any one of the monitored driver programs, to register, in a nonvolatile memory, driver information indicating the driver program with respect to which the error has been detected;
   a program memory configured to store monitoring programs respectively associated with the driver programs to be monitored; and
   an execution controller configured to call and execute the driver programs associated with the respective devices, wherein:
   when the information processing apparatus is restarted, the execution controller looks up the nonvolatile memory and skips execution of the driver program indicated by the driver information registered in the nonvolatile memory,
   when calling one of the driver programs, the execution controller first calls the monitoring program associated with the driver program to be called, then calls the driver program associated with the called monitoring program by transferring control to that driver program in accordance with the called monitoring program, and requests the process monitor to monitor the process executed in accordance with the called driver program.

2. The information processing apparatus according to claim 1, wherein:
   each of the driver programs includes one or more subprograms,
   the monitoring program includes one or more monitoring subprograms corresponding to the one or more subprograms included in the driver program associated therewith, and
   when the subprogram included in the monitored driver program is to be called, the execution controller calls the monitoring subprogram corresponding to the subprogram to be called, then calls, in accordance with the called monitoring subprogram, the subprogram corresponding to the monitoring subprogram, and requests the process monitor to monitor the process executed in accordance with the called subprogram.

3. The information processing apparatus according to claim 2, further comprising a registration unit configured to register, in a subprogram database, subprogram information indicating each of the subprograms and call information used to call each of the subprograms in a manner such that the subprogram information is associated with the corresponding call information,
   wherein:
   each of the driver programs includes a first subprogram describing a procedure of an initial setting process for the corresponding driver program, and a second subprogram describing a control procedure for accessing the device with which the corresponding driver program is associated,
   the initial setting process includes a process of requesting the registration unit to register, in the subprogram database, the subprogram information indicating the subprogram included in the driver program with respect to which the initial setting process is to be performed, and the call information associated with the subprogram information,
   the execution controller executes:
   a first process of selecting each of the driver programs, calling the first subprogram included in the selected driver program, and performing the initial setting process with respect to the selected driver program in accordance with the called first subprogram; and
   a second process of acquiring, from the subprogram database, the call information associated with the second subprogram included in a desired one of the driver programs, calling the second subprogram associated with the acquired call information, and accessing, in accordance with the called second subprogram, the device with which the driver program including the second subprogram is associated, and
   if the subprogram indicated by the subprogram information which is requested to be registered during the initial setting process for one of the driver programs is the subprogram included in any one of the monitored driver programs, the registration unit registers, in the subprogram database, the call information used to call the monitoring subprogram corresponding to the subprogram associated with the subprogram information which is requested to be registered, instead of the call information used to call the subprogram associated with the subprogram information which is requested to be registered.

4. The information processing apparatus according to claim 3, wherein, in the first process, the execution controller selects the driver programs other than those indicated by the driver information registered in the nonvolatile memory, from among the driver programs associated with the respective devices.

5. The information processing apparatus according to claim 3, wherein:
   the execution controller registers, in a driver database, call information used to call one of the driver programs, in association with a corresponding one of the driver programs associated with the respective devices,
   with respect to the monitored driver programs among the driver programs associated with the respective devices, the execution controller registers, in the driver database, call information used to call the monitoring program corresponding to the driver program, instead of the call information used to call the driver program, and during the first process, the execution controller selects the call information from the driver database and, in accordance with the selected call information, calls the first subprogram in the corresponding driver program or the monitoring subprogram corresponding to the first subprogram.

6. The information processing apparatus according to claim 2, wherein:

the execution controller registers, in a monitored driver database, call information used to call each of the monitored driver programs, and when the subprogram included in the monitored driver program is to be called, the execution controller calls the monitoring subprogram corresponding to the subprogram to be called, then acquires, in accordance with the called monitoring subprogram, the call information used to call the subprogram from the monitored driver database, and, in accordance with the acquired call information, calls the subprogram corresponding to the monitoring subprogram.

7. The information processing apparatus according to claim 1, wherein the execution controller calls each of the driver programs other than those indicated by the driver information registered in the nonvolatile memory, among the driver programs associated with the respective devices, and executes, in accordance with the called driver program, the initial setting process for the called driver program.

8. The information processing apparatus according to claim 1, wherein, when a processing error is detected by the process monitor, the error processor registers, in the nonvolatile memory, the driver information indicating the driver program with respect to which the error has been detected, and then restarts the information processing apparatus.

9. The information processing apparatus according to claim 1, wherein:

the execution controller calls and executes the driver programs associated with the respective devices during a period of time after the information processing apparatus is started and before an OS (Operating System) program is started, and the process monitor monitors the status of the processes executed by the execution controller in accordance with the respective monitored driver programs.

10. An information processing apparatus connected with a plurality of devices and configured to execute driver programs associated with the respective devices to control the devices, comprising:

a monitoring requesting unit configured to request an external monitoring device to monitor status of processes executed in accordance with monitored driver programs, respectively, which are to be monitored among the driver programs;

a driver information receiver configured to operate when error is detected by the monitoring device during execution of the process in accordance with any one of the monitored driver programs, to receive, from the monitoring device, driver information indicating the driver program with respect to which the error has been detected;

a program memory configured to store monitoring programs associated with the respective monitored driver programs; and an execution controller configured to call and execute the driver programs associated with the respective devices, wherein:

when the information processing apparatus is started, the execution controller identifies, based on the driver information received from the monitoring device, the driver program with respect to which a processing error was detected by the monitoring device when the information processing apparatus was started before, and skips execution of the identified driver program, when calling one of the monitored driver programs, the execution controller first calls the monitoring program associated with the driver program to be called, then calls the driver program associated with the called monitoring program by transferring control to that driver program in accordance with the called monitoring program, and causes the monitoring requesting unit to request the external monitoring device to monitor the process executed in accordance with the called driver program.

11. The information processing apparatus according to claim 10, wherein, when a processing error is detected by the monitoring device, the driver information receiver receives the driver information from the monitoring device, then registers the received driver information in a nonvolatile memory provided in the information processing apparatus, and restarts the information processing apparatus in response to a request from the monitoring device.

12. A driver execution control method used in conjunction with an information processing apparatus which is connected with a plurality of devices and which is configured to execute driver programs associated with the respective devices to control the devices, the driver execution control method comprising:

storing monitoring programs respectively associated with the driver programs;

calling and executing the driver programs associated with the respective devices;

monitoring status of processes executed in accordance with monitored driver programs, respectively, which are to be monitored among the called driver programs;

registering, when error is detected during execution of the process in accordance with any one of the monitored driver programs, driver information indicating the driver program with respect to which the error has been detected, in a nonvolatile memory provided in the information processing apparatus; and skipping, when the information processing apparatus is restarted, execution of the driver program indicated by the driver information registered in the nonvolatile memory, wherein the calling of the driver programs includes calling the monitoring program associated with one of the driver programs to be called, and then calling the driver program associated with the called monitoring program by transferring control to that driver program in accordance with the called monitoring program.

13. A driver execution control method used in conjunction with an information processing apparatus which is connected with a plurality of devices and which is configured to execute driver programs associated with the respective devices to control the devices, the driver execution control method comprising:

storing monitoring programs respectively associated with the driver programs;

calling and executing the driver programs associated with the respective devices;

requesting an external monitoring device to monitor status of processes executed in accordance with monitored driver programs, respectively, which are to be monitored among the called driver programs;

receiving, when error is detected by the monitoring device during execution of the process in accordance with any one of the monitored driver programs, driver information indicating the driver program with respect to which the error has been detected, from the monitoring device; and identifying, when the information processing apparatus is restarted, based on the driver information received from the monitoring device, the driver program with respect to which the processing error was detected by the monitoring device before the information processing apparatus was restarted, and skipping execution of the identified driver program, wherein the calling of the driver programs includes calling the monitoring program associated with one of the driver programs to be called, and then calling the driver program associated with the called monitoring program by transferring control to that driver program in accordance with the called monitoring program.

* * * * *